(12) United States Patent
Ando

(10) Patent No.: US 6,759,802 B2
(45) Date of Patent: Jul. 6, 2004

(54) IMAGE FORMING APPARATUS

(75) Inventor: Yoichi Ando, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 184 days.

(21) Appl. No.: 09/749,727

(22) Filed: Dec. 28, 2000

(65) Prior Publication Data

US 2002/0005692 A1 Jan. 17, 2002

(30) Foreign Application Priority Data

Dec. 28, 1999 (JP) ........................................... 11-374755
Dec. 13, 2000 (JP) ....................................... 2000-379081

(51) Int. Cl.$^{7}$ .................................................. H04N 5/00
(52) U.S. Cl. ....................................... 313/495; 313/496
(58) Field of Search ................................ 313/495, 496, 313/497; 315/169.3; 345/75.2

(56) References Cited

U.S. PATENT DOCUMENTS

| | | | | |
|---|---|---|---|---|
| 5,532,548 A | | 7/1996 | Spindt et al. | 313/422 |
| 5,770,918 A | | 6/1998 | Kawate et al. | 313/495 |
| 5,903,108 A | | 5/1999 | Mougin et al. | 315/169.1 |
| 5,945,969 A | * | 8/1999 | Westphal | 345/75.2 |
| 6,053,791 A | | 4/2000 | Fujii et al. | 445/6 |
| 6,114,804 A | | 9/2000 | Kawase et al. | 313/495 |

FOREIGN PATENT DOCUMENTS

| | | |
|---|---|---|
| EP | 0 865 069 | 9/1998 |
| EP | 0 866 490 | 9/1998 |
| JP | 1-241742 | 9/1989 |
| JP | 4-94038 | 3/1992 |
| JP | 4-98744 | 3/1992 |
| JP | 04-163833 | 6/1992 |
| JP | 4-284340 | 10/1992 |
| WO | WO 98/28774 | 7/1998 |
| WO | WO 99/03126 | 1/1999 |

OTHER PUBLICATIONS

M. Hartwell et al.; "Strong Electron Emission From Patterned Tin–Indium Oxide Thin Films"; International Electron Devices Meeting; 1975, pp. 519–521.

G. Dittmer; "Electrical Conduction and Electron Emission of Discontinuous Thin Films"; Thin Solid Films; 1972, pp. 317–328.

C.A. Mead; "Operation of Tunnel–Emission Devices"; Journal of Applied Physics; vol. 32, Jan.–Dec. 1961, pp. 646–652.

W.P. Dyke et al.; "Field Emission"; Advances in Electronics and Electron Physics; vol. VIII, 1956, pp. 89–185.

C.A. Spindt et al.; "Physical Properties of Thin–Film Field Emission Cathodes with Molybdenum Cones"; Journal of Applied Physics; vol. 47, No. 12, Dec. 1976, pp. 5248–5263.

(List continued on next page.)

*Primary Examiner*—Ashok Patel
*Assistant Examiner*—Glenn D. Zimmerman
(74) *Attorney, Agent, or Firm*—Fitzpatrick, Cella, Harper & Scinto

(57) ABSTRACT

An image forming apparatus comprises first and second substrates, a support frame arranged between the first and second substrates, and surrounding a space between the first and second substrates, electron emitting devices arranged on the first substrate facing the space, and an image forming member arranged on the second substrate. A spacer is disposed in the space between the first and second substrates, and a conductive film is arranged on the second substrate to surround the image forming member. The conductive film is supplied with a potential lower than that applied to the image forming member, and the spacer has a length greater than that of the image forming member. Each longitudinal end of the spacer is arranged between the inner periphery of the support frame and a respective plane through which a corresponding end of the conductive film extends perpendicularly to a principal surface of the second substrate.

23 Claims, 31 Drawing Sheets

OTHER PUBLICATIONS

H. Araki et al.; "Electroforming and Electron Emission of Carbon Thin Films"; J. Vac. Soc. Japan, 26 (1983), pp. 22–29; (with English Abstracts on p. 22).

M.L. Elinson et al.; "The Emission of Hot Electrons and the Field Emission of Electrons from Tin Oxide"; Radio Engineering and Electronic Physics; Jul. 1965, pp. 1290–1296.

* cited by examiner

PRIOR ART

PRIOR ART

IMAGE FORMING APPARATUS

BACKGROUND OF THE INVENTION

1. Field of the Invention

The present invention relates particularly to an image forming apparatus using an electron source.

2. Description of the Related Art

Hitherto, there are known two types of electron emitting devices, i.e., a thermionic cathode and a cold cathode. Of these two types, known examples of the cold cathode include a surface conductive type electron emitting device, a field emission type electron emitting device (referred to as "FE type" hereinafter), and a metal/insulator/metal type electron emitting device (referred to as "MIM type" hereinafter).

Some examples of the surface conductive type electron emitting devices are described in M. I. Elinson, Radio Eng. Electron Phys., 10, 1290(1965) and other papers mentioned below.

A surface conductive type electron emitting device utilizes a phenomenon that electron emission occurs when an electric current is supplied to a small-area thin film formed on a substrate so as to flow parallel to the film surface. Surface conductive type electron emitting devices known so far employ an $SnO_2$ thin film, as reported by M. I. Elinson et al., an Au thin film [see, e.g., G. Dittmer: "Thin Solid Films", 9, 317(1972)], an $In_2O_3/SnO_2$ thin film [see, e.g., M. Hartwell and G. G. Fonstad: "IEEE Trans. ED conf.", 519(1975)], a carbon thin film [see, e.g., Hisashi Araki et al.: Shinku (Vacuum), vol. 26, No. 1, 22(1983)], etc.

As a typical example of one of those surface conductive type electron emitting devices, FIG. 12 shows a plan view of the device reported by M. Hartwell et al.

Referring to FIG. 12, numeral 3001 denotes a substrate and 3004 denotes a conductive thin film of a metal oxide formed by sputtering. As shown, the conductive thin film 3004 is formed into an H-shape as viewed from above. An electron emitting portion 3005 is formed by carrying out an energization process to be described later, called "energization forming", on the conductive thin film 3004. A spacing L shown in FIG. 12 is set to 0.5–1 mm and a width W is set to 0.1 mm. Note that although the electron emitting portion 3005 is shown as having a rectangular shape at the center of the conductive thin film 3004, the drawing has been illustrated for the sake of easier understanding and does not exactly express the exact position and shape of electron emitting portions actually physically produced.

Known FE type electron emitting devices are reported, for example, by W. P. Dyke & W. W. Dolan, "Field Emission", Advance in Electron Physics, 8, 89(1956) and C. A. Spindt, "Physical properties of thin-film field emission cathodes with molybdenum cones", J. Appl. Phys., 47, 5248(1976).

As a typical example of a construction of a FE type electron emitting device, FIG. 13 shows a sectional view of the device reported by C. A. Spindt et al.

Referring to FIG. 13, numeral 3010 denotes a substrate, and 3011 denotes an emitter wire made of a conductive material. Numeral 3012 denotes an emitter cone, 3013 denotes an insulating layer, and 3014 denotes a gate electrode. In the FE type device, field emission occurs from the top of the emitter cone 3012 by applying an appropriate voltage between the emitter cone 3012 and the gate electrode 3014.

As another example of a FE type device construction, there also is known a planar structure wherein an emitter and a gate electrode are arranged on a substrate, and lay substantially parallel to a flat surface of the substrate, rather than as shown in FIG. 13.

A known MIM type electron emitting device is reported, for example, by C. A. Mead, "operation of Tunnel-emission Devices", J. Appl. Phys., 32, 646(1961).

A typical example of a construction of the MIM type electron emitting device is shown in a sectional view of FIG. 14. Referring to FIG. 14, numeral 3020 denotes a substrate, and 3021 denotes a metal lower electrode. Numeral 3022 denotes a thin insulating layer having a thickness of about 10 nm, and 3023 denotes a metal upper electrode having a thickness of about 8–30 nm. In the MIM type device, electron emission occurs from the surface of the upper electrode 3023 by applying an appropriate voltage between the upper electrode 3023 and the lower electrode 3021.

Any of the cold cathodes described above do not require a heater for heating the devices because the cold cathodes can produce an electron emission at a lower temperature than that needed in the thermionic cathode. Therefore, a cold cathode can be formed with a simpler structure and a finer pattern than a thermionic cathode. Also, when a large number of cathodes are arrayed on a substrate with a high density, a problem such as thermal fusion of the substrate is less likely to occur. Further, a cold cathode has a high response speed, whereas a thermionic cathode has a low response speed because it starts operation upon heating by the heater.

For those reasons, studies regarding applications of cold cathodes have been actively conducted.

As to applications of the electron emitting devices, image forming apparatuses such as an image display unit and an image recording apparatus, charged beam sources, etc., have been studied.

Applications of the electron emitting devices to image forming apparatuses are disclosed in, for example, U.S. Pat. Nos. 5,532,548, 5,770,918 and 5,903,108, WO Nos. 98/28774 and 99/03126, as well as Japanese Patent Laid-Open Nos. 01-241742, 04-094038, 04-098744, 04-163833 and 04-284340.

Of those image forming apparatuses employing the electron emitting devices, attention often is focused on a flat display which has a thin body contributing to saving space, and which also is lightweight and expected to be eventually substituted for a CRT type display.

FIG. 20 is a perspective view schematically showing a partially uncovered flat image forming apparatus (airtight container) that employs an electron source comprising a number of electron emitting devices arrayed in the form of a matrix. In FIG. 20, numeral 27 denotes an electron emitting device of any type described above, and numerals 23 and 24 denote wires connected to the electron emitting device 27. Numeral 1 denotes a rear plate on which the electron emitting devices are arrayed, 20 denotes an image forming member made up of a phosphor, etc., and 19 denotes a metal film (metal back) to which a high voltage (Hv) is applied for irradiating electrons emitted from the electron emitting devices towards the image forming member. Numeral 11 denotes a face plate on one side of which the image forming member is arranged, and 4 denotes a support frame which, together with the face plate 11 and the rear plate 1, constitutes an airtight container 100. An inner space of the airtight container 100 is held in a vacuum state at a level of about $10^{-4}$ Pa (Pascal).

SUMMARY OF THE INVENTION

The image forming apparatus described above has the following problems.

FIG. 15 is a partial schematic sectional view of a portion of the airtight container 100 (FIG. 20) constituting the above-described image forming apparatus.

Since the inner space of the airtight container 100 must be held in a vacuum state at a pressure level of about $1.3\times10^{-4}$ Pa as described above, some means for maintaining such a vacuum level is required. According to one conventional solution, an evaporable getter 8 filled with Ba is disposed together with a support 9 outside an image area, as shown in FIG. 15. After sealing off the vacuum container, Ba is scattered upon high-frequency heating, etc., to form a getter film, thereby holding the desired vacuum level substantially constant.

In FIG. 15, numeral 1 denotes a rear plate including an area (electron source area) 2 in which a number of electron emitting devices (not shown) are arrayed. Numeral 4 denotes a support frame, 11 denotes a face plate, and 12 denotes an image forming member made up of a film including a phosphor, etc., and a metal film (e.g., Al) called a metal back.

On the other hand, to accelerate electrons emitted from the electron emitting devices, a high voltage (Va) on the order of several hundred volts to several kvs is applied between the electron source area 2 and the image forming member 12. In an image display unit such as a display panel, the brightness level greatly depends on the amount of voltage Va applied. For achieving a greater brightness level, therefore, it is required to increase the applied voltage Va.

With an increase of the applied voltage Va, however, an electric field produced in the surroundings of the getter 8 and the support 9 (which are arranged outside the image area) is also increased. This increase of the electric field has raised a problem of the occurrence of a discharge at edges of both the getter 8 and the support 9 or at a boundary surface between the support 9 and the rear plate 1, where an electric field tends to enhance due to the shape of those components. The produced electric field is determined (as described later in greater detail) by electrical characteristics of various components.

In some cases, for the purpose of bearing the vacuum container against the atmospheric pressure, supports (spacers 101), each being formed of a relatively thin member, are provided in the image area between the rear plate 1 and the face plate 11. FIG. 17 shows a schematic perspective view of the airtight container 100 in which spacers 101 are disposed. In FIG. 17, portions of the face plate 11 and the support frame 4 are omitted for the sake of convenience. The same numerals in FIG. 17 as those shown in FIG. 20 denote the same components. Specifically, numeral 27 denotes an electron emitting device, 20 denotes a film made up of a phosphor, etc., 19 denotes a metal back, and these components 19 and 20 collectively form an image forming member. Also, numeral 24 denotes an upper wire connected to ends of respective electron emitting devices, and 23 denotes a lower wire connected to other ends of those electron emitting devices. Since the spacers 101 are disposed in an image area, spacer surfaces are exposed to a high electric field. Accordingly, in at least some conventional cases, a discharge phenomenon has occurred at the spacer surfaces.

For overcoming such a problem, it is proposed in some of the above-cited publications to remove charged electricity by processing the spacers 101 such that a small current is allowed to flow through each spacer 101.

Even with the processing of the spacers, however, it has been experienced, in at lest some cases, that longitudinal ends 110 of each spacer 101 cause a discharge at a lower voltage than in other portions. The reason for this discharge presumably is that the ends 110 of the spacer 101 are of a more complicated structure, and the contact of the spacer ends 110 to the face plate 11 and rear plate 1 tends to be unstable. Furthermore, although depending on the methods employed for manufacturing and handling the spacers 101, the spacer ends 110 tend to be more susceptible to micro-protrusions, cracks and other shape defects, and hence are more likely to become discharge sources than are other spacer portions. Suppressing the occurrence of discharge at the spacer ends 110, due to those factors, is very important in image display units.

Also, where the spacer end 110 located in the image area is obliquely cut, as shown in FIG. 18, this arrangement noticeably increases a probability that an electric field will enhance at an end 111 of the spacer on the side of the rear plate 1, and hence also increases the probability that a discharge will occur there. In the image display unit having such a structure, it is particularly important to suppress discharge from occurring at the spacer end 111 on the side of the rear plate 1.

Furthermore, in at least some cases, the spacer end 110 is arranged outside the image area as shown in FIG. 19, or the spacer end 110 is fixed to the rear plate 1 by using a support 102 as shown in FIG. 16. In any of these structures, it is also important to suppress any discharge that may occur due to the shape of the spacer end 110 and support 102.

Of four sides of the image area, even a side where structural components such as the getter support and the spacer support are not present outside the image area may undergo a similar problem. In other words, when the distance between the support frame 4 and the image area is reduced more and more for achieving a smaller size of the airtight container 100, surface discharge may occur at an inner surface of the support frame 4.

The term "surface discharge", as used in this description, means a discharge phenomenon occurring between two conductive members along an insulator surface; i.e., a discharge phenomenon occurring between one conductive member on the face plate 11 and another conductive member on the rear plate 1 along the surface of the support frame 4 that is an insulator.

The above-mentioned discharge typically occurs abruptly during the image display operation. Once it has occurred, the discharge not only distorts an image, but also noticeably deteriorates an electron source area around a location where the discharge has occurred to such an extent that a desired display quality is no longer obtained, in at least some cases after the occurrence of the discharge.

In view of the problems set forth above, it is an object of the present invention to provide an image forming apparatus which can prevent a discharge from occurring outside an image area of a display device during an image display operation, and which can produce a displayed image having a high quality.

To achieve the above object, according to one aspect of the present invention, there is provided an image forming apparatus comprising (A) a first substrate; (B) a second substrate arranged in an opposing and spaced apart relation to the first substrate; (C) a support frame having an inner periphery forming a substantially rectangular shape, the support frame being arranged between the first and second substrates to surround a space between a principal surface of the first substrate and a principal surface of the second substrate, for maintaining the space in a depressurized condition; (D) a plurality of electron emitting devices arranged on the principal surface of the first substrate facing the space; (E) an image forming member having an outer periphery forming a substantially rectangular shape, the image forming member being arranged on at least a portion of the principal surface of the second substrate facing the space in an opposing relation to the plurality of electron emitting devices; (F) a spacer disposed in the space for maintaining a separation between the first and second substrates; and (G) a conductive film arranged on at least another portion of the principal surface of the second substrate facing the space. The conductive film surrounds, and is spaced apart from, the image forming member. The conductive film preferably is supplied with a potential lower than that applied to the image forming member. The spacer preferably has a length in the longitudinal direction thereof greater than that of the image forming member in the same longitudinal direction, each longitudinal end of the spacer preferably is arranged between the inner periphery of the support frame and a respective plane through which a conductive film extends, each respective plane preferably extends substantially perpendicularly to the principal surface of the second substrate.

To achieve the above object, according to another aspect of the present invention, there is provided an image forming apparatus comprising (A) a first substrate; (B) a second substrate arranged in an opposing and spaced apart relation to the first substrate; (C) a support frame having an inner periphery forming a substantially rectangular shape, the support frame being arranged between the first and second substrates to surround a space defined between a principal surface of the first substrate and a principal surface of the second substrate, for maintaining the space in a depressurized condition; (D) a plurality of electron emitting devices arranged on the principal surface of the first substrate facing the space; (E) an image forming member having an outer periphery forming a substantially rectangular shape, the image forming member being arranged on at least a portion of the principal surface of the second substrate facing the space in an opposing relation to the plurality of electron emitting devices; (F) a first conductive film arranged on at least another portion of the principal surface of the second substrate facing the space so as to surround, and be spaced apart from, the image forming member; and (G) a second conductive film connecting the first conductive film to the image forming member. The first conductive film preferably is supplied with a potential lower than that applied to the image forming member.

With the image forming apparatus of the present invention constructed as set forth above, the distance between the image forming member and the support frame can be shortened, and any electric field which imposes on structural components, such as the spacer ends and the spacer support member, can be weakened. As a result, an image forming apparatus is realized which can form a stable image with a high brightness level sustained for a long period of time, and which is lightweight and easy to manufacture.

Further objects, features and advantages of the present invention will become apparent from the following description of the preferred embodiments with reference to the attached drawings.

DESCRIPTION OF THE PREFERRED EMBODIMENTS

Figure 10:
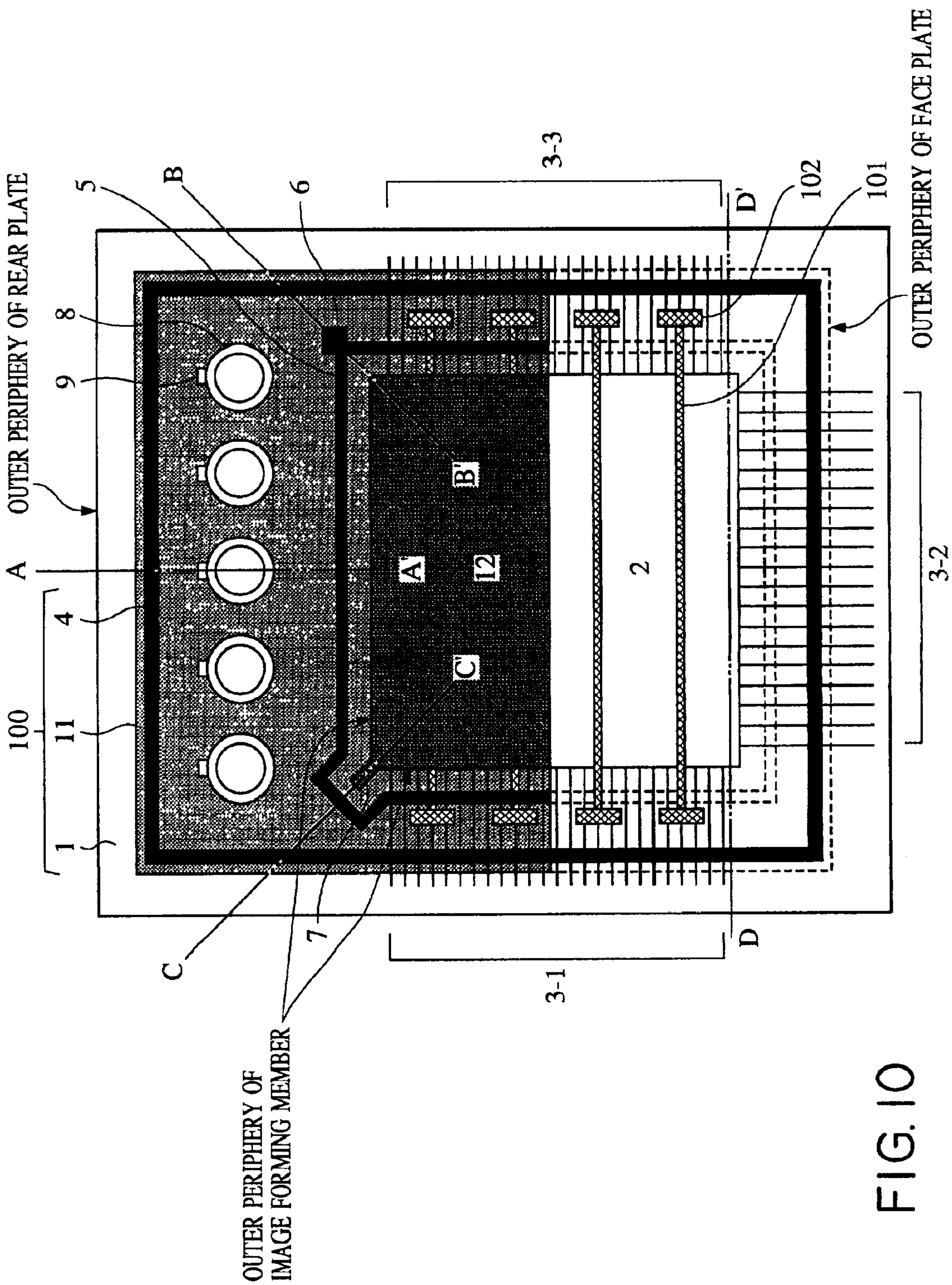
FIG. 10 is a schematic plan view showing a basic construction of an image forming apparatus according to a fifth embodiment of the present invention.

One form for carrying out the present invention will be described below in detail with reference to the drawings. FIG. 10 is a plan view schematically showing one example of a construction of an image forming apparatus (airtight container) according to the present invention, as viewed from above a face plate 11, with a lower portion of the face plate 11 omitted for the sake of explanation. An inner space of an airtight container 100 is maintained in a depressurized condition. Though depending on the type of an electron emitting device used, a vacuum level in the inner space of the airtight container 100 is preferably under pressure lower than $10^{-6}$ Pa.

Figure 2A:
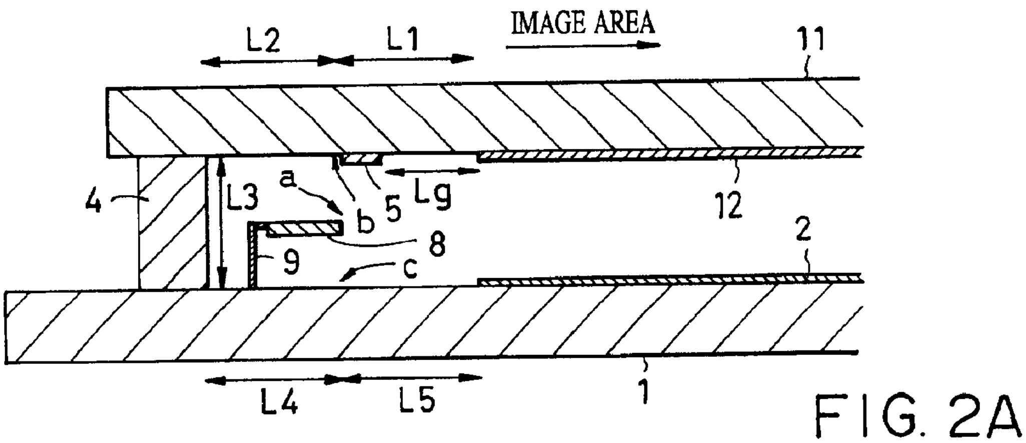
FIGS. 2A, 2B and 2C are schematic sectional views taken along lines A–A', B–B' and C–C' in FIG. 1.
Figure 2B:
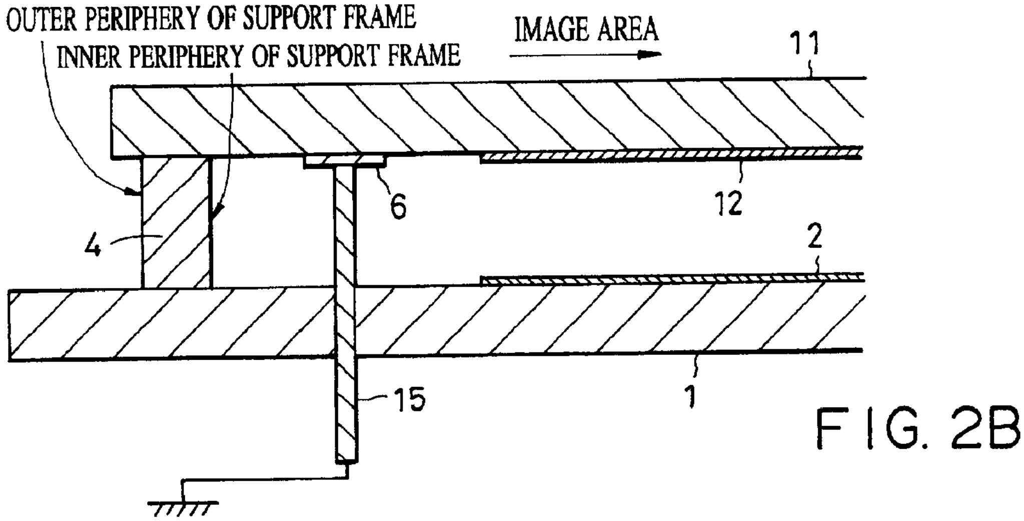
Figure 2C:
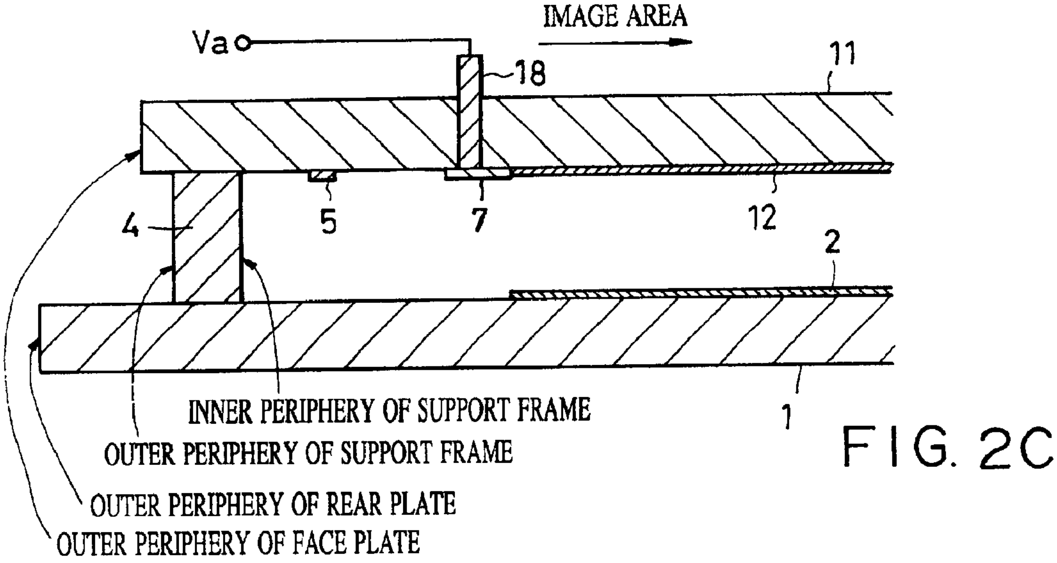
Figure 11:
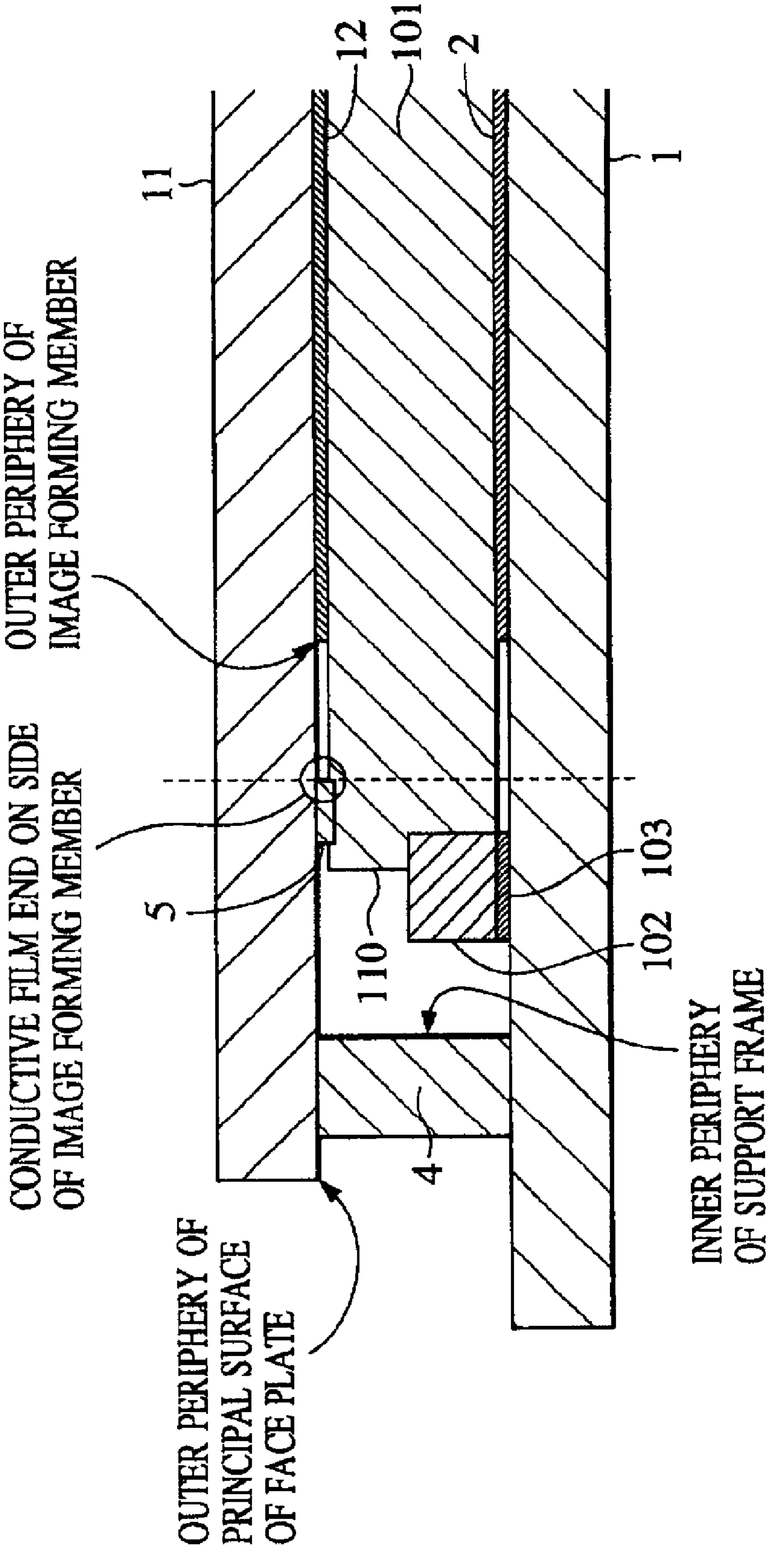
FIG. 11 is a partial schematic sectional view taken along line D–D' in FIG. 10.
Figure 12:
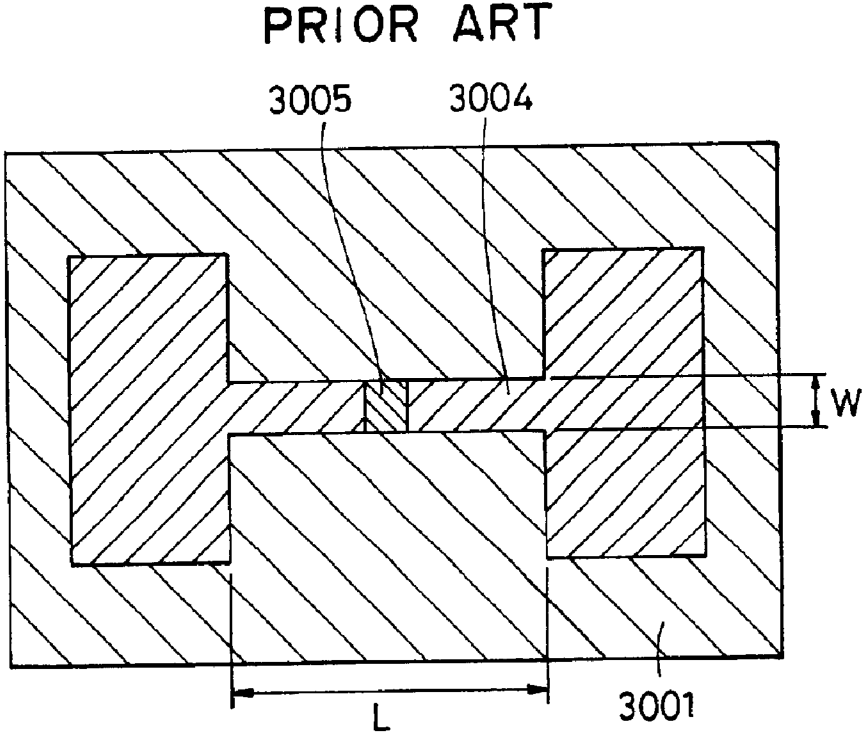
FIG. 12 PRIOR ART
FIG. 12 is a schematic plan view showing one example of a conventional surface conductive type electron emitting device.

FIGS. 2A, 2B and 2C are schematic sectional views respectively taken along lines A–A', B–B' and C–C' in FIG. 10 (or 1). FIG. 11 is a partial schematic sectional view taken along line D–D' in FIG. 10.

Referring to FIGS. 10, 11, and 2A to 2C, numeral 1 denotes a rear plate (first substrate). The rear plate (first substrate) 1 has a principal surface on which an electron source area 2, described later, is arranged. The rear plate 1 can be made of any suitable one of various materials (depending on operating requirements and conditions), such as soda lime glass, soda lime glass having a $SiO_2$ coating formed on the surface, glass containing a reduced amount of Na, and ceramics. The rear plate 1 is basically an insulating substrate.

As an alternative, a substrate for forming an electron source thereon may be prepared separately from a rear plate, and both the substrate and the rear plate may be joined together after forming the electron source on the substrate. The rear plate preferably has an outer periphery substantially in a rectangular shape.

Numeral 2 denotes an electron source area in which a number of electron emitting devices, e.g., FE type electron emitting devices or surface conductive type electron emitting devices, are arranged in an array configuration. The type of electron emitting devices usable in the present invention are not limited to any particular types so long as properties of the electron emitting devices, e.g., electron emission characteristics and device size, are suitable for the image forming apparatus intended. Examples of electron emitting devices which may be used in conjunction with this invention include thermionic cathodes and cold cathodes such as an FE type electron emitting device, an MIM type electron emitting device and a surface conductive type electron emitting device. The following description is made in the context of a case where a surface conductive type electron emitting device is used for the electron emitting devices in the invention, although broadly construed, the invention is not so limited. Parts of wires 3-1, 3-2, 3-3 connected to each electron emitting device also are included in the electron source area 2 so that the electron source area 2 can be driven as desired.

In the present invention, the electron source area 2 preferably is substantially rectangular in shape. The term "electron source area" used in this description means an area surrounded by imaginary lines connecting those ones of numerous electron emitting devices which emit electrons towards an image forming member 12 (FIG. 11), made up of a phosphor, etc., to form (display) an image, and which are positioned near an outermost periphery (that is to say, which are arranged close to a support frame 4) of the plate 1.

Stated otherwise, the term "electron source area" used in this description means an area surrounded by imaginary lines connecting electron emitting portions of those ones of numerous electron emitting devices which emit electrons towards the image forming member 12 (FIG. 11), made up of a phosphor, etc., to form an image, and which are positioned near the outermost periphery of the plate 1.

Further stated otherwise, the term "electron source area" used in this description means an area surrounded by imaginary lines connecting preferably four electron emitting devices which are arranged respectively closest to respective ones of four corners of the support frame 4 having an inner periphery forming a substantially rectangular shape, and which emit electrons towards the image forming member 12 (FIG. 11), made up of a phosphor, etc., to form an image.

Numerals 3-1, 3-2 and 3-3 denote wires connected to the electron emitting devices for driving an electron source 2 (FIG. 11). The wires 3-1, 3-2 and 3-3 are extended to the exterior of the airtight container 100 and are connected to an electron source driving circuit (not shown). The wires 3-1 and 3-3 hereinafter also are referred to as X-direction wires or row direction wires, and the wires 3-2 hereinafter also are referred to as Y-direction wires or column direction wires.

Numeral 4 denotes a support frame disposed between the rear plate 1 and the face plate 11 for maintaining a space between the rear plate and the face plate in a depressurized condition. The support frame 4 is joined to the rear plate 1 and the face plate 11 by a bonding material such as frit glass. The support frame 4 herein is preferably fabricated as a separate component from the rear plate 1 and the face plate 11, but, in other embodiments, may be integrally formed with the rear plate 1 or the face plate 11.

The support frame 4 preferably is a hollow frame having an inner periphery forming substantially rectangular shape, although the shape may be different in other embodiments, depending on the shape of an image display area, described later.

The inner periphery of the support frame 4 faces the space defined between the rear plate 1 and the face plate 11 and held in a depressurized condition (that is to say, the support frame 4 surrounds the space held in a depressurized condition). An outer periphery of the support frame 4 preferably forms a substantially rectangular shape, as with the inner periphery, from the standpoint of strength and an area occupied by the support frame 4.

Although the support frame 4 has the inner periphery which is substantially rectangular in shape, four corners of the inner periphery of the support frame 4 are not necessarily right-angled, and preferably are arc-shaped for providing greater structural integrity.

Further, where the distance between the rear plate 1 and the face plate 11 is as small as approximately several hundreds microns, no support frame 4 need be employed at all. In that case, a bonding material such as frit glass serves as a support frame.

The electron source driving wires 3-1, 3-2 and 3-3 are extended to the exterior of the airtight container 100 through the joint portion of the device (i.e., a portion of the device between the support frame 4 and rear plate 1 join together). An insulating layer (not shown) preferably is formed between the electron source 2 driving wires 3-1 (3-3) and 3-2. According to an embodiment of the present invention described herein, getters 8 are also arranged together with getter supports 9 within the airtight container (vacuum container) 100. Note that the getters 8 and the getter supports 9 are not necessarily required in the present invention.

Numeral 11 denotes a face plate (second substrate) which serves also as a substrate, on one side of which the image forming member 12 (made up of a phosphor, a metal back, etc.) is formed. As with rear plate 1, the face plate 11 can be made of any suitable type of various materials. The face plate 11 has an outer periphery having a substantially rectangular shape. The face plate 11 is an insulating substrate.

Numeral 7 denotes a portion against which a terminal (not shown) for supplying a high voltage is abutted for providing an electrical connection between the terminal and the image forming member 12. Numeral 12 denotes the image forming member.

The face plate 11 and the rear plate 1 are each formed of a substantially flat-surfaced plate that is substantially rectangular in shape. Each plate has first and second principal surfaces. The image forming member 12 and the electron source area 2 are arranged on one of the principal surfaces of the respective plates, wherein those surfaces are oriented so as to face the vacuum space.

The term "image forming member" used in this description means a member that forms or displays a desired image upon an irradiation of electron beams. The "image forming member" includes, for example, a phosphor or a resist that becomes hardened upon an irradiation of electron beams.

Figure 32:
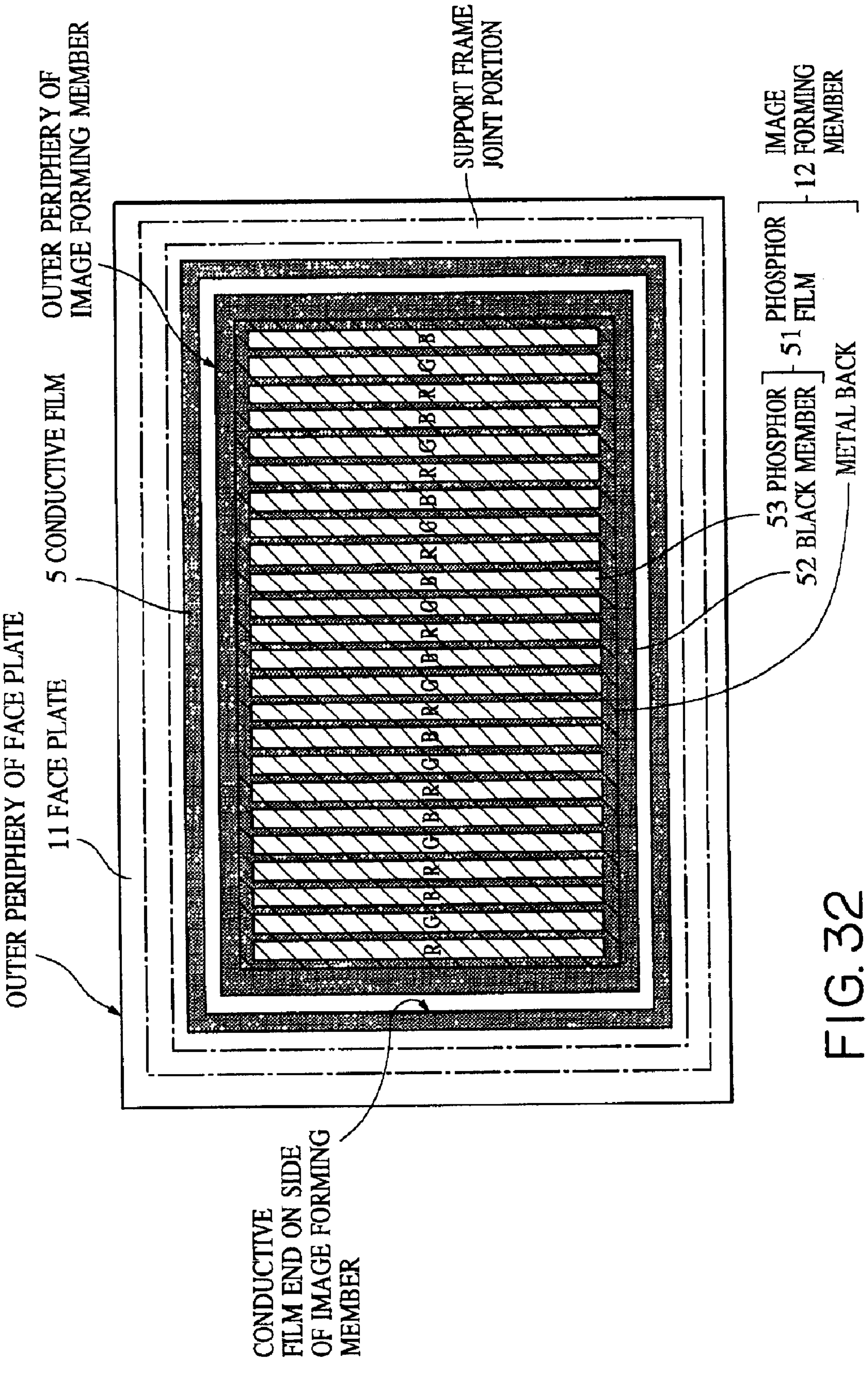
FIG. 32 is a schematic view of one example of an image forming member in the image forming apparatus of the present invention.

In an image display unit such as a display panel, particularly, a "phosphor film" (described below) preferably serves as the "image forming member" 12. Further, in an image display unit such as a display panel, a very thin conductive film (e.g., a metal back), to which a high voltage is applied, is often arranged on a "phosphor film" (described below, see FIG. 32, etc.) for the purpose of irradiating electrons emitted from the electron source area to the phosphor film. FIG. 32 is a schematic view of one example of the face plate 11 in the image forming apparatus of the present invention as viewed from the side of the electron source area 2.

In such a case, a layered structure of the "phosphor film" and the conductive film (e.g., a metal back) is also called the "image forming member" 12.

Further, the term "image display area" (or "image forming area") used in this description means an area where an image is formed (displayed) by electrons emitted from the electron emitting devices arrayed in the "electron source area" 2.

Stated differently, the term "image display area" used in this description means an area where a member (e.g., a metal back) is arranged, and to which a potential is applied for accelerating electrons emitted from the electron emitting devices arrayed in the "electron source area" 2, so as to impinge against the image forming member 12 made up of a phosphor, etc. In the case of using a phosphor as the image forming member 12, a potential is applied to the image forming member 12 (a conductive film, e.g., a metal back, as one component of the image forming member) at a level of not lower than 1 kV, preferably not lower than 5 kV for obtaining a bright image, and even more preferably, not lower than 10 kV for obtaining sufficient brightness.

It can also be said that the term "image display area" used in this description means an area where the "image forming member" is arranged.

More simply, it can be said that the term "image display area" used in this description means the so-called "metal back" formed of a conductive film, or a "phosphor film".

The "image display area" preferably has a smaller area than the "image forming member".

Figure 6A:
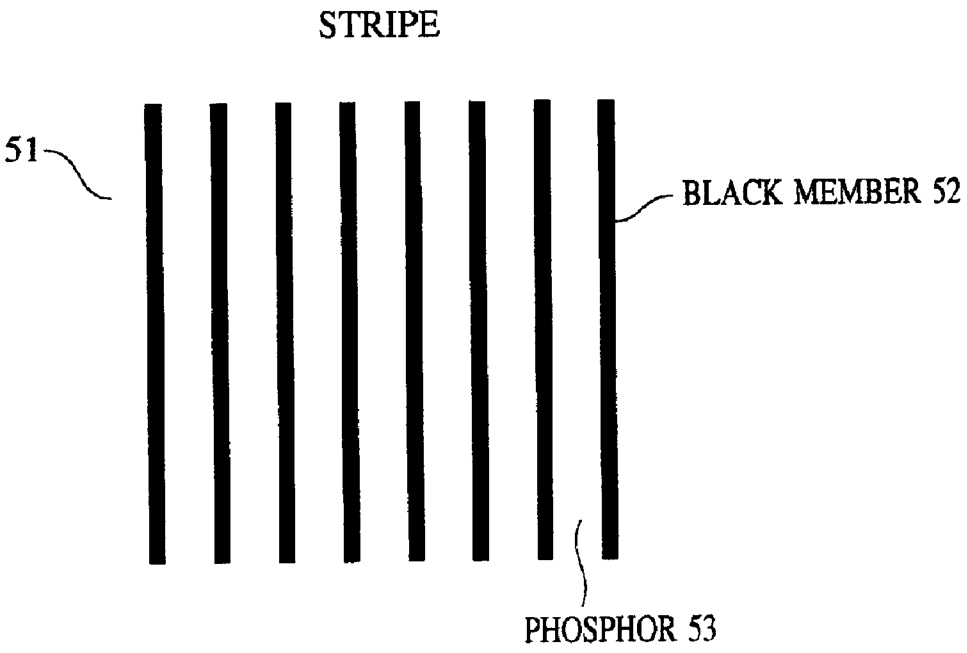
FIGS. 6A and 6B are schematic views each showing a makeup of an image forming member used in the image forming apparatus of the present invention.
Figure 6B:
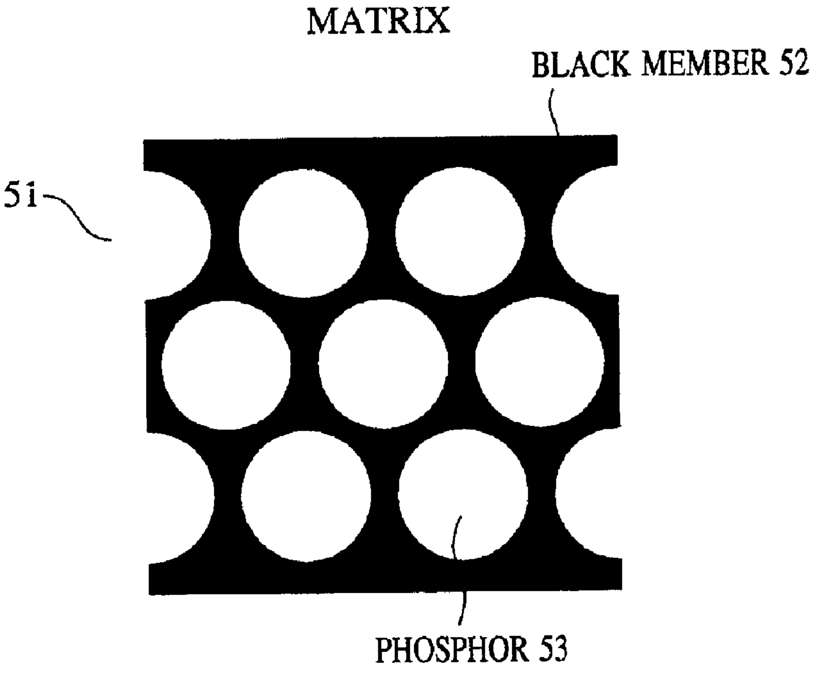

Additionally, the term "phosphor film" used in this description means not only a film of a phosphor alone, but also a film made up of a phosphor and a member for improving contrast, etc., e.g., a black member, when the black member is arranged between the phosphors, by way of example, as shown in FIG. 6A, 6B or 32.

The "image display area" ("image forming area") and the "electron source area" in the present invention are neither always formed to have the same area size, nor always positioned in an exactly opposing relation (in terms of "orthogonal projection" described later). For example, when surface conductive type electron emitting devices or transverse type electron emitting devices are used, the "image display area" formed on the face plate 11 preferably is not positioned right above the "electron source area" 2 formed on the rear plate 1, and both of the areas are arranged in a slightly offset relation. This is because electrons emitted from the surface conductive type electron emitting devices or the transverse type electron emitting devices have vectors along the surface of the rear plate 1.

Further, the term "image area" used in this description means an area including the "electron source area", the "image display area" ("image forming area"), and an area sandwiched by both of those two areas.

As shown in FIG. 11, numeral 101 denotes a spacer that is employed in embodiments in which the airtight container 100 has a large size. Since the inner space of the airtight container is held in a depressurized condition, the spacer 101 serves as a member for bearing, from the inside of the airtight container 100, a force imposed towards the inside of the airtight container 100 under the atmospheric pressure.

The spacer 101 is preferably a flat plate made of glass, ceramics or the like. The spacer 101 may be employed in the present invention regardless of whether it is dielectric or conductive. However, when a high potential of not lower than several kV is applied to the image forming member 12, the spacer preferably is conductive. The spacer 101 having conductivity can be formed by coating a conductive film over an insulating base member, or can be formed of a completely conductive member (not only the surface but also the interior). A spacer having high conductivity, however, can cause a problem that power consumption of the image forming apparatus is increased. For that reason, the spacer 101 preferably has a resistance to an extent that a small current flows between the conductive member (image forming member 12) on the face plate 11 and the conductive member (wires arranged in the electron source area) on the rear plate 1.

As shown in FIGS. 10 and 11, the length of the spacer 101 in the longitudinal direction thereof preferably is greater than that of the "image forming member" 12 in the same longitudinal direction. The spacer 101 preferably is arranged such that its longitudinal opposite ends 110 are positioned between the (side) outer periphery of the "image forming member" 12 and the inner periphery of the support frame 4. Likewise, the length of the spacer 101 in the longitudinal direction thereof preferably is greater than that of the "electron source area" 2 in the same longitudinal direction. Consequently, the spacers 101 in the present invention extend completely across and somewhat beyond the boundaries of the "image area".

With such an arrangement, and in accordance with an aspect of this invention, both ends 110 of each spacer 101, at which an electric field tends to enhance, are located away from the area in which a high electric field is produced (i.e., the image area).

Numeral 102 is a spacer support for fixing the spacer 101 to the rear plate 1. The spacer 101 preferably is fixed to the spacer support 102 by a bonding material (not shown). While the spacer support 102 is fixed herein to the rear plate 1 by the bonding material 103, in other embodiments the spacer support 102 may be fixed to the face plate 11 or to the inner periphery of the support frame 4.

The spacer support 102 is not necessarily required, and the spacer 101 may be directly fixed to the rear plate 1 and/or the face plate 11 by the bonding material. In the case of fixing the spacer 101 directly to the rear plate 1 and/or the face plate 11 by the bonding material, the spacer preferably is fixed at positions outside the "image area".

In the present invention, the spacer support 102 preferably is also arranged between the outer periphery of the "image forming member" 12 and the inner periphery of the support frame 4, as shown in FIGS. 10 and 11. In other words, the spacer support 102 preferably also is arranged outside the "image area". With such an arrangement, and in accordance with an aspect of this invention, the spacer support 102, on which an electric field tends to enhance, is similarly positioned away from the area in which a high electric field is produced.

Numeral 5 (FIGS. 10 and 11) is a conductive film that is a feature of the present invention. The conductive film 5 is preferably a low-resistance film, such as a metal film. The conductive film 5 preferably is arranged on the principal surface of the face plate 11, on which the image forming member 12 also is formed, so as to surround the image forming member 12, there being a space provided between the film 5 and the image forming member 12.

The conductive film 5 preferably is arranged on a portion of the face plate 11, which is positioned between the substantially rectangular outer periphery of the image forming member 12 and the substantially rectangular inner periphery of the support frame 4 (surface thereof facing the vacuum space), so as to surround the image forming member 12 with a space provided between the film 5 and the image forming member 12.

In other words, the conductive film 5 is arranged on a portion of the face plate 11, which is positioned between each of four sides forming the substantially rectangular outer periphery of the image forming member 12 and each of four sides forming the substantially rectangular inner periphery of the support frame 4, the latter four sides being located in a side-by-side opposing relationship with the former four sides of the image forming member 12, and surround the image forming member 12 with a space being provided between the film 5 and the image forming member 12.

Moreover, in the image forming apparatus of the present invention having the above-described structure, as shown in FIG. 11, the end 110 of the spacer 101 is arranged between a plane (a line) through which passes a side surface (an end) of the conductive film 5 (located towards the side of the image forming member 12), and the inner surface of the support frame 4 (surface thereof facing the vacuum space), wherein the plane (line) extends substantially perpendicular to the principal surface of the face plate 11 facing the vacuum space.

It can also be said that, as shown in FIG. 11, the end 110 of the spacer 101 is arranged between a line (plane) through which passes an end (a side surface) of the conductive film 5 (located towards the side of the image forming member 12, and the inner surface of the support frame 4 (surface thereof facing the vacuum space), wherein the line (plane) extends substantially perpendicular to the principal surface of the face plate 11 facing the vacuum space.

Stated otherwise, as shown in FIG. 10, an orthogonally projected image of the spacer end 110 is located between an orthogonally projected image of the end of the conductive film 5 on the side of the image forming member 12 formed on the rear plate and an orthogonally projected image of the support frame 4 when the image forming apparatus (airtight container) 100 is viewed in a direction perpendicular to the face plate.

A potential lower than that applied to the image forming member 12 (conductive member as one component of the image forming member) is applied to the conductive film 5. Further, the potential applied to the conductive film 5 is preferably substantially equal to the potential applied to the "electron source area" 2 (i.e., the potential applied to wires 3-1, 3-2 and 3-3 for driving the electron emitting devices constituting the "electron source area" 2.

Preferably, 0 V (GND potential) is applied to the conductive film 5.

By setting the potential applied to the conductive film 5 lower than that applied to the image forming member 12, an electric field enhancement at the spacer end 110 can be further reduced. In the case of applying the same potential to the conductive film 5 as is applied to the electron source area 2, an electric field is prevented from being produced at all in a region including the spacer end 110. Also, by surrounding the image forming member 12 by the conductive film 5 as shown in FIG. 10, an electric field produced in the surroundings of the support frame 4 can be alleviated and therefore the distance between the inner periphery of the support frame 4 and the outer periphery of the image forming member 12 also can be reduced.

In the present invention, when structural components such as the spacer support 102, the getter 8 and the getter support 9 are employed, those structural components preferably also are arranged similarly to the spacer end 110, between the inner periphery of the support frame 4 (surface thereof facing the vacuum space) and a plane (a line) through which passes a side surface (an end) of the conductive film 5 (located towards the side of the image forming member 12), wherein the plane (line) extends substantially perpendicular to the principal surface of the face plate 11). It can be otherwise said that those other structural components are arranged between a line, which passes an end of the conductive film 5 on the side of the image forming member 12 and is perpendicular to the principal surface of the face plate, and the inner periphery of the support frame 4 (surface thereof facing the vacuum space). Stated differently, as shown in FIG. 10, orthogonally projected images of the other structural components such as the spacer support 102, the getter 8 and the getter support 9 are located between an orthogonally projected image of the conductive film 5 formed on the rear plate and an orthogonally projected image of the support frame 4 when the image forming apparatus (airtight container) 100 is viewed in a direction perpendicular to the face plate.

With such an arrangement, based on the same reasons as described above in connection with the spacer end 110, an electric field enhancement on those structural components can be reduced and the occurrence of discharge on the structural components can be suppressed. As a result, it is possible to suppress the occurrence of discharge at the spacer ends and to realize a lightweight, large-screen image forming apparatus which is inexpensive and has an increased proportion of the image display area occupied in the overall apparatus size, relative to conventional apparatuses.

In addition, as shown in FIG. 10, the conductive film 5 surrounds the image forming member 12. Preferably, the conductive film 5 is in the form of a closed loop (in which both ends of one continuous conductive film are connected to each other).

Stated otherwise, it is preferable that the conductive film 5 be always situated so as to intersect an imaginary line connecting an arbitrary point on the image forming member 12 and an arbitrary point on the outer periphery of the principal surface of the face plate 11 (the principal surface on which the image forming member is arranged).

Further, stated otherwise, it is most preferable that the conductive film 5 intersect an imaginary line connecting an arbitrary point on the image forming member 12 and an arbitrary point in a region of the principal surface of the face plate 11 in which the support frame 4 is joined to the face plate.

In one embodiment, the conductive film 5 may be arranged so as to substantially surround four sides of the image forming member 12.

The width of the conductive film 5 may be substantially uniform as shown in FIG. 10, or may be different in part of the conductive film.

Figure 26A:
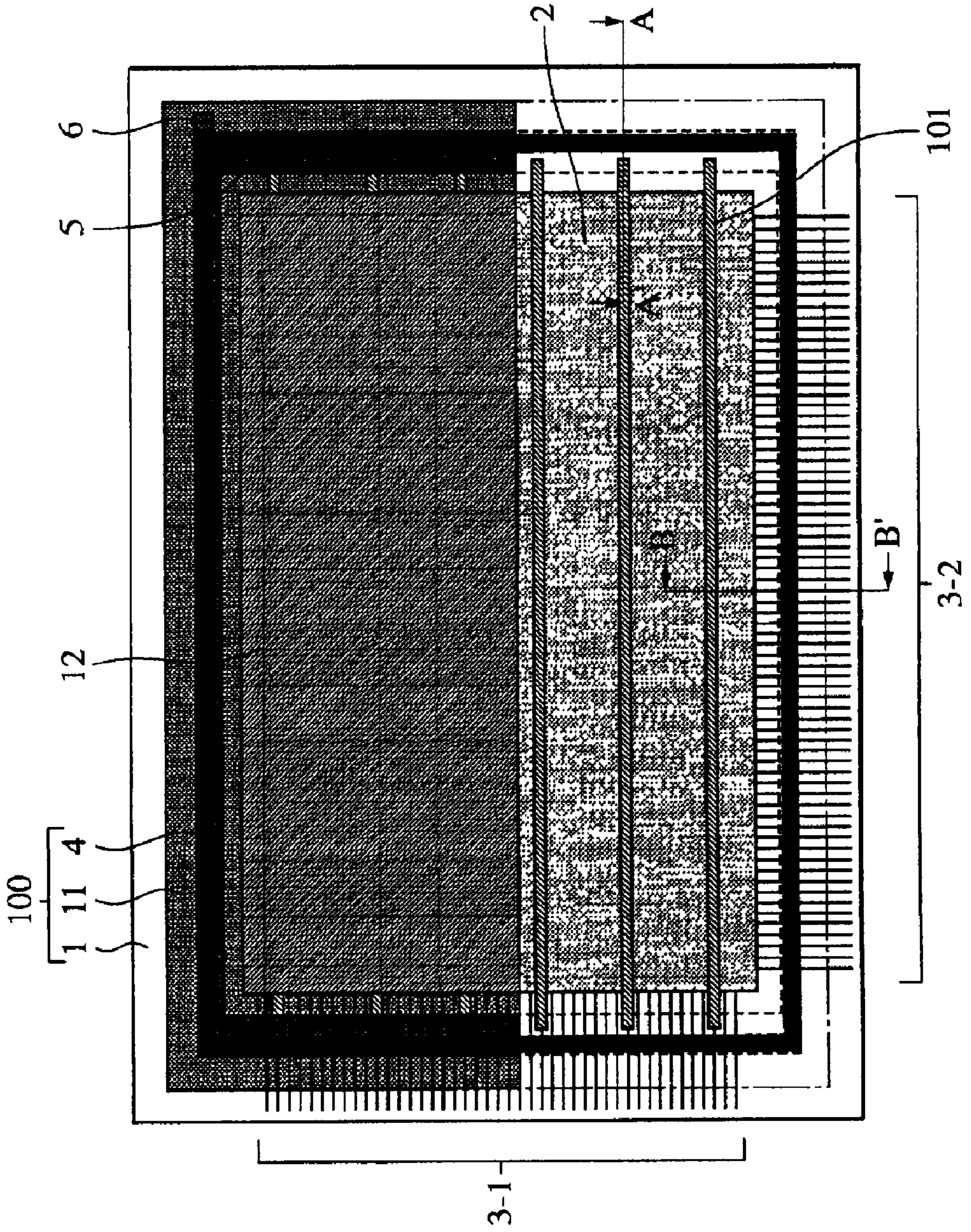
FIG. 26A is a schematic plan view of an image forming apparatus according to a seventh embodiment of the present invention.
Figure 26B:
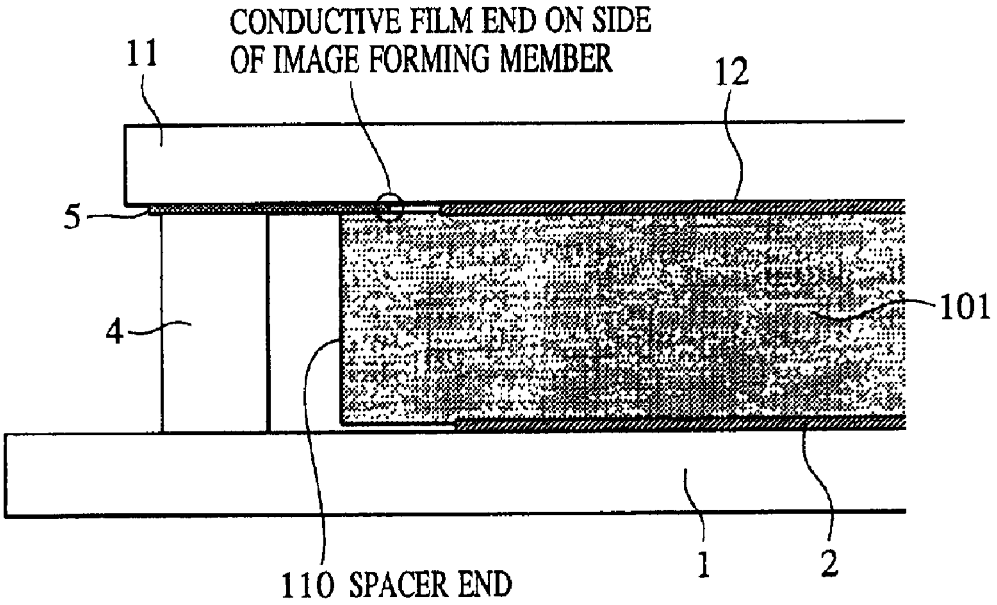
FIGS. 26B and 26C are schematic sectional views taken along lines A–A' and B–B' in FIG. 26A.
Figure 26C:
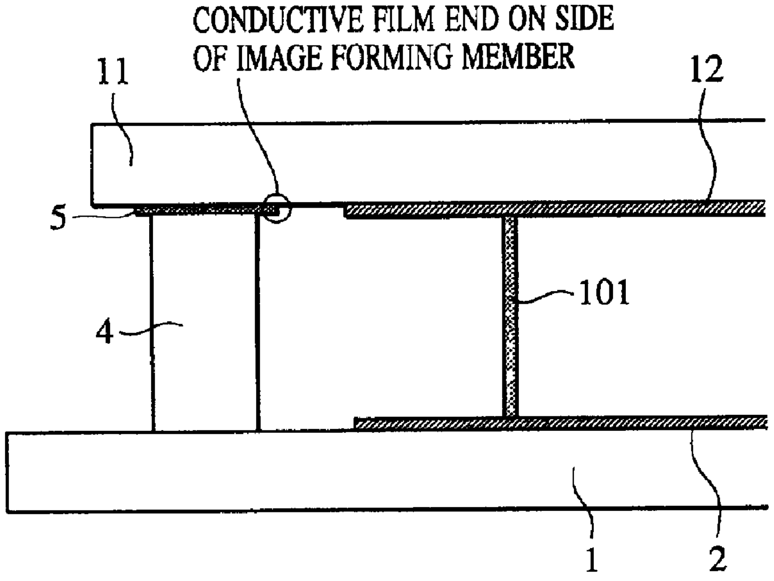

In the illustrated arrangement (FIG. 10), the conductive film 5 is arranged inside the inner periphery of the support frame 4 (but closer to the image forming member 12), and a space is provided between the film 5 and the region where the support frame 4 and the face plate 11 are joined to each other. However, the scope of the present invention also covers the arrangement (described below) wherein at least a portion of the conductive film 5 extends further towards the region where the support frame 4 and the face plate 11 are joined to each other, as shown in FIGS. 26A, 26B and 26C, for the purpose of reducing the distance between the image forming member 12 and the support frame 4. In such a case, it is preferable to employ a conductive bonding material as the material for joining the support frame 4 and the face plate 11 to each other because the bonding material and the conductive film 5 can be both formed integrally as a single member, or with the same material.

In the present invention, as shown in FIG. 10, a terminal abutment portion 6 is formed at an upper right corner of the conductive film 5 and has a relatively large width for providing easier abutment of a terminal for supplying a desired potential to the conductive film 5.

Figure 9:
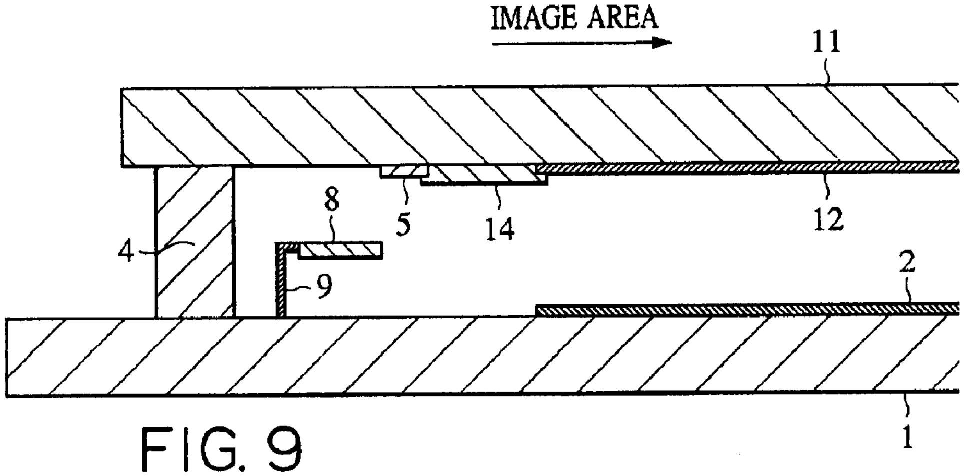
FIG. 9 is a schematic sectional view taken along line A–A' in FIG. 1, showing an image forming apparatus according to a third embodiment of the present invention.

Moreover, as shown in FIG. 9 and other ones of the drawings, in other embodiments, it is preferable in the present invention that the conductive film (first conductive film) 5 and the image forming member 12 be electrically connected to each other through a second conductive film 14.

The second conductive film 14 is preferably a film having a higher resistance than the conductive film 5.

The provision of the second conductive film 14 having the higher resistance allows a small current to flow between the image forming member 12 and the conductive film 5 having a lower resistance, thereby giving rise to a voltage drop due to a resistance value of the second conductive film 14. As a result, the potential between the image forming member 12 and the conductive film 5 can be regulated advantageously so that influences of the potential of the rear plate 1 opposing the image forming member 12, the potential of the rear surface of the face plate 11, etc. can be reduced. Accordingly, the surface discharge voltage between the conductive film 5 and the image forming member 12 can be improved.

The term "surface discharge voltage" used in this description means a voltage at which a discharge phenomenon begins to occur between two conductive members along an insulator surface. Herein, the surface discharge voltage means a voltage at which a discharge phenomenon begins to occur between the conductive film 5 and the image forming member 12.

If the sheet resistance value of the second conductive film 14 is too large, the above-described effects cannot be satisfactorily obtained. The second conductive film 14 therefore preferably has a certain level of conductivity. Conversely, if the sheet resistance value of the second conductive film 14 is too small, the current flowing between the image forming member 12 and the conductive film 5 is increased, which in turn can increase power consumption. For those reasons, the sheet resistance value of the second conductive film 14 preferably is required to be increased to such an extent that the above-described effect is not impaired. (Depending on the shape of the image forming apparatus, the sheet resistance value of the second conductive film 14 is preferably in the range of $10^7$ Ω/□ to $10^{14}$ Ω/□).

From the standpoint of ensuring a secure electrical connection, the second conductive film 14 is preferably arranged so as to cover part of the image forming member 12 and the conductive film (first conductive film) 5, as shown in FIG. 9.

Figure 22A:
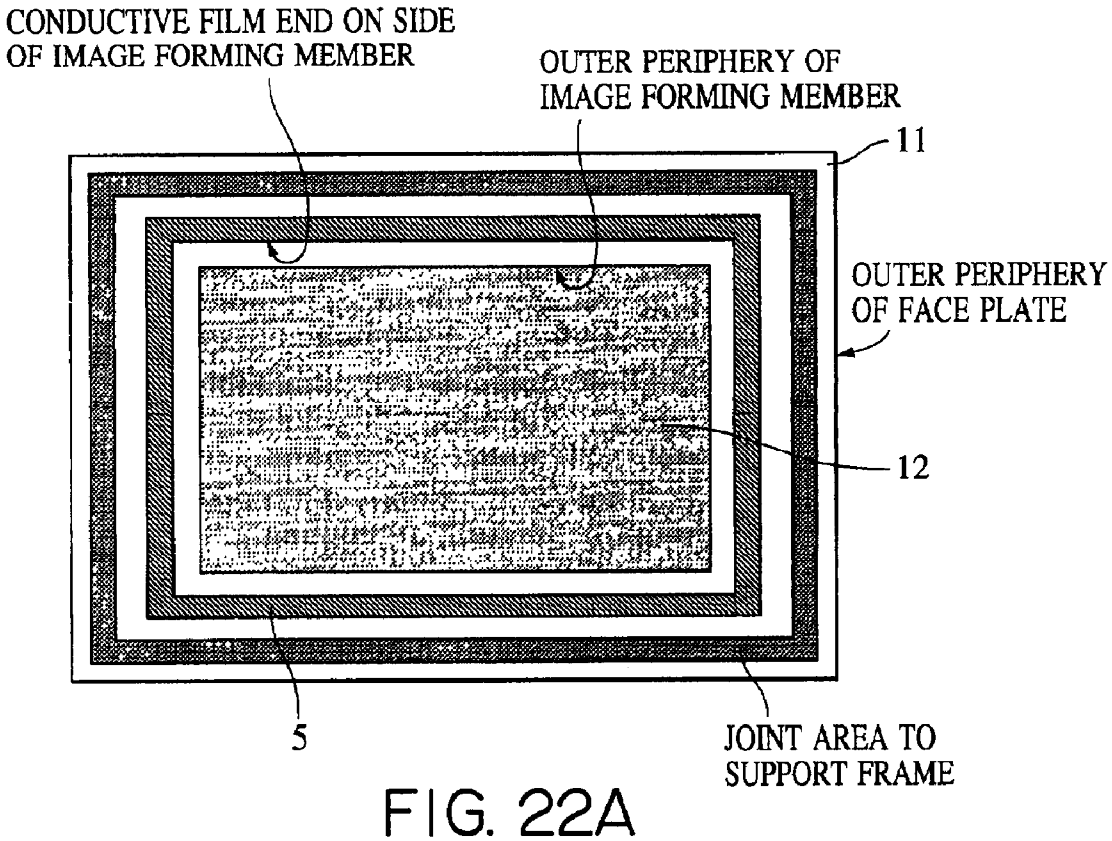
FIGS. 22A and 22B are each a schematic view of an example of a face plate in the image forming apparatus of the present invention.
Figure 22B:
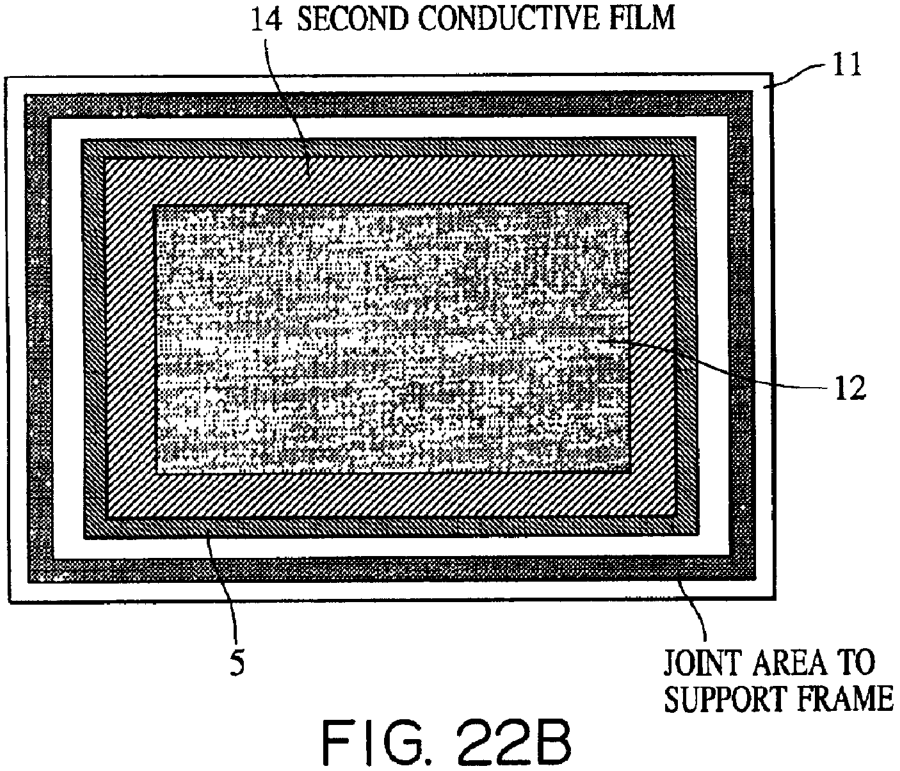

Further, as shown in FIG. 22B and other ones of the drawings, it is preferable that the spacing between the image forming member 12 and the conductive film (first conductive film) 5 be completely occupied by the second conductive film 14 so that the surface of the face plate 11 (an insulator) is not exposed. FIGS. 22A and 22B are each a schematic view of the face plate 11 as viewed from the side of the electron source area 2 (not shown in FIGS. 22A and 22B) in the image forming apparatus (airtight container 100) of the present invention. The schematic view of FIG. 22A represents the case where the second conductive film 14 is not employed, and the schematic view of FIG. 22B represents the case where the spacing between the image forming member 12 and the conductive film (first conductive film) 5 is covered with the second conductive film 14. By substantially covering the portion of the surface of the face plate 11 positioned between the image forming member 12 and conductive film (first conductive film) 5 with the second conductive film 14, the potential at the surface of the face plate 11 within the airtight container 100 advantageously can be regulated. This is particularly advantageous in further reducing the distance between the image display area (image forming member 12) and the conductive film (first conductive film) 5.

With reference to FIG. 2A, a description is now made of the reason why an electric field is enhanced on the above-mentioned structural components arranged outside the "image area", taking the getter 8 as an example, when the conductive film 5 as a feature of the present invention is not formed.

When the conductive film 5 is not formed, an average electric field at a portion a corresponding to a fore end of the getter 8 is approximately calculated as follows, ignoring the presence of the getter 8.

It is assumed that the potential of the electron source area 2 is 0 V, the potential of the image forming member 12 is Va, and the distances defined in the drawing are L1 to L5 as shown in FIG. 2A. Also, the face plate 11, the rear plate 1 and the support frame 4 are assumed to be made of the same material (soda lime glass) having the same thickness.

In this case, potentials at respective points are determined depending on a ratio between relevant surface distances. Assuming that the potential at a point b in FIG. 2A is Vb and the potential at a point c in FIG. 2A is Vc, Vb and Vc are expressed by:

$$Vb = Va \times (L2+L3+L4+L5)/(L1+L2+L3+L4+L5)$$

$$Vc = Va \times (L5)/(L1+L2+L3+L4+L5)$$

Hence, an average electric field Ea at the point a is expressed by:

$$Ea = (Vb-Vc)/L3$$

$$= Va/L3 \times (L2+L3+L4)/(L1+L2+L3+L4+L5)$$

Since Va/L3 represents the average electric field in the "image area", the point a is also subjected to an electric field that is equal to the product of (L2+L3+L4)/(L1+L2+L3+L4+L5) times the electric field in the "image area".

Assuming now that the distances L1 to L5 are all equal to one another, the electric field produced at the point a is about 60% of the electric field in the "image area".

Although the above description is made in the context of the face plate 11, the rear plate 1 and support frame 4 being made of the same material, i.e., soda lime glass, the fact that some electric field is applied to the point a is unchanged even when other materials are employed or when materials having different electrical properties (such as conductivity and dielectric constant) are used.

For example, when the face plate 11 and the rear plate 1 are made of soda lime glass and the support frame 4 is made of alkali-free glass, it is estimated that the electric field at the point a is almost equal to the electric field in the "image area".

The above-calculated Ea represents an average electric field in the container space resulting from ignoring the presence of the getter 8. When the getter 8 is disposed at the point a, the electric field at the point a is increased for two reasons explained below.

The first is an increase of the electric field (change of the potential at the point a) in a macro sense due to electrical characteristics of the getter 8. The second is an increase of the electric field in a micro sense due to the field enhancement effect resulting from a shape of the getter 8.

More specifically, as to the first reason, the electric field at the point a is increased about twofold, assuming, for example, that the getter 8 and the getter support 9 are each made of a metal and are positioned at the middle between the face plate 11 and the rear plate 1 in the direction of panel thickness.

As to the second reason, a detailed estimation is not given herein because of a difficulty in assuming a shape of the getter in practical use. Considering the presence of so-called micro-protrusions, however, it is generally thought that the electric field at the point a is increased about tenfold.

A field enhancement factor indicating a degree of the field enhancement effect resulting from a shape of the getter can be reduced by surface treatment of the getter, but the surface treatment can be disadvantageous from the standpoint of cost effectiveness.

From the above description, it is thought that the electric field enhancement at the point a has caused discharge on the getters 8.

By contrast, when the conductive film 5 as a feature of the present invention is formed and the potential of the conductive film 5 is set to the same potential, i.e., 0 V, as applied to the "electron source area" 2, an electric field is applied only at a portion Lg, shown in FIG. 2A, while the portions corresponding to L1–L5 are kept at 0 V and the electric field at the point a is also 0 V. Thus, in the construction of the present invention, the discharge voltage outside the "image area" can be determined by considering only the surface discharge voltage in the portion Lg in FIG. 2A.

That point is an important feature of the present invention, which enables a structural component to be freely arranged in a region outside the conductive film 5 (on the left side of the conductive film 5 in FIG. 2A) with no need of taking care of the discharge voltage.

With the above-described construction of the present invention, the discharge voltage outside the "image area" can be essentially increased not only for one side of the "image area" where a structural component such as the getter 8 is disposed, but also for three other sides of the "image area", although, for convenience, those sides will not be discussed in detail herein.

In other words, the above-described construction of the present invention is effective in shortening the distance between the image forming member 12 and the support frame 4, thereby reducing the size and weight of the image forming apparatus, and also is in eliminating the need of precise detail that previously had been essential for the construction of support frames and nearby components. For example, it is no longer required to pay special attention to a projection of an adhesive applied between such components as the support frame 4 and the rear plate 1, which previously had been a source of discharge.

Referring to FIG. 2B, a terminal 15 connected to ground is connected to the terminal abutment portion 6 of the conductive film 5 (not shown in greater detail in FIG. 2B). The terminal 15 preferably is formed of a rod made of a metal such as Ag or Cu.

Alternatively, a wire for connection to ground may be extended out of the side of the face plate 11.

Referring to FIG. 2C, a terminal 18 for supplying a high voltage is connected to terminal abutment portion 7 of the image forming member 12. A high voltage (anode voltage Va) is supplied to the image forming member 12 (metal back) through the terminal 18. The terminal 18 preferably is constituted by a rod made of a metal such as Ag or Cu.

Alternatively, a high-voltage wire may be extended out from the side of the rear plate 1.

A surface conductive type electron emitting device will be briefly described below.

Figure 3A:
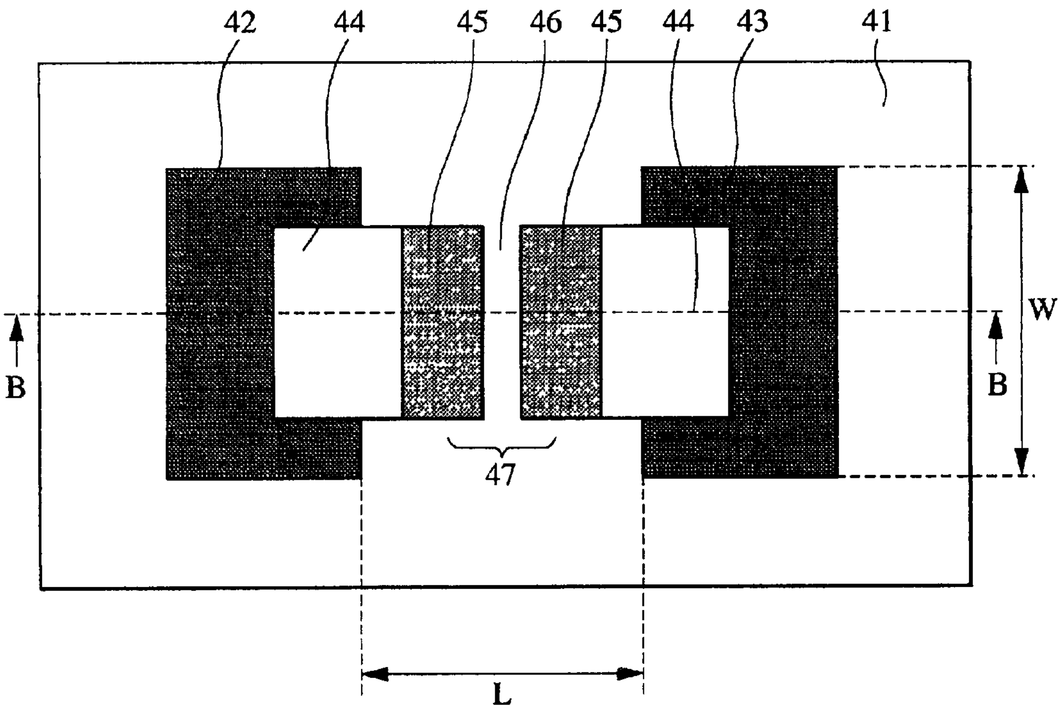
FIGS. 3A and 3B are schematic views of a surface conductive type electron emitting device used in the present invention.
Figure 3B:
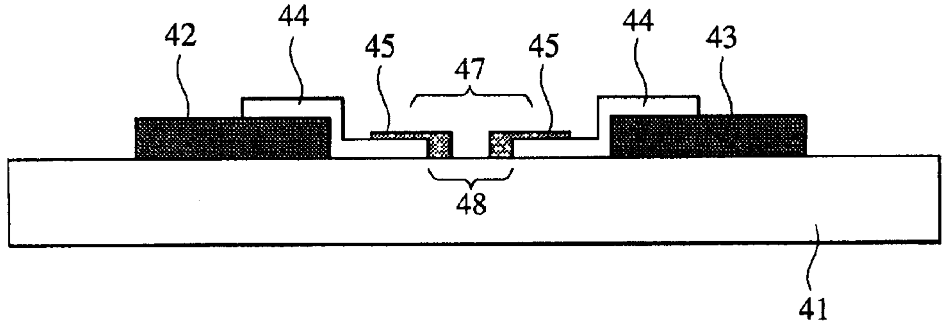

FIGS. 3A and 3B are schematic views showing one embodiment of a surface conductive type electron emitting device used in the present invention; FIG. 3A is a plan view and FIG. 3B is a sectional view.

Referring to FIGS. 3A and 3B, numeral 41 denotes a substrate on which the electron emitting device is formed, and 42, 43 denote a pair of device electrodes. Numeral 44 denotes a conductive film connected to the device electrodes, and 47 denotes an electron emitting portion. Numeral 48 (FIG. 3B) denotes a second gap formed in the conductive film 44 as a result of the "forming" process, etc. described later. Numeral 45 denotes a carbon film formed as a result of the activating process, etc. described later, and 46 denotes a first gap between a pair of carbon films 45.

Figure 4A:
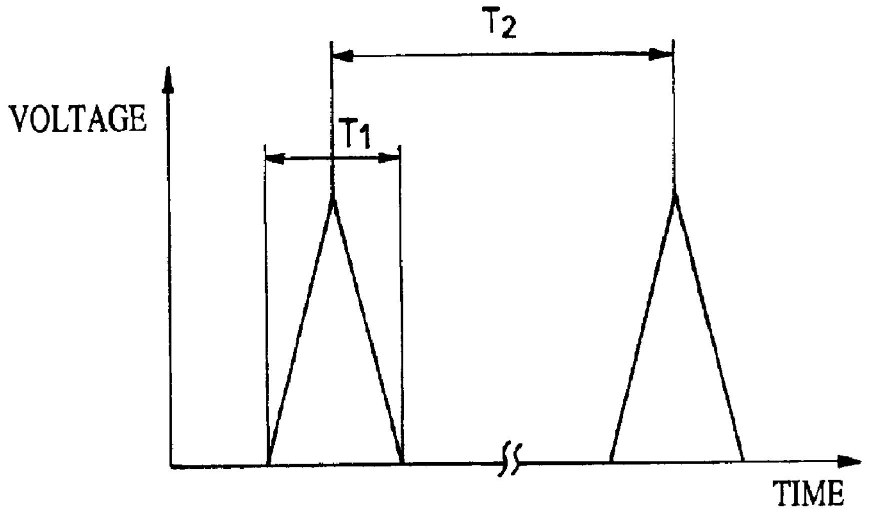
FIGS. 4A and 4B are graphs showing waveforms of pulse voltages applied for forming an electron emitting portion of the surface conductive type electron emitting device used in the present invention.
Figure 4B:
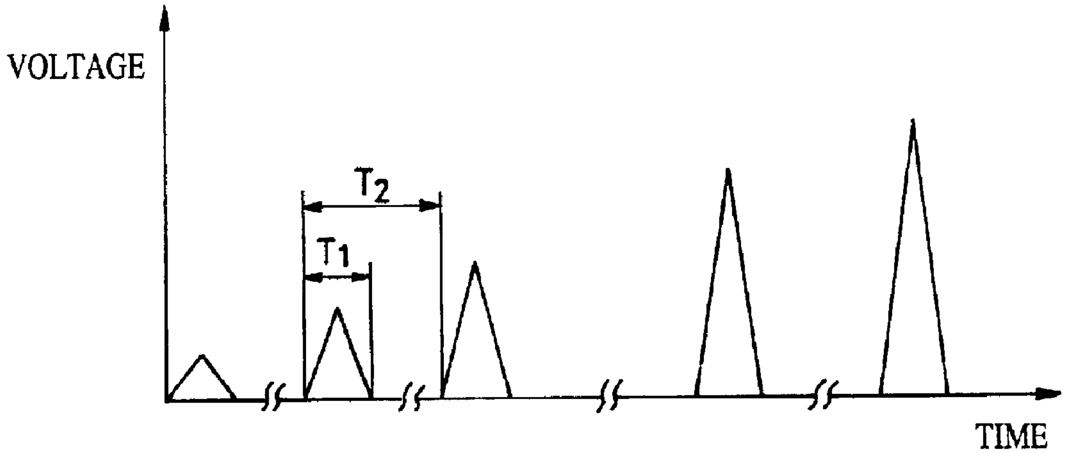

The "forming" process is performed by applying a voltage between the pair of device electrodes 42, 43. The applied voltage preferably is a pulse voltage. The pulse voltage can be applied by a method of applying a pulse voltage that has the same crest value as shown in, for example, FIG. 4A, or a method of applying a pulse voltage having a crest value that is gradually increased, as shown in FIG. 4B. Note that the pulse waveform is not limited to a triangle, but may have any other suitable form such as a rectangular wave.

After forming the second gap 48 by the "forming" process, the so-called "activating process" is performed. With the activating process, the carbon film 45 containing carbon or a carbon compound as a main ingredient is deposited on in the second gap 48 and on the conductive films 44 around the second gap by repeatedly applying the pulse voltage between the device electrodes in an atmosphere that contains an organic material. The activating process contributes to increasing both a current (device current If) flowing between the device electrodes 42, 43, and a current (emission current Ie) produced upon electron emission.

The electron emitting device thus obtained through the "forming" process and the activating process described above is then preferably subjected to a stabilizing step. This stabilizing step is a step of purging the organic material that is present in the vacuum container, particularly, in the vicinity of the electron emitting portions. An evacuation apparatus for evacuating the vacuum container is preferably one using no oil so that oil generated from the evacuation apparatus will not affect device characteristics. More practically, a sorption pump, an ion pump, etc. are usable as the vacuum apparatus.

The partial pressure of the organic material within the vacuum container preferably is maintained at a level of not higher than $1.3\times10^{-6}$ Pa, and, more preferably, not higher than $1.3\times10^{-8}$ Pa, at which carbon or a carbon compound is hardly newly deposited. When evacuating the vacuum container, it is preferable to heat the whole of the vacuum container so that organic material molecules adsorbed on an inner wall of the vacuum container and the electron emitting devices are purged with ease. Such a heating process is preferably carried out at a temperature of 80–250° C., and, more preferably, not lower than 150° C., for a time as long as necessary. The heating conditions however are not limited to those values, but may be appropriately set depending on other conditions, such as the size and shape of the vacuum container, the structure of the electron emitting devices, etc. The pressure within the vacuum container is required to be kept as low as possible, preferably at a level of not higher than $1\times10^{-5}$ Pa, and, more preferably, not higher than $1.3\times10^{-6}$ Pa.

When the device is driven after the stabilizing step, the atmosphere in the vacuum container preferably is the same as that obtained just after the end of the stabilizing step, but is not limited to that particular one. Even if the vacuum degree is slightly reduced, satisfactory stable characteristics can be maintained so long as the organic material has been sufficiently removed.

Employing the above-described atmosphere makes it possible to suppress new any depositions of carbon or a carbon compound, and to remove $H_2O$, $O_2$, etc. adsorbed on the vacuum container and the substrate. As a result, the device current If and the emission current Ie are stabilized.

Figure 5:
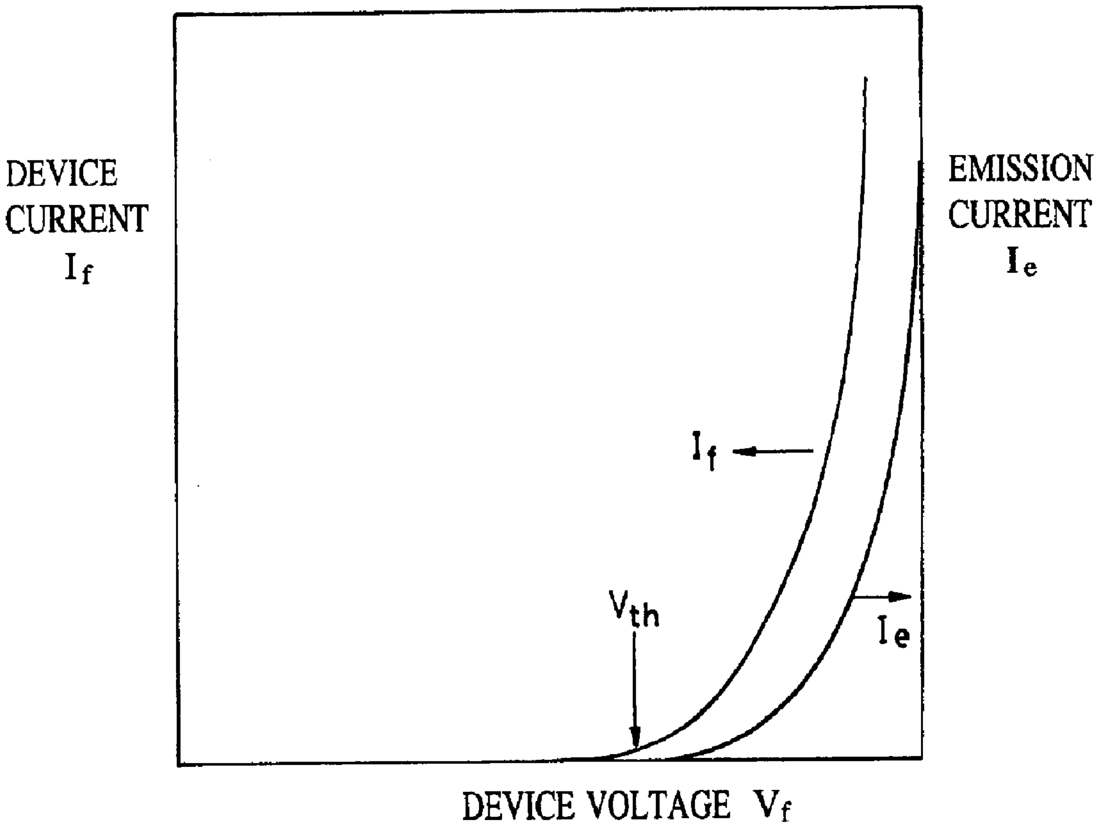
FIG. 5 is a graph showing a typical electric characteristic of the surface conductive type electron emitting device used in the present invention.

For the surface conductive type electron emitting device thus fabricated, FIG. 5 graphically shows the relationship between the voltage Vf applied to the device and each of the device current If and the emission current Ie. In FIG. 5, the vertical and horizontal axes represent values in linear scale, but in arbitrary units, because the emission current Ie is much smaller than the device current In the surface conductive type electron emitting device, as shown in FIG. 5, when the device voltage Vf higher than a certain voltage (referred to as a "threshold voltage" Vth in FIG. 5) is applied, the emission current Ie abruptly increases, but when the device voltage Vf not higher than the threshold voltage Vth is applied, the emission current Ie is hardly detected. Thus, the surface conductive type electron emitting device is a nonlinear device having the definite threshold voltage Vth with respect to the emission current Ie. Such a nonlinear characteristic can be utilized to form an image by forming wires in a matrix pattern for the electron emitting devices arrayed two-dimensionally, causing electrons to be selectively emitted from desired ones of the devices with simple matrix driving, and irradiating the electrons to the image forming member 12.

A description is now made of examples of an embodiment employing a phosphor film when a phosphor is used as the image forming member 12.

FIGS. 6A and 6B are schematic views each showing a phosphor film 51. In the case of a monochrome display, the phosphor film 51 may be made up of only a phosphor. In the case of a color display, the phosphor film 51 preferably is made up of a black member 52 called a black stripe (FIG. 6A) or a black matrix (FIG. 6B), and phosphors 53 of three primary colors RGB. The black stripe or the black matrix is provided not only in a color display, but also in a monochrome display, and basically contributes to an improvement of contrast. In a color display, in addition to an improvement of contrast, the black stripe or the black matrix serves also to make black a portion between every two of the phosphors 53 of three primary colors, thereby rendering color mixing, etc. not conspicuous. The black member 52 preferably is made of a conductive material. Any types of conductive materials which have small values of transmissivity and reflectivity for light, e.g., a material containing graphite as a main ingredient, are usable as the black member 52.

The phosphor(s) can be coated on the face plate 11 by precipitation, printing, etc., in any case of monochrome and color display.

In the case of increasing the luminance of light emitted from the phosphor (i.e., in the so-called high-acceleration voltage type), a metal back formed of a conductive film preferably is disposed on an inner surface of the phosphor film 51 (on the side facing the electron source). The metal back preferably is formed of a metal film.

Providing the metal back is intended to reflect light, which is emanated from the phosphor 53 towards the inner surface of the phosphor film 51, back towards the side of the face plate 11 by a mirror surface, thereby increasing the luminance of the emanated light, to utilize the metal back as an electrode for applying an electron beam accelerating voltage, and to protect the phosphor 53 from damage caused by impingement of negative ions generated in the container. To this end, the metal back is preferably formed of a film containing aluminum as a main ingredient.

The metal back can be fabricated by (after formation of the phosphor film) smoothing an inner surface of the phosphor film (usually called the "filming" process), and then depositing a conductive film by vacuum vapor deposition, etc.

Further, the face plate 11 may include a transparent electrode interposed between the phosphor film 51 and the face plate 11. The transparent electrode is also included in the "image forming member" 12 in some cases.

The inner space of the image forming apparatus (airtight container) 100 of the present invention having the above-described construction is maintained in a vacuum state, and electrons are selectively emitted from desired ones of the electron emitting devices by applying a scan signal and an image signal to the wires (3-1 (3-3), 3-2). The emitted electrons are forced to impinge against the image forming member 12 to which a high voltage is applied. An image forming apparatus or a display unit is thereby provided which can form a stable image with a high brightness level for a long time period.

The image forming apparatus of the present invention will be described below in more detail in connection with the following embodiments.

First Embodiment

A method of manufacturing the image forming apparatus (airtight container) of the first embodiment with reference to FIGS. 1, 2A–2C and 7A–7F.

In this embodiment, the image forming apparatus was fabricated by forming a number of surface conductive type electron emitting devices on the rear plate that serves also as a substrate, and forming wires in a matrix pattern to construct an electron source. Steps of fabricating the electron source will be described with reference to FIGS. 7A to 7F.

(Step-a): The rear plate 1 was prepared by forming a $SiO_2$ layer of 0.5 μm on the surface of a cleaned soda lime glass by sputtering. Subsequently, a circular through hole (not shown) with a diameter of 4 mm was formed in the conductive film 5 arranged in a portion of the face plate 11 between the image forming member 12 and the support frame 4 by a ultrasonic machining apparatus, thereby allowing insertion of terminal 15 (FIG. 2B) in the through hole for connection to ground potential.

Figure 7A:
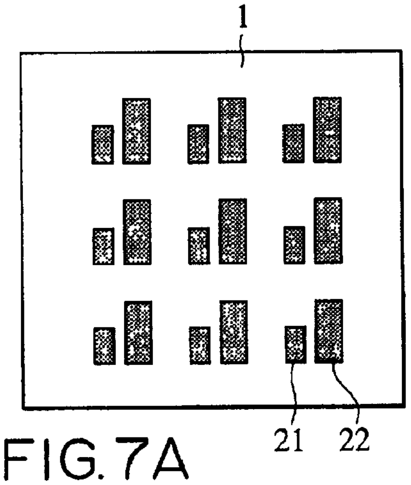
FIGS. 7A to 7F are schematic plan views showing a part of successive manufacturing steps of the image forming apparatus according to a first embodiment of the invention.
Figure 7D:
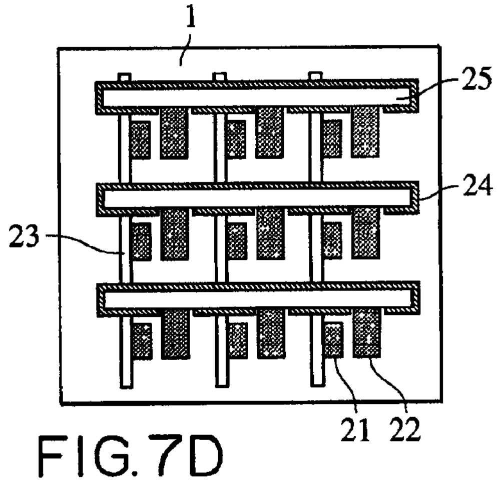

Then, the device electrodes 21 and 22 (FIGS. 7A–7F) of each surface conductive type electron emitting device were formed on the rear plate 1 by the sputter film forming process and the photolithographic process. Each electrode was of a layered structure comprising a Ti layer of 5 nm and a Ni layer of 100 nm. The spacing between the device electrodes was 2 μm (FIG. 7A).

Figure 7B:
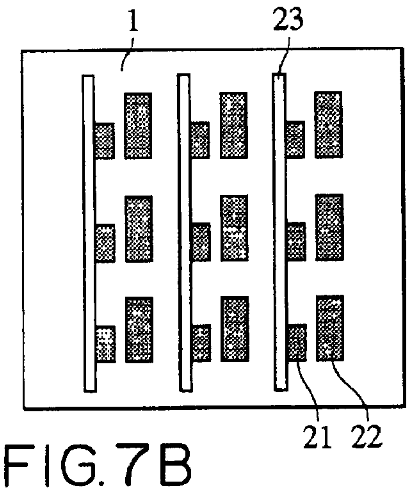

(Step-b): An Ag paste was printed in a predetermined pattern on the rear plate 1 and baked to form Y-direction wires 23. The wires 23 are extended up to the outside of the electron source area to serve as the electron source driving wires 3-2 shown in FIG. 1. The wires 23 were each 100 μm wide and about 10 μm thick (FIG. 7*b*).

Figure 7E:
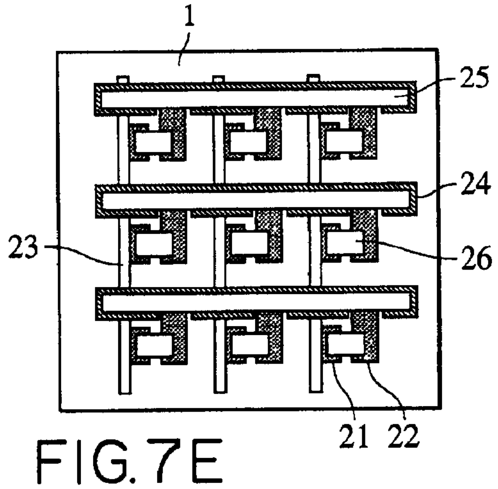
Figure 7C:
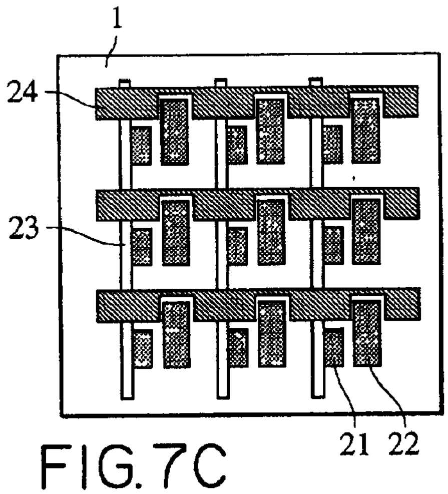
Figure 7F:
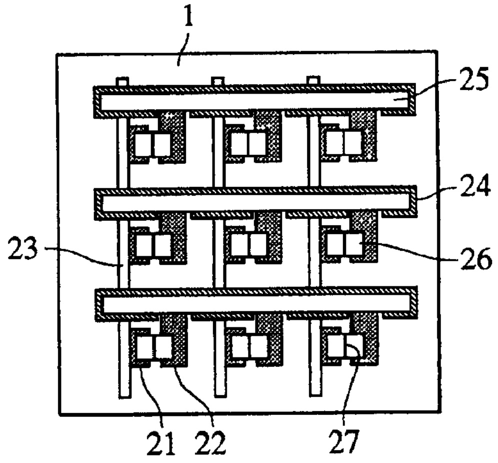

(Step-c): Insulating layers 24 were formed by similarly printing a paste containing PbO as a main ingredient and mixed with a glass binder. The insulating layers 24 were each formed with a thickness of 20 μm to electrically isolate the Y-direction wires 23 from X-direction wires 25 described later. Cutouts were formed in portions of the insulating layers 24 corresponding to device electrodes 22 to allow connection of the device electrodes 22 to the X-direction wires 25 (FIG. 7C).

(Step-d): The X-direction wires 25 were formed on the insulating layers 24 (FIG. 7D) by the same method as used for forming the Y-direction wires 23. The X-direction wires 25 were each 300 μm wide and about 10 μm thick.

(Step-e): Then, a conductive film 26 comprising PdO fine particles was formed.

The conductive film 26 was formed as follows. A Cr film was formed by the photolithographic process on the rear plate 1 having the wires 23, 25 formed thereon, and an opening corresponding to the shape of the conductive film 26 was formed in the Cr film by the photolithographic process.

(Step-e): Subsequently, a solution of an organo Pd compound (ccp-4230: made by Okuno Chemical Industires Co., Ltd.) was coated thereon and subjected to baking in air at 300° C. for 12 minutes, thereby forming a PdO fine particle film. The Cr film was then removed by wet etching to form the conductive film 26 having a predetermined pattern by lift-off (FIG. 7E).

(Step-f): A paste containing PbO as a main ingredient and mixed with a glass binder was further coated on the rear plate 1. The paste was coated on a region of the rear plate 1 except for the area in which the device electrodes 21, 22, the X- and Y-direction wires 23, and the conductive film 26 had been formed (i.e., the electron source area 2 shown in FIG. 1), that is to say, on a region where the support frame 4 is brought into contact with the rear plate 1.

(Step-g): As shown in FIGS. 1 and 2A–2C, the support frame 4 for forming a space between the rear plate 1 and the face plate 11 was joined to the rear plate 1 by using frit glass. Simultaneously, the getters 8 were fixed in place by using frit glass.

(Step-h): The face plate 11 was fabricated. As with the rear plate 1, a soda lime glass having a $SiO_2$ layer coated on the surface thereof was employed as a substrate. A through hole for connection with an evacuation tube and a through hole for insertion of the terminal 18 for applying a high voltage to the metal back were both formed in the substrate by ultrasonic machining. Subsequently, the abutment portion 7 for the terminal 18 and a wire for connecting the terminal abutment portion 7 to the metal back (formed as described below) were formed with Au by printing (FIG. 2C). The phosphor film 51 was then formed by coating the black stripes 52 and the striped phosphors 53 (not shown in FIGS. 2A–2C, 7A–7F) that jointly constitute the phosphor film 51 as shown in FIG. 6A. After carrying out the filming process on the surface of the phosphor film 51, an Al film with a thickness of about 20 nm was deposited on the phosphor film 51 and baked to form the metal back. FIG. 32 schematically shows the image forming member 12 thus fabricated. As shown in FIG. 32, an outermost periphery of the image forming member 12 in this embodiment is demarcated by an outermost periphery of the conductive black member 52 (the phosphor film 51). The metal back of Al has an area smaller than that of the black member 52 (the phosphor film 51) and is arranged inside the black member 52 (the phosphor film 51).

Further, an Au paste was printed so as to surround the metal back, and to be spaced apart from the metal back and the black member 52, and then baked to form the conductive film 5 made of Au. The conductive film 5 was 2 mm wide and about 100 μm thick, and spaced apart from the black member 52 by a distance of 20 mm.

(Step-i): The support frame 4 joined to the rear plate 1 by the bonding material was then joined to the thus-fabricated face plate 11 by using frit glass. The terminal 15 for applying the ground potential to the conductive film 5, the terminal 18 for applying a high voltage to the metal back, and the evacuation tube (not shown) were also jointed to the face plate 11 at the same time. The terminals 15, 18 were each formed of an Ag-made rod. Upon the completion of this step, the container 100 was fabricated.

In the joining step, careful positioning was made so that the electron emitting devices of the electron source were exactly aligned with the corresponding positions on the phosphor film of the face plate 11.

(Step-j): The container 100 was connected to an evacuation apparatus (not shown) through the evacuation tube (not shown) for creating a vacuum within the container 100. The "forming" process was performed at a time when the pressure within the container 100 was lowered down to a level of $10^{-4}$ Pa or less.

The "forming" process was performed by applying a pulse voltage, which had a crest value gradually increasing as schematically shown in FIG. 4B, to each of the X-direction wires (row direction wires: 3-1, 3-3) in succession. During the "forming" process, the Y-direction wires (column direction wires: 3-2) were all set to 0 V. The pulse voltage applied to the X-direction wires 3-1, 3-3 were set to have a pulse interval T2 of 10 msec and a pulse width T1 of 1 msec. Though not shown, a rectangular pulse with a crest value of 0.1 V was inserted between the pulses for the "forming" process for measurement of a current value, and a resistance value of the electron emitting devices was simultaneously measured. At the time when the resistance value per device exceeded 1 MΩ, the "forming" process for the relevant row was ended, following which the "forming" process for the next row was started. By repeating the above-described step, the "forming" process was completed for all of the rows.

(Step-k): The activating process was then carried out. Prior to starting the activating process, the container 100 was further evacuated by an ion pump (not shown) to lower the pressure down to a level of $10^{-5}$ Pa or less, while the temperature was kept at 200° C. Acetone was then introduced into the container 100. An amount of introduced acetone was adjusted such that the pressure within the container 100 was raised to a level of $1.3\times10^{-2}$ Pa. Subsequently, a pulse voltage was applied to the X-direction wires 3-1, 3-3. The pulse voltage had the waveform of a rectangular pulse with a crest value of 16 V and a pulse width of 100 μsec. The X-direction wires 3-1, 3-3 to which the pulse was applied was selected from one to the next row at intervals of 125 μsec for each pulse. By repeating such a step, the rectangular pulse was applied to all of the row direction wires 3-1, 3-3 in succession. As a result of the activating process, an electron emitting portion 27 was formed in each electron emitting device (FIG. 7F) with formation of a deposition film containing carbon as a main ingredient near the electron emitting portion of each device.

(Step-l): The container 100 was evacuated again for the stabilizing process. The evacuation was continued for 10 hours by using an ion pump while the container 100 was kept at 200° C. This step was intended to remove organic material molecules remaining in the container, and to prevent further deposition of the deposition film containing carbon as a main ingredient, thereby stabilizing an electron emission characteristic.

(Step-m): After returning the container to room temperature, the pulse voltage was applied to the X-direction wires 3-1, 3-3 in the same manner as performed in (Step-k). A voltage of 5 kV was applied to the metal back through the terminal 18, whereupon the phosphors emanated light. At this time, the terminal 15 was connected to ground, and the potential of the conductive film 5 was set to 0 V. After visually confirming the absence of any non-luminescent portion or a very dark portion, the application of the voltages to the X-direction wires 3-1, 3-3 and the metal back was stopped, and the evacuation tube (not shown) was fused under heating for sealing-off. The gettering process was then carried out under high-frequency heating, whereby the airtight container (image forming apparatus) 100 was completed.

With the image forming apparatus 100 thus manufactured, an image was displayed with a line-sequential scan by applying 5 kV to the metal back and 0 V to the conductive film 5 at the same time, while 14 V was successively applied to the X-direction wires 3-1, 3-3 connected to one electrodes of the selected electron emitting devices and 0 V was applied to the Y-direction wires 3-2 connected to the other electrodes of the selected electron emitting devices. As a result, a high quality image having a high brightness level and being free from undesired discharge could be displayed. Also, since the image forming member 12 was surrounded by the conductive film 5 in the image forming apparatus 100 of this embodiment, it was possible to shorten the distance between the image forming member 12 and the support frame 4, to noticeably increase a proportion of the "image display area" occupied in the overall size of the image forming apparatus 100, and hence to realize a weight reduction of the apparatus 100.

Second Embodiment

A second embodiment of the present invention will be described with reference to FIG. 8.

Figure 1:
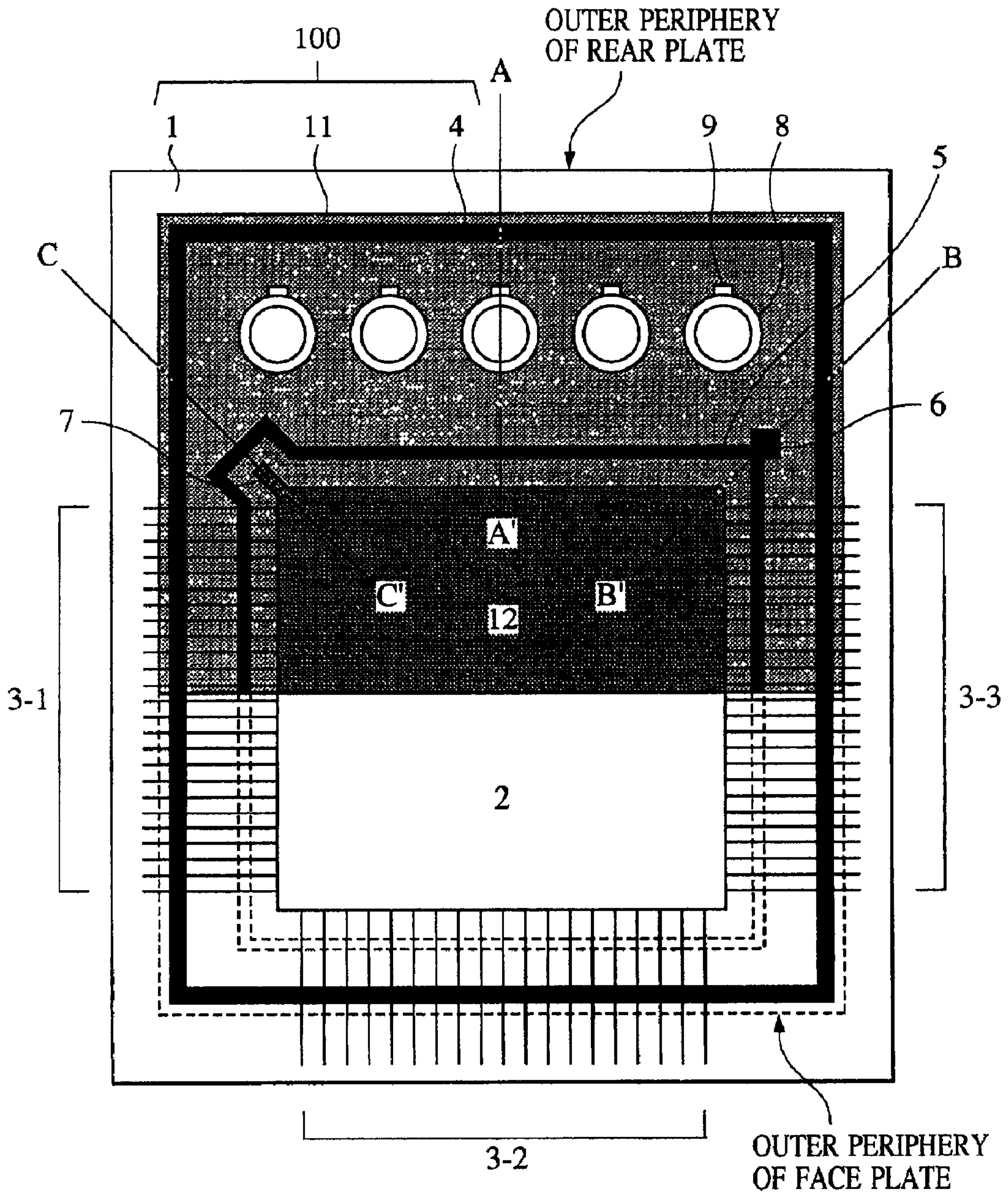
FIG. 1 is a schematic plan view showing a basic construction of an image forming apparatus according to a first embodiment of the present invention.
Figure 8:
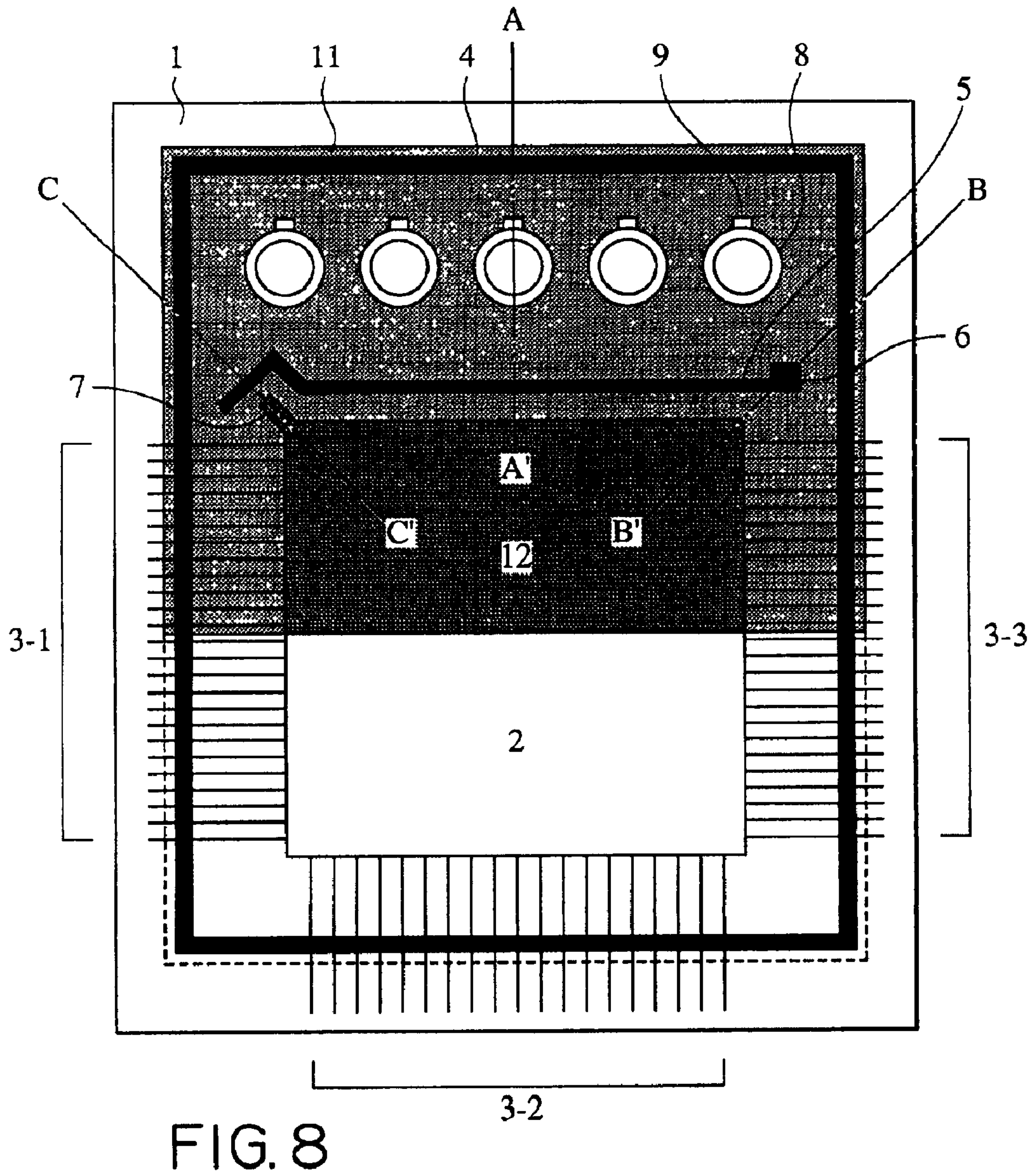
FIG. 8 is a schematic plan view showing a basic construction of an image forming apparatus according to a second embodiment of the present invention.

FIG. 8 corresponds to FIG. 1 representing the first embodiment and is a plan view schematically showing one construction of an image forming apparatus according to this second embodiment, as viewed from above a face plate 11.

The following description is made of only different points from the first embodiment.

Numeral 5 is a conductive film that is a feature of the present invention and is formed on an inner surface of the face plate 11 along only one of four sides (FIG. 8) of an image forming member 12 having substantially a rectangular shape along which getters 8 are disposed.

Thus, in this embodiment, structural components (such as the getters 8 and getter supports 9) were arranged between an end of the conductive film 5 on the side of the image forming member 12 and a support frame 4.

With such an image forming apparatus, a high quality image having a high brightness level could be displayed under suppression of discharge.

Third Embodiment

A third embodiment of the present invention will be described with reference to FIGS. 1, 6A, 6B, 9, 22A and 22B. The following description is made of only different points from the first embodiment, since the components of the first and third embodiments are otherwise similar. That is, the construction of an image forming apparatus of this third embodiment, as viewed from above a face plate 11, is as shown in FIG. 1 similarly to the first embodiment.

Also, an image forming member 12 is constructed of components as shown in one of FIGS. 6A and 6B, similarly to the first embodiment.

FIG. 9 is a schematic sectional view taken along line A–A' in FIG. 1, showing the image forming apparatus of this third embodiment. FIGS. 22A and 22B are schematic views for explaining steps of fabricating the face plate 11 in this third embodiment.

This third embodiment differs from the first embodiment in that, for the purpose of suppressing discharge, a second conductive film 14 is arranged on a portion of the surface of a face plate 11 which is between the conductive film (first conductive film) 5 and (a conductive black member 52 defining) an outermost periphery of an image forming member 12 .

Materials of the second conductive film 14 are not particularly limited so long as the materials provide a predetermined sheet resistance value and have sufficient stability. For example, a film including graphite particles dispersed therein at an appropriate density is usable. Such a film is so thin that, even when the film is formed on the metal back of the image forming member 12, it will not bring about an adverse effect to such an extent as reducing the number of electrons reaching a phosphor and contributing to emanation of light from the phosphor.

The face plate 11 of this embodiment was fabricated as follows. First, the image forming member 12 was formed on a substrate 11, as shown in FIG. 22A, through a step similar to (Step-h) described above in connection with the first embodiment. Then, the conductive film (first conductive film) 5 was formed to surround the image forming member 12 in the shape of a closed loop (in which both ends of one continuous conductive film were connected to each other). The conductive film 5 was formed in a spaced relation from both the support frame 4 and the image forming member 12.

Subsequently, the second conductive film 14 was formed (FIG. 22B). The second conductive film 14 was arranged so as to fill the spacing between the image forming member 12 and the conductive film (first conductive film) 5. In this embodiment, the second conductive film 14 was formed by spray coating a carbon particle dispersed solution and drying the coated solution. The second conductive film 14 formed in this embodiment had a sheet resistance value of about $10^{11}$ Ω/□.

With the above-described steps, the image forming member 12 (conductive black member 52) and the conductive film (first conductive film) 5 are interconnected through the second conductive film 14. The second conductive film 14 is preferably arranged to cover parts of both the image forming member 12 and the conductive film (first conductive film) 5 from the standpoint of ensuring electrical connection. Also, in this embodiment, the spacing between the image forming member 12 and the conductive film (first conductive film) 5 is completely occupied by the second conductive film 14 such that the surface of the face plate 11 as an insulator is not exposed. For further reducing the distance between the image forming member 12 and the conductive film (first conductive film) 5, it is especially preferable to, as described above, substantially totally cover a portion of the surface of a face plate 11 which is positioned between the image forming member 12 and the conductive film (first conductive film) 5.

The image forming apparatus of this embodiment was driven by applying 10 kV to the metal back and 0 V to the conductive film (first conductive film) 5. As a result, a stable image with a very high brightness level was displayed for a long period. Also, a high quality image being free from discharge could be displayed even with the distance between the conductive film (first conductive film) 5 and the image forming member 12 reduced to 10 mm.

The reasons why the second conductive film 14 in this embodiment contributes to essentially improving the surface voltage discharge will be described below.

In an image forming apparatus using an electron source, part of electron beams is scattered in the image display area or directly impinges against an inner wall of a vacuum container outside the image display area, whereby secondary electrons are produced and charged up increasingly. Such a charge-up of the secondary electrons may cause discharge sometimes.

The second conductive film 14 is effective in purging the charges present on the surface of the face plate 11 which is exposed in the spacing between the conductive film (first conductive film) 5 and the image forming member 12. With this effect, the surface discharge voltage in the spacing between the conductive film 5 and the image forming member 12 can be improved.

Further, in the face plate structure (FIG. 22A) of the first embodiment, the potential on the surface of the face plate 11 exposed in the spacing between the conductive film 5 and the image forming member 12 is sometimes affected by the potential of the image forming member 12, the potential of the conductive film 5, the surface potential of the rear plate 1 in an opposite relation to the face plate 11, and the potential on a rear surface of the face plate 11 (surface on the side where the image forming member 12 is not disposed). In such a case, the potential distribution on the surface of the face plate 11 exposed in the spacing between the conductive film 5 and the image forming member 12 may not be evenly divided and may produce a point at which an electric field tends to enhance.

By providing the second conductive film 14 having a high resistance as implemented in this embodiment, a small current flows between the image forming member 12 and the conductive film 5 to cause a voltage drop due to the resistance value of the second conductive film 14. As a result, the potential between the image forming member 12 and the conductive film 5 is regulated advantageously and can be less affected by the potential of the rear plate 1 in an opposite relation to the face plate 11, the potential on the rear surface of the face plate 11, etc. Accordingly, the surface discharge voltage in the spacing between the conductive film 5 and the image forming member 12 can be improved.

If the sheet resistance value of the second conductive film 14 is too large, the above-described effect cannot be satisfactorily obtained. The second conductive film 14 is therefore required to have a certain level of conductivity. Conversely, if the sheet resistance value of the second conductive film 14 is too small, the current flowing between the image forming member 12 and the conductive film 5 is increased, which in turn increases power consumption. For those reasons, the sheet resistance value of the second conductive film 14 is required to be increased to such an extent that the above-described effect is not impaired. Though depending on the shape of the image forming apparatus, the sheet resistance value of the second conductive film 14 is preferably in the range of $10^7$ Ω/□ to $10^{14}$ Ω/□.

Fourth Embodiment

A fourth embodiment of the present invention will mow be described. An image forming apparatus of this fourth embodiment is constructed basically in the same manner as that of the first embodiment, and thus the portions of the fourth embodiment which are the same as those in the first embodiment will not be further described in detail herein. However, while the potential applied to the conductive film 5 is 0 V, i.e., the lowest one of the potentials applied to the electron source, in the first embodiment, an any desired potential between the potential (0 V) of the electron source area 2 and the electron accelerating voltage Va at the image forming member 12 (the potential Va (V) applied to the metal back) is applied to the conductive film 5 in this fourth embodiment.

More specifically, the electron accelerating voltage Va (difference between the potential applied to the image forming member 12 and the potential applied to the electron source area 2) is distributed at any desired proportion into the voltage between the image forming member 12 and the conductive film 5 and the voltage between the conductive film 5 and the electron source area 2. By setting the voltage between the conductive film 5 and the electron source area 2 to be greater than the voltage between the image forming member 12 and the conductive film 5 on that occasion, the discharge voltage can be improved as a whole. The reason is that the potential applied to a structural component arranged outside the image area can be effectively reduced, as described above, by forming the conductive film 5 on the face plate 11 and setting the potential applied to the conductive film 5 to be lower than that applied to the image forming member 12 (practically a level equal to or somewhat higher than the potential applied to the electron source area 2).

In the construction of this embodiment, a potential difference between the image forming member 12 and the conductive film 5 is reduced as compared with the case of setting the potential of the conductive film 5 to 0 V. The intensity of a produced electric field is also reduced, and therefore the distance Lg in FIG. 2A can be shortened correspondingly.

More specifically, when the potential of the conductive film 5 was set to ½ Va in this embodiment, it was possible to shorten the distance Lg to 100 mm and realize a high quality image display in which the occurrence of discharge was suppressed, as with the first embodiment.

Preferably, the potential applied to the conductive film 5 is supplied from a power supply (not shown) for the image forming member 12 through an externally-mounted resistance dividing circuit (not shown). Alternatively, the potential of the conductive film 5 may be applied through a capacity dividing circuit (not shown) or from another power supply (not shown).

Moreover, by providing the second conductive film 14, which is effective to suppress a charge-up, between the image forming member 12 and the conductive film 5 as with the third embodiment, the distance Lg can be further shortened and a greater reduction in size and weight can be achieved.

Additionally, the distances L2 to L5 can be shortened and an even greater reduction in size and weight can be achieved by providing a third conductive film having a high resistance, which is similar to the second conductive film 14, on a portion (L2 in FIG. 2A) of the face plate 11 between the conductive film 5 and the electron source area 2, the support frame 4 (L3 in FIG. 2A), and the rear plate 1 (L4 and L5 in FIG. 2A). In this case, an even more remarkable effect is obtained by coating a fourth conductive film having a high resistance, which is similar to the second conductive film 14, on other structural components disposed in portions covered by L2 to L5, such as getters.

Fifth Embodiment

A fifth embodiment of the present invention will now be described.

FIG. 10 is a plan view schematically showing the construction of an image forming apparatus (airtight container) 100 according to this fifth embodiment, as viewed from above a face plate 11, with a lower half of the face plate 11 omitted for the sake of explanation. FIG. 11 is a partial schematic sectional view taken along line D–D' in FIG. 10.

This fifth embodiment differs from the first embodiment, shown in FIG. 1, in providing spacers 101 and spacer supports 102. Otherwise, the construction in this embodiment is the same as that shown in FIG. 1.

The spacers 101 are often required when the size of the image forming apparatus is increased, or when a face plate 11 and a rear plate 1 are thinned.

Since the spacers 101 are arranged, as described above, in the "image area" where a high electric field is applied, various approaches are employed to suppress discharge occurred along the spacer surfaces.

In this embodiment, each spacer 101 preferably is formed of a thin glass sheet having a conductive film formed on its surface beforehand to suppress a charge-up. The spacer 101 is bonded by an inorganic adhesive to the spacer support 102 made of alumina. Thereafter, in (Step-i) described above in connection with the first embodiment, the spacers 101 and the spacer supports 102 are joined together with the rear plate 1 and the face plate 11.

Numeral 5 represents a conductive film that is a feature of the present invention and is formed on an inner surface of the face plate 11 to surround an image forming member 12. Also, as shown in FIGS. 10 and 11, the length of the spacer 101 in the longitudinal direction thereof is greater than that of the image forming member 12 ("electron source area" 2) in the same longitudinal direction. Furthermore, ends 110 of the spacers 101 and the spacer supports 102 each are arranged on the side of the support frame 4 between that frame 4 and a plane in which an end of the conductive film 5 extends (perpendicularly to the rear plate 1).

With the image forming apparatus thus manufactured, a high quality image having a high brightness level and being free from discharge, can be displayed regardless of the shape of the spacer support 102.

The reason for this advantageous result is exactly the same as that for which the discharge voltage at the getter portions is improved in the first embodiment; that is, an electric field imposed on the spacer support 102 is minimized in the above-described arrangement.

As a matter of course, the constructions of the second to fourth embodiments resulting from modifying the first embodiment are likewise applicable to this fifth embodiment.

More specifically, this fifth embodiment can also be constructed such that (1) the conductive film 5 is not formed along a side of the image forming member 12 along which there are no other structural components outside the "image area", (2) the second conductive film 14 having a high resistance is formed between the conductive film 5 and the image forming member 12, and (3) the potential of the conductive film 5 is regulated to any desired value between the potential applied to the image forming member 12 and the potential applied to the "electron source area" 2.

The construction of (2), wherein the second conductive film having a high resistance is formed in a portion of the face plate 11 between the image forming member 12 and the conductive film 5, is effective in reducing the size and weight of the image forming apparatus. Also, providing a third conductive film having a high resistance on a surface of the support frame 4 between the conductive film 5 and the electron source area 2 is similarly effective in reducing the size and weight of the image forming apparatus. Further, it is more effective to coat a fourth conductive film having a high resistance on other structural components arranged between the "image area" and the support frame 4, such as on the spacer supports 102.

Sixth Embodiment

Figure 23:
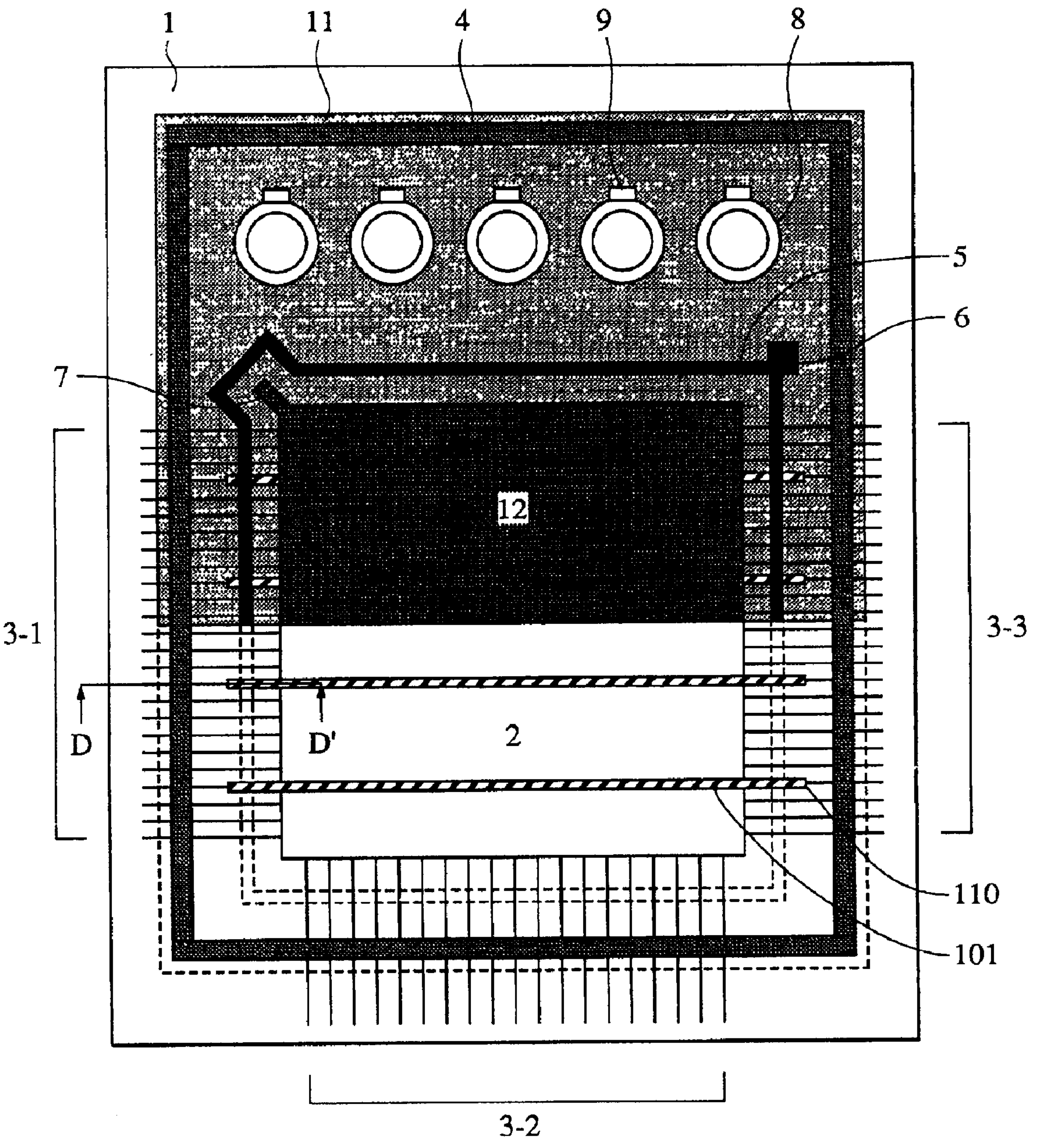
FIG. 23 is a schematic perspective view of the image forming apparatus according to the sixth embodiment of the present invention.

An image forming apparatus according to this sixth embodiment will be described with reference to FIGS. 21, 23 and 24. FIG. 23 is a plan view schematically showing the construction of an image forming apparatus (airtight container) 100 of this sixth embodiment, as viewed from above a face plate 11.

In FIG. 23, a lower portion of the face plate 11 is omitted for the sake of convenience. FIG. 21 is a perspective view of the image forming apparatus (airtight container) 100 of this sixth embodiment with part of some components omitted for the sake of convenience.

Figure 21:
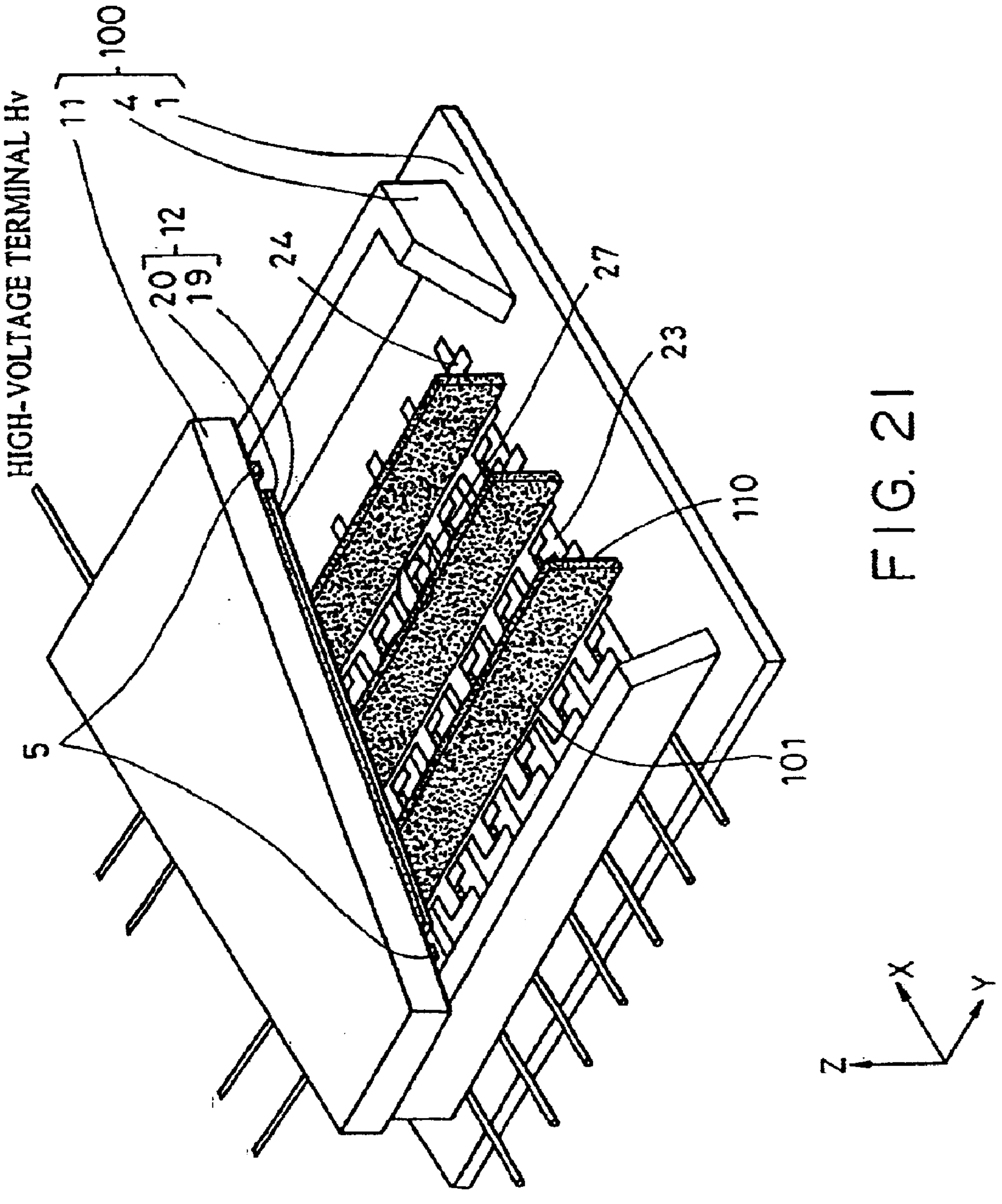
FIG. 21 is a schematic perspective view of an image forming apparatus according to a sixth embodiment of the present invention.
Figure 24:
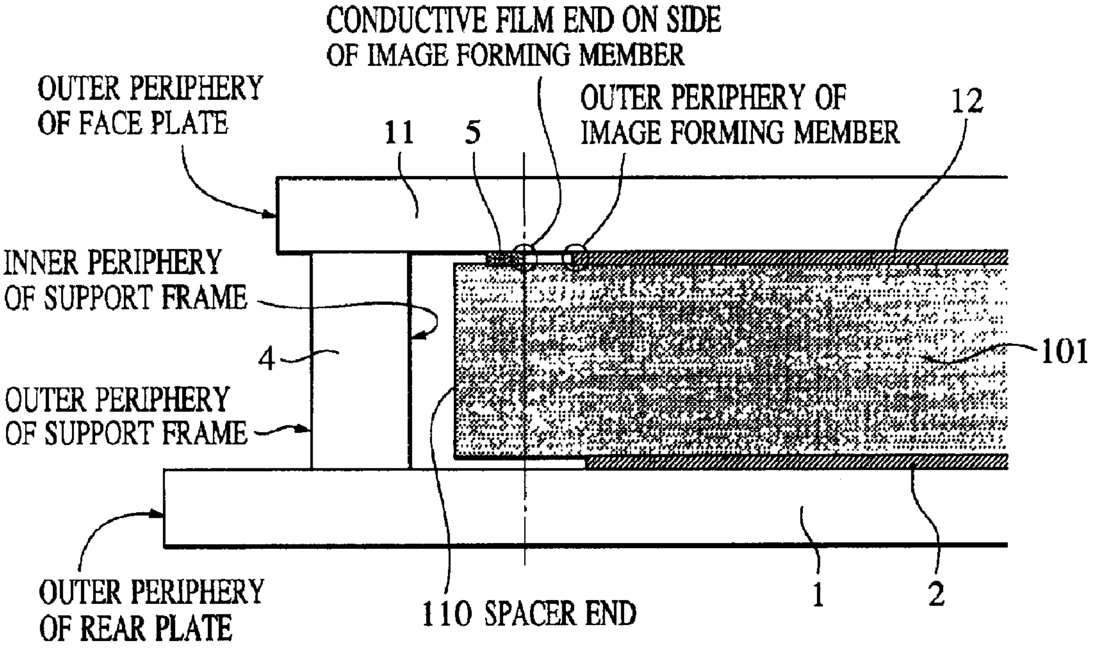
FIG. 24 is a schematic sectional view, taken along line D–D' in FIG. 23, of the image forming apparatus according to the sixth embodiment of the present invention.

In FIGS. 21, 23 and 24, the same numerals denote the same components. Numeral 11 denotes a face plate comprised of glass, and 12 denotes an image forming member comprised of a phosphor film 20 and a metal back 19. Numeral 4 denotes a support frame, 1 denotes a rear plate, and 2 (FIGS. 23 and 24) denotes an electron source area. Numeral 101 denotes a spacer, and 3-1, 3-2, 3-3 denote extended wires. Numeral 9 denotes a member for supporting a getter 8, and 7 denotes a terminal connecting (abutment) portion to which a terminal for applying a potential to the metal back 19 is connected.

Numeral 5 denotes a conductive film that is a feature of the present invention. The conductive film 5 preferably is a low-resistance film and completely surrounds an outer periphery of the image forming member 12 in the form of a closed loop (in which both ends of one continuous conductive film are connected to each other). Numeral 6 denotes a terminal connecting (abutment) portion to which a terminal for applying a desired potential to the conductive film 5 is connected.

Also, as shown in FIGS. 23 and 24, the length of the spacer 101 in the longitudinal direction thereof is greater than that of the image forming member 12 in the same longitudinal direction. Furthermore, each end 110 of the spacer 101 is arranged between the conductive film 5 and the support frame 4. In other words, the spacer end 110 is arranged between a plane (one-dot-chain line in FIG. 24), through which extends an end of the conductive film 5 on the side of the image forming member 12 and which is substantially perpendicular to a principal surface of the face plate 11 (principal surface thereof on which the image forming member is arranged), and an inner periphery of the support frame 4.

A number of electron emitting devices are arranged in an array configuration in the electron source area 2 and are connected to both row direction wires (3-1, 3-3) and column direction wires (3-2). Electrons can be selectively emitted from desired ones of electron emitting devices by applying 14 V to wires connected to selected electron emitting devices and 0 V to the other wires connected to them. In this embodiment, surface conductive type electron emitting devices preferably are used as the electron emitting devices, although other suitable types of electron emitting devices also may be employed.

The spacer 101 in this embodiment is fabricated by coating a conductive film having a high resistance on the surface of a spacer base member formed of a plate-like glass. The spacer 101 is fixed to the rear plate 1 by a bonding material outside the image area in this embodiment.

FIG. 24 is a schematic sectional view taken along line D–D' in FIG. 23.

The image forming apparatus (airtight container) 100 of this embodiment was driven by setting the potential of the metal back 19 to 9 kV and the potential of the conductive film 5 to 0 V. As a result, a high quality image having a high brightness level and being free from discharge could be displayed for a long time period regardless of the shape of the end 110 of the spacer 101.

The reason for this advantageous result is that the intensity of an electric field imposed on the end 110 of the spacer 101 is noticeably reduced by applying, to the conductive film 5, a potential lower than that applied to the image forming member 12. Stated otherwise, preferably in this embodiment, 14 V is applied to the row direction wires (3-1, 3-3) and 0 V is applied to the column direction wires (3-2) for causing an emitting of electrons from the selected electron emitting device(s). In this embodiment, therefore, the same potential, i.e., 0 V, as that applied to the electron source area 2 preferably is applied to the conductive film 5 for reducing the intensity of an electric field imposed on the end 110 of the spacer 101.

In this and other foregoing embodiments, the end 110 of the spacer 101 was illustrated, by way of example, as having an end surface substantially perpendicular to both the rear plate 1 and the face plate 11, as shown in FIG. 24.

Figure 25:
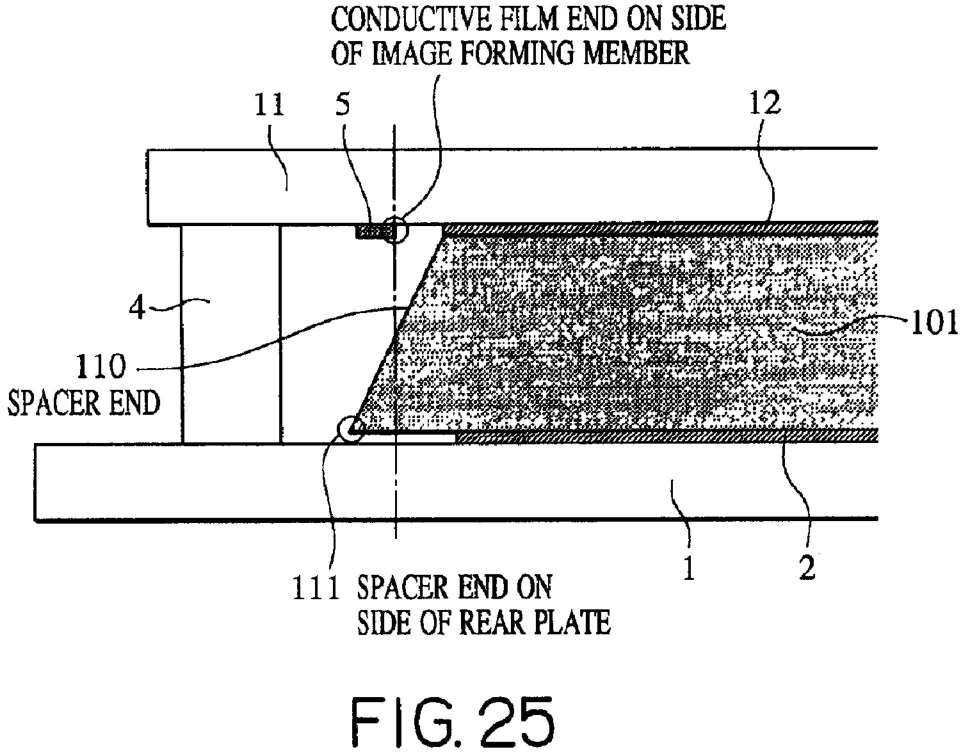
FIG. 25 is a schematic sectional view of one modification of the image forming apparatus to which the present invention is applicable.

However, the present invention is also satisfactorily applicable to a case where the spacer end 110 is slanted relative to both the rear plate 1 and the face plate 11, as shown in FIG. 25.

In the case where the spacer end 110 is slanted as shown in FIG. 25, the advantage of the present invention can be obtained so long as at least an edge 111 of the spacer on the side of the rear plate is arranged between a plane (one-dot-chain line in FIG. 25) in which extends an end of the conductive film 5 on the side of the image forming member 12 (the plane being substantially perpendicular to a principal surface of the face plate 11 (principal surface thereof on which the image forming member 12 is arranged)), and an inner periphery of the support frame 4.

Seventh Embodiment

An image forming apparatus according to this seventh embodiment will be described in detail with reference to FIGS. 26A, 26B, 26C and 29A. This seventh embodiment is directed to a display having an image display area in a relatively elongate rectangular form with an aspect ratio of 16:9.

Figure 29A:
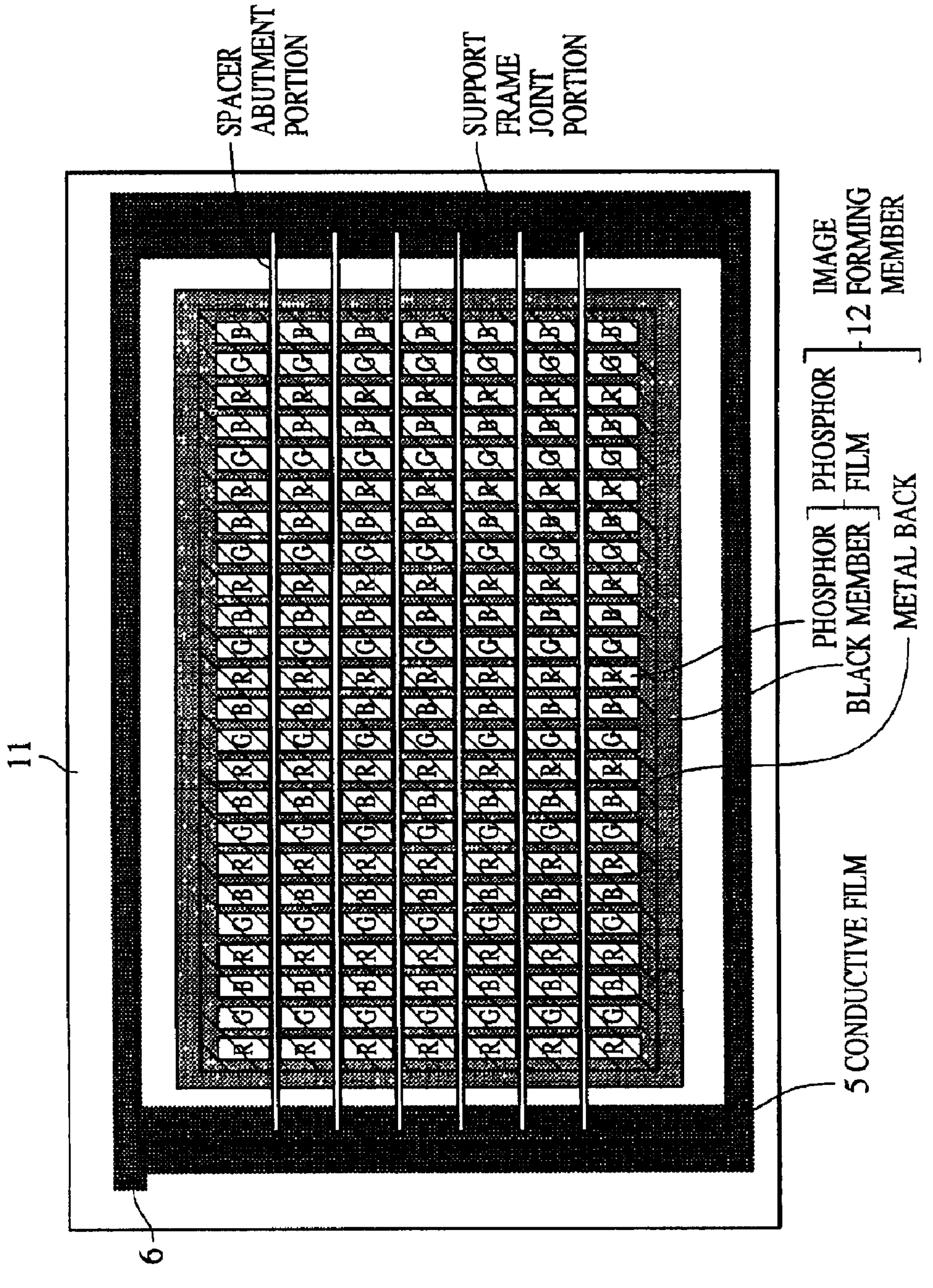
FIGS. 29A and 29B are schematic views showing examples of a face plate in the image forming apparatus according to the seventh embodiment of the present invention.

FIG. 26A is a plan view schematically showing the construction of an image forming apparatus (airtight container) 100 of this embodiment, as viewed from above a face plate 11, with a lower portion of the face plate 11 omitted for the sake of convenience. FIG. 26B is a schematic sectional view taken along line A–A' in FIG. 26A. FIG. 26C is a schematic sectional view taken along line B–B' in FIG. 26A. FIG. 29A is a schematic view of the face plate 11 as viewed from the side of an electron source area 2.

In those drawings, numeral 1 denotes a rear plate, 2 denotes the electron source area, and 3-1, 3-2 denote wires connected to electron emitting devices arranged in arranged in an array configuration in the electron source area 2. Numeral 4 denotes a support frame, and 5 denotes a conductive film. Numeral 6 (FIG. 26A) denotes a terminal connecting (abutment) portion through which a desired potential is applied to the conductive film 5. Numeral 11 denotes a face plate and 12 denotes an image forming member arranged on the face plate 11. Numeral 101 denotes a spacer and 110 denotes a spacer end.

In this embodiment, the image forming member 12 comprises, as shown in FIG. 29A, a phosphor film made up of phosphors of three primary colors (RGB) and a conductive black member, and a metal back (hatched area in FIG. 29A) made of aluminum and arranged on the phosphor film (on its surface facing the electron source area 2). Further, getters preferably are arranged on a surface of the metal back facing the electron source area 2 (for convenience, the getters are not shown in FIGS. 26A–26C and 29A). A region surrounded by one-dot-chain lines (FIGS. 26A and 29A) represents a joint portion between the support frame 4 (joining member) and the face plate 11.

Figure 13:
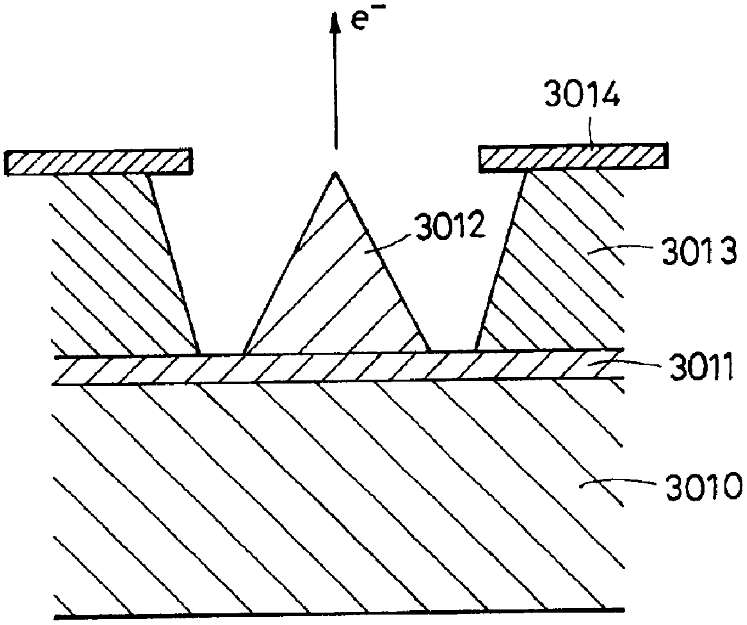
FIG. 13 is a schematic sectional view showing one example of a conventional FE type electron emitting device.
Figure 14:
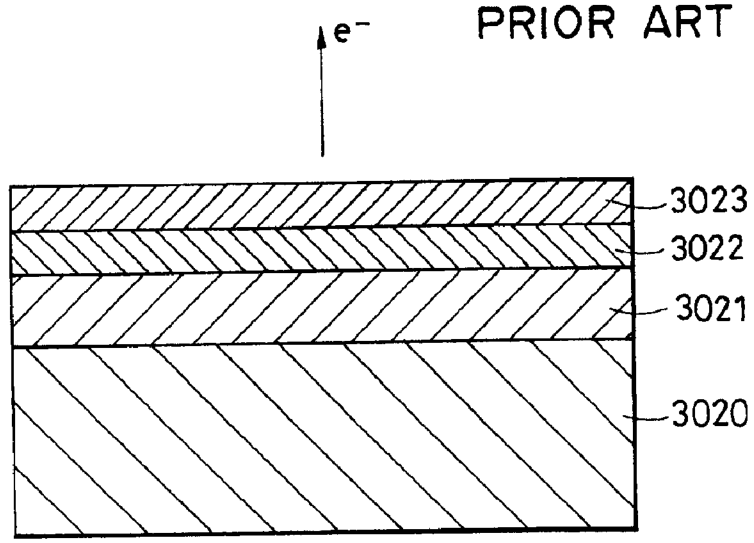
FIG. 14 is a schematic sectional view showing one example of a conventional MIM type electron emitting device.
Figure 15:
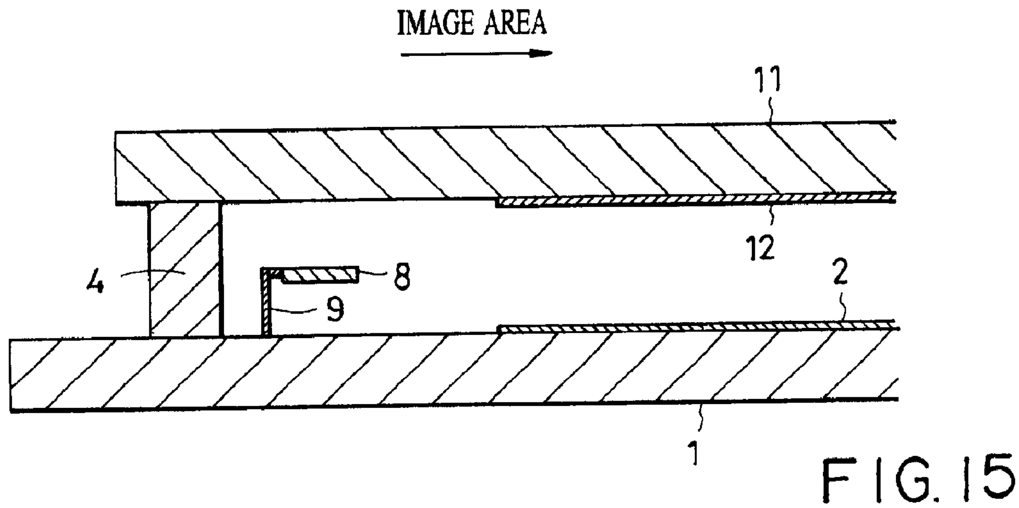
FIG. 15 is a schematic sectional view showing a getter and the surroundings thereof in a conventional image forming apparatus.
Figure 16:
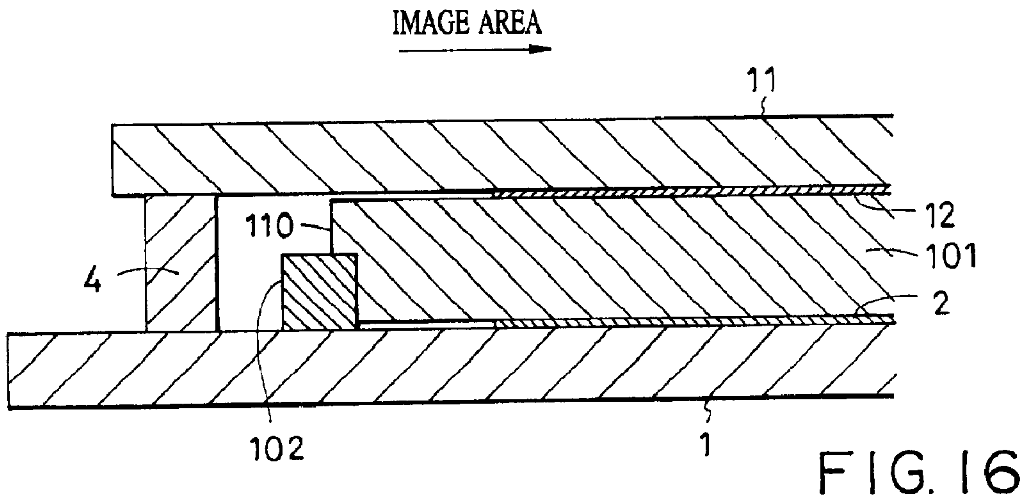
FIG. 16 is a schematic sectional view showing a spacer support and the surroundings thereof in a conventional image forming apparatus.
Figure 17:
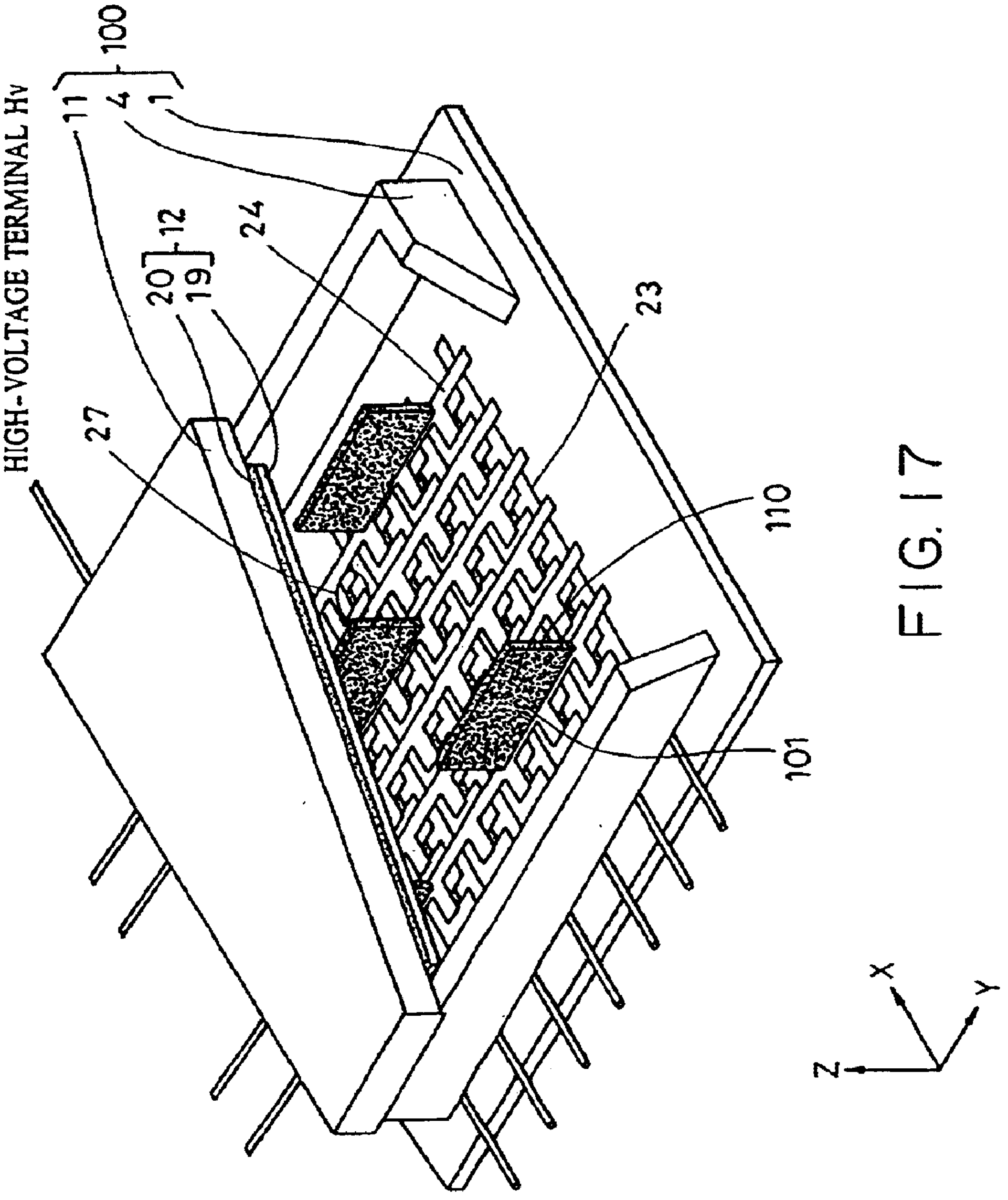
FIG. 17 is a schematic perspective view of one conventional image forming apparatus.
Figure 18:
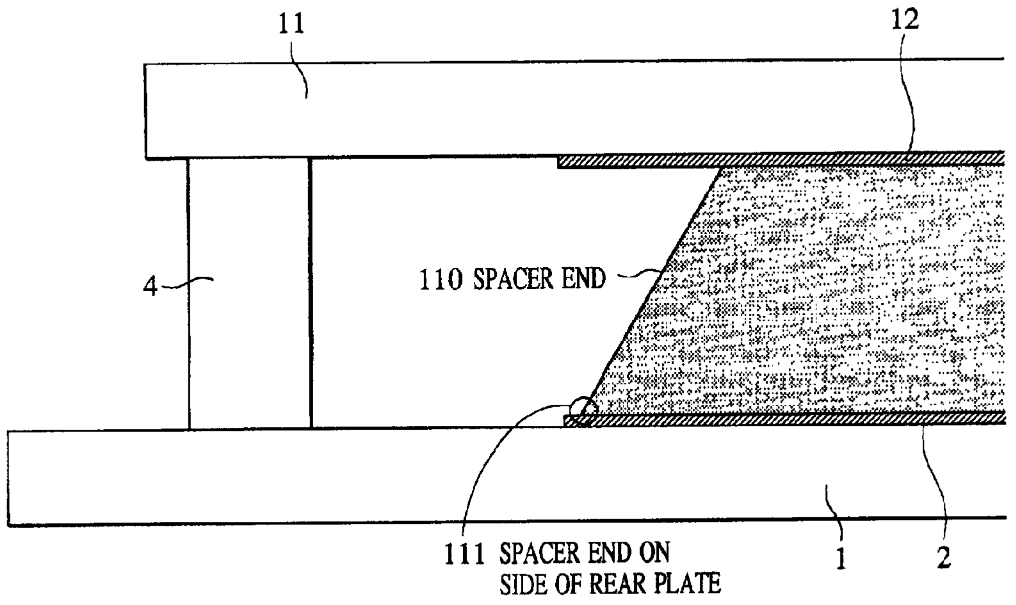
FIG. 18 is a schematic view for explaining a problem to be overcome by the present invention.
Figure 19:
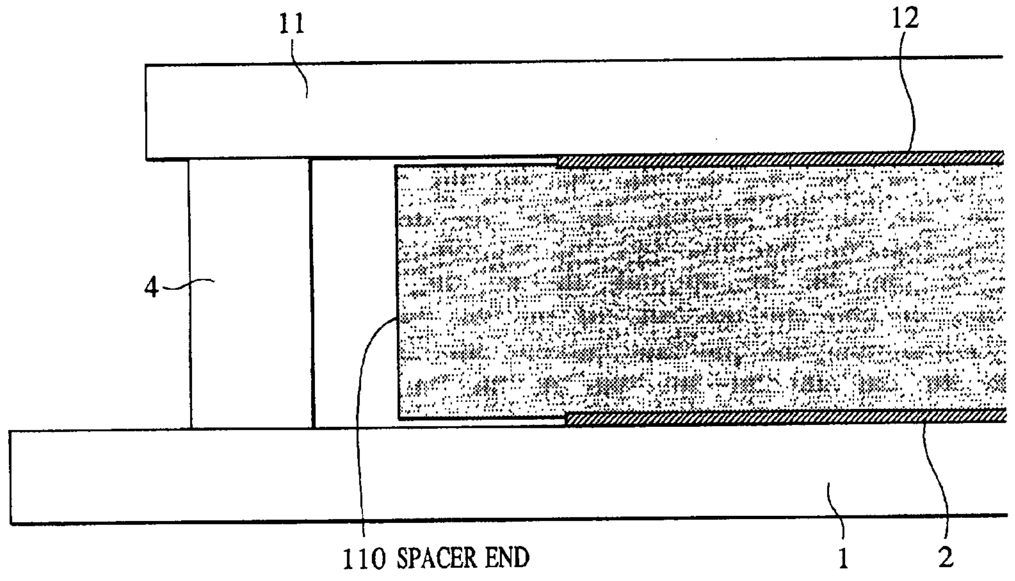
FIG. 19 is another schematic view for explaining a problem to be overcome by the present invention.
Figure 20:
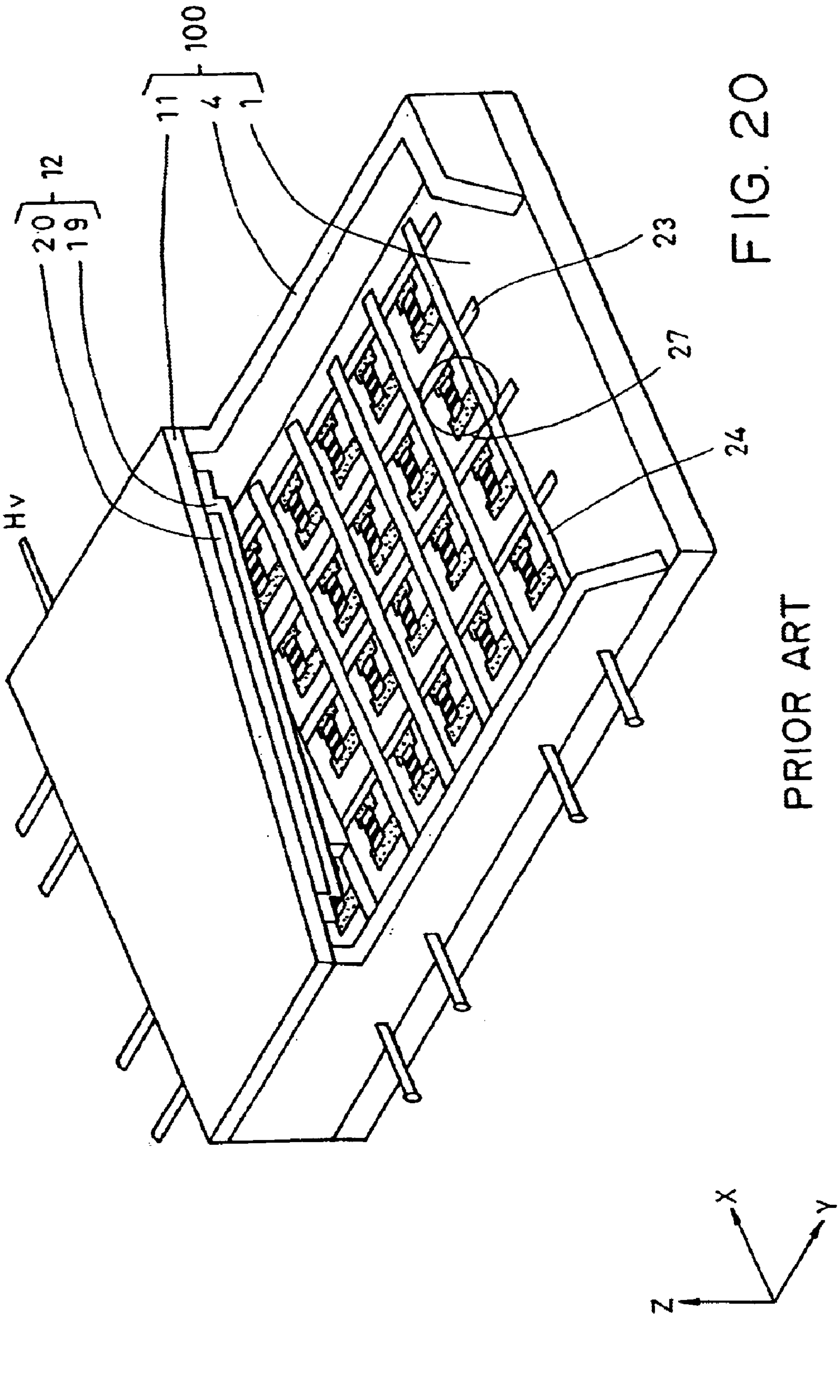
FIG. 20 PRIOR ART
FIG. 20 is a schematic perspective view of another conventional image forming apparatus.

In this embodiment, so-called Spindt type field emitters shown in FIG. 13 were used as electron emitting devices. The row direction wires 3-1 were each connected to the gate electrode 3014 (FIG. 13), and the column direction wires 3-2 were each connected to the cathode electrode 3011. Numeral 3013 denotes an insulating layer, and 3012 denotes an emitter electrode made of Mo.

The spacer 101 was fabricated by coating a conductive film having a high resistance on the surface of a spacer base member formed of a plate-like glass. The length of the spacer 101 in the longitudinal direction thereof is greater than that of the image forming member 12 in the same longitudinal direction. The conductive film 5 is a low-resistance film and surrounds an outer periphery of the image forming member 12 in the form of a closed loop (in which both ends of one continuous conductive film are connected to each other)(see FIG. 29A). Furthermore, as shown in FIG. 26B, each longitudinal end 110 of the spacer 101 is arranged between an end of the conductive film 5 on the side of the image forming member 12 and the support frame 4.

In this embodiment, as shown in FIG. 29A, the conductive film 5 was arranged in an overlapping relation to the joint portion between the support frame 4 (joining member) and the face plate 11 in the form of a relatively elongate rectangular closed loop (in which both ends of one continuous conductive film are connected to each other). More specifically, the joint portion between the support frame 4 (joining member) and the face plate 11 was arranged to be completely located within a region of the conductive film 5. Further, the conductive film 5 was formed to have a greater width along short sides of the rectangular closed loop than that along long sides thereof. Additionally, the width of the conductive film 5 along the short sides of the rectangular closed loop was set to be greater than that of the joint portion between the support frame 4 and the face plate 11.

With the above-described construction, as shown in FIG. 26B, each longitudinal end 110 of the spacer 101 arranged between the end of the conductive film 5 on the side of the image forming member 12 and the support frame 4. Also, in this embodiment, an end of the conductive film 5 on the side of the image forming member 12 was fully exposed to a vacuum area (inner space) of the airtight container 100 (FIGS. 26B and 26C).

The support frame 4 and the rear plate 1 were joined to each other by using a bonding material such as frit glass. Since the conductive film 5 was arranged in the joint portion between the face plate 11 and the support frame 4, the support frame 4 was joined to the face plate 11 by placing a bonding material between the support frame 4 and the conductive film 5 previously formed on the face plate 11. While the bonding material and the conductive film 5 were separate from each other in this embodiment, a conductive bonding material may be arranged on the face plate 11 in a pattern of the conductive film 5. This modification is more preferable in that the bonding material and the conductive film 5 can be formed by the same process. For example a metal, e.g., indium, having the melting point of not higher than 200° C. and having a function to seal off a vacuum state, or a mixture of frit glass and conductive fillers may be used as the conductive bonding material.

In this embodiment, Ba was used as getters formed on the metal back. Because of the Ba getter being evaporable, the getter material was coated on the metal back in a vacuum atmosphere before joining the face plate 11 and the rear plate 1. Then, the face plate 11 and the rear plate 1 were joined to each other (sealing-off step) in the vacuum atmosphere subsequent to the coating of the getter material, whereby the construction of the airtight container 100 was completed.

The image forming apparatus of this embodiment was driven by applying 10 kV to the metal back and applying 0 V to the conductive film 5 through the terminal connecting portion 6 (FIGS. 26A and 29A). For those ones of the electron emitting devices arrayed in the electron source area 2 from which electrons were to be emitted, −15 V was applied as a scan signal to the row direction wires 3-1 in succession, and +15 V was applied as a modulation signal to the column direction wires 3-2 in sync with the scan signal. Thus, a desired image was displayed with line-sequential driving. As a result, a stable image having a high brightness level was obtained for a long time period. Furthermore, a phenomenon of discharge was not observed at the spacer end 110.

Eighth Embodiment

Figure 27A:
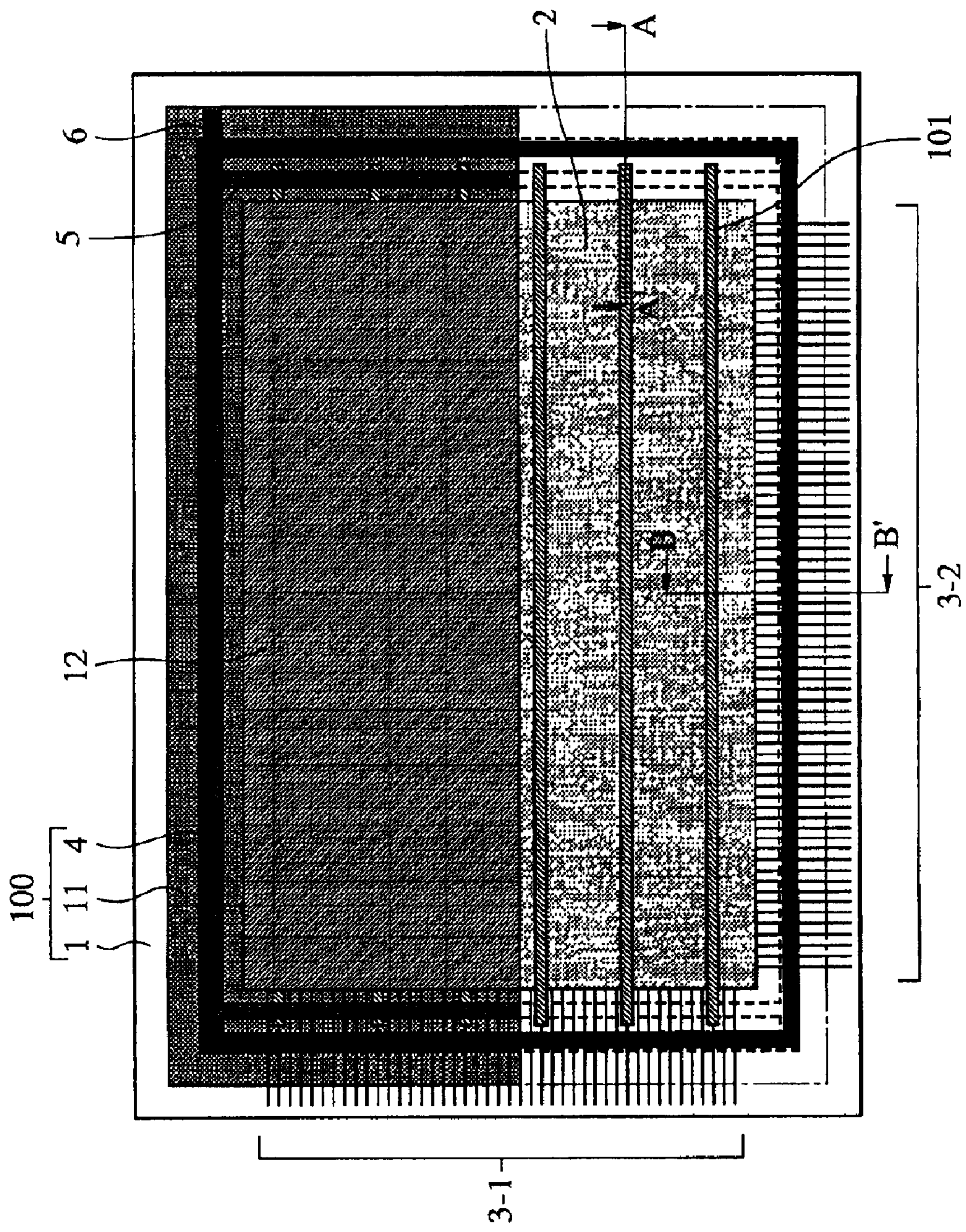
FIG. 27A is a schematic plan view of an image forming apparatus according to an eighth embodiment of the present invention.
Figure 27B:
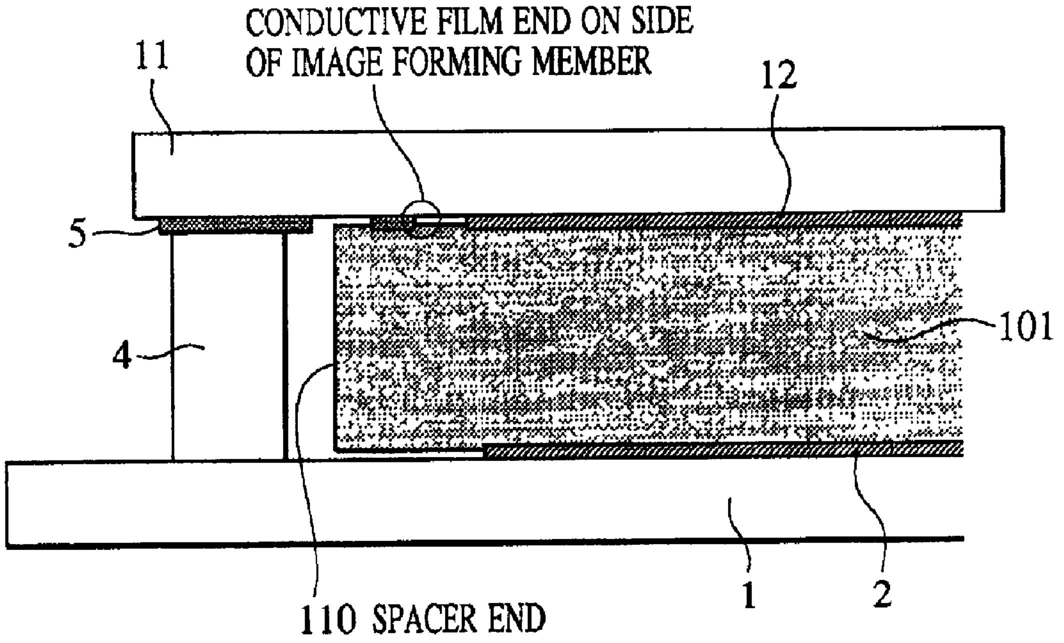
FIGS. 27B and 27C are schematic sectional views taken along lines A–A' and B–B' in FIG. 27A.
Figure 27C:
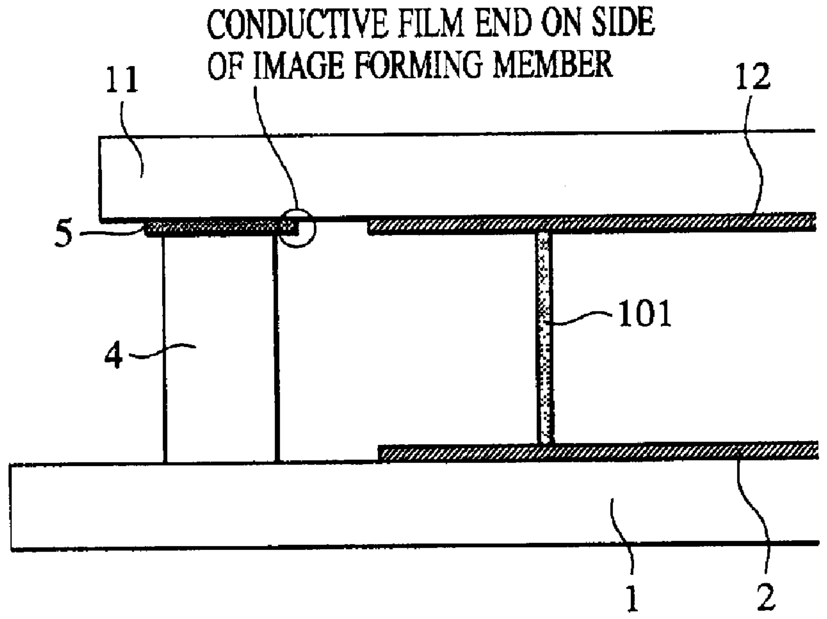

An image forming apparatus according to this eighth embodiment will be described in detail with reference to FIGS. 27A, 27B and 27C. FIG. 27A is a plan view schematically showing the construction of an image forming apparatus (airtight container) 100 of this embodiment, as viewed from above a face plate 11, with a lower portion of the face plate 11 omitted for the sake of convenience. FIG. 27B is a schematic sectional view taken along line A–A' in FIG. 27A. FIG. 27C is a schematic sectional view taken along line B–B' in FIG. 27A.

The image forming apparatus of this eighth embodiment has the same construction as that of the seventh embodiment except for the shape of a pattern of conductive film 5. The following description is therefore made of only the pattern of the conductive film 5 in the present embodiment.

In this embodiment, the conductive film 5 was likewise substantially in the relatively elongate rectangular form, but two sides of the conductive film 5 were each formed of two strips. Then, a spacer end 110 was arranged between an end of the conductive film 5 closest to the side of the image forming member 12 and the support frame 4.

The image forming apparatus of this eighth embodiment was driven under the same conditions as in the seventh embodiment. As a result, a stable image having a high brightness level was obtained for a long time period. Furthermore, discharge was not observed at the spacer end 110.

Ninth Embodiment

Figure 28A:
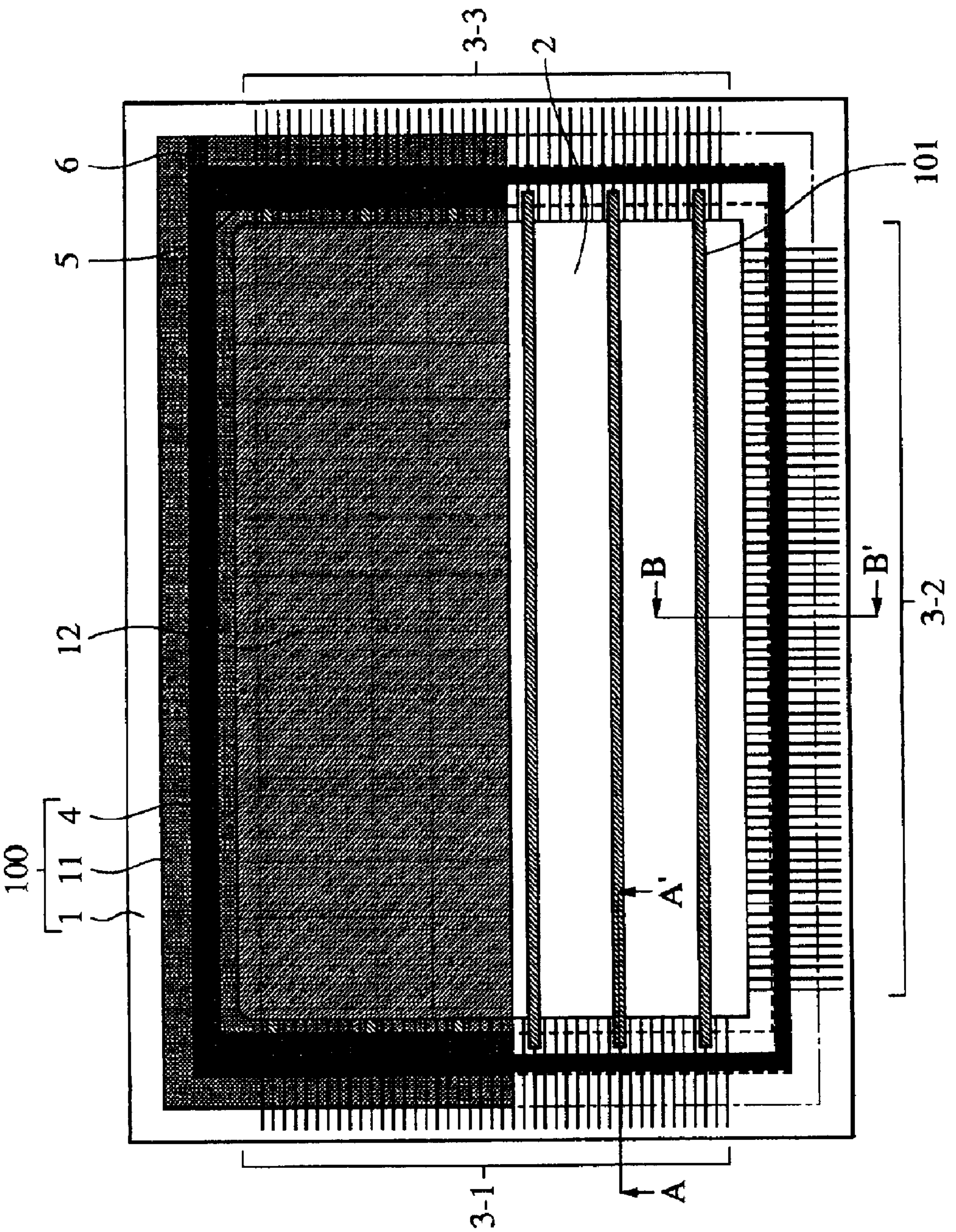
FIG. 28A is a schematic plan view of an image forming apparatus according to a ninth embodiment of the present invention.
Figure 28B:
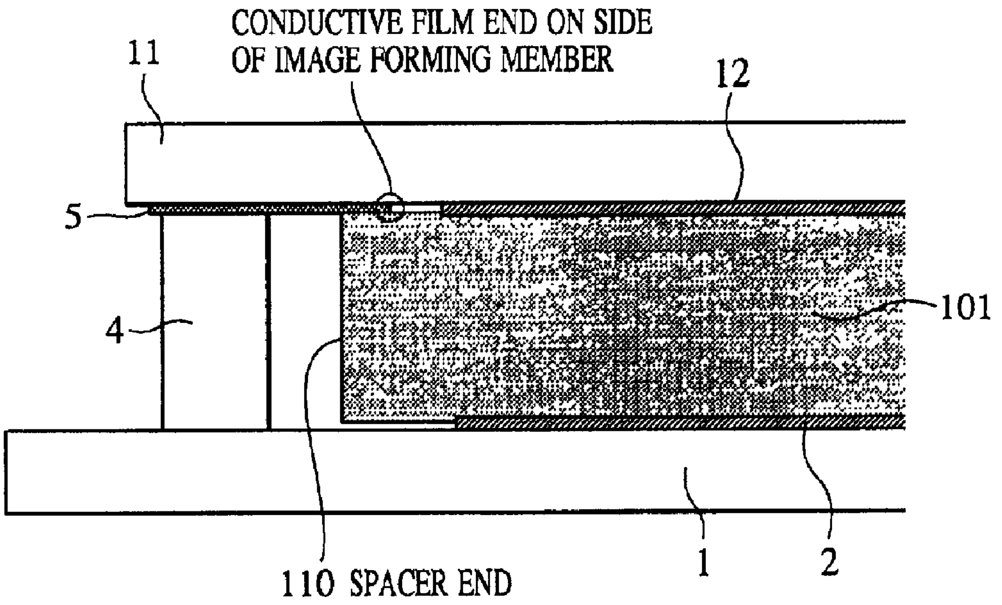
FIGS. 28B and 28C are schematic sectional views taken along lines A–A' and B–B' in FIG. 28A.
Figure 28C:
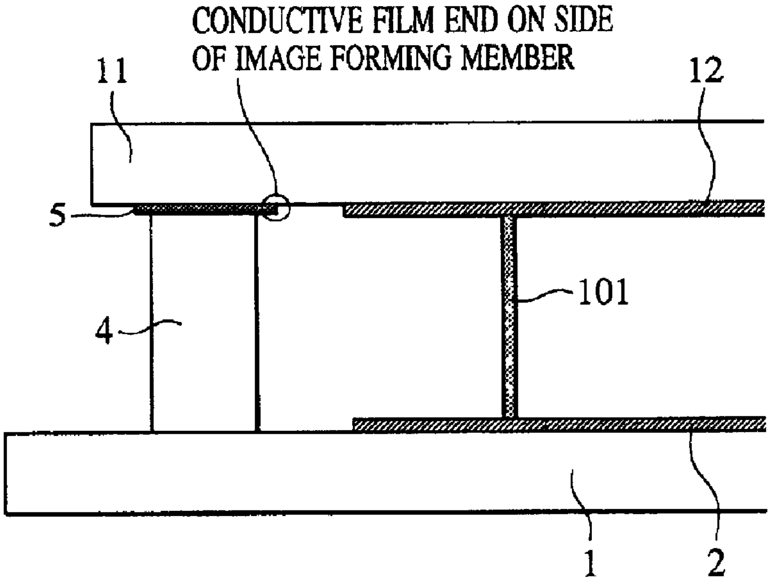
Figure 29B:
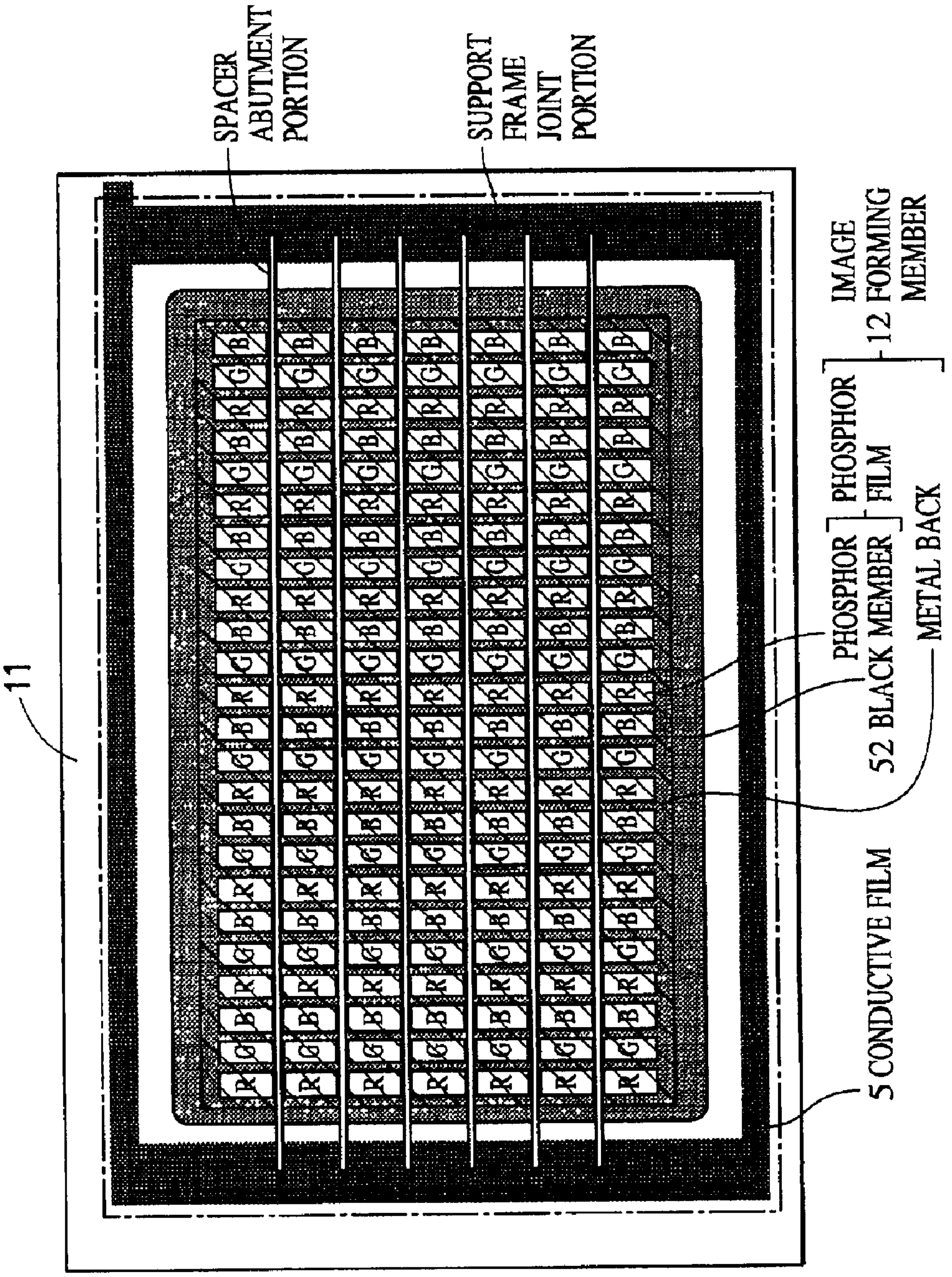

An image forming apparatus according to this ninth embodiment will be described in detail with reference to FIGS. 28A, 28B, 28C and 29B. FIG. 28A is a plan view schematically showing the construction of an image forming apparatus (airtight container) 100 of this embodiment, as viewed from above a face plate 11, with a lower portion of the face plate 11 omitted for the sake of convenience. FIG. 28B is a schematic sectional view taken along line A–A' in FIG. 28A. FIG. 28C is a schematic sectional view taken along line B–B' in FIG. 28A. FIG. 29B is a schematic view of the face plate 11 in this embodiment as viewed from the side of an electron source area 2.

The image forming apparatus of this ninth embodiment has the same construction as that of the seventh embodiment except for the shape of an image forming member 12. The following description is therefore made of only the shape of the image forming member 12 in the present embodiment.

In this embodiment, the image forming member 12 was substantially in the relatively elongate rectangular form as with the seventh embodiment, but four corners of the image forming member 12 were arc-shaped. The reason is that when the four corners of the image forming member 12 have an acute angle (e.g., a right angle), an electric field tends to enhance at those corners and can cause surface discharge between the corners and the conductive film 5. The arc-shaped corners are effective in suppressing the occurrence of such a discharge. Since an outer periphery of the image forming member 12 is defined by an outer periphery of a conductive black member 52 (FIG. 29B) as a component of the image forming member 12, four corners of the conductive black member 52 are arc-shaped in this embodiment.

The image forming apparatus of this ninth embodiment was driven under the same conditions as in the seventh embodiment. As a result, a stable image having a high brightness level was obtained for a long time period. Furthermore, discharge was not observed at a spacer end 110 and between the conductive film 5 and the image forming member 12.

Tenth Embodiment

Figure 30A:
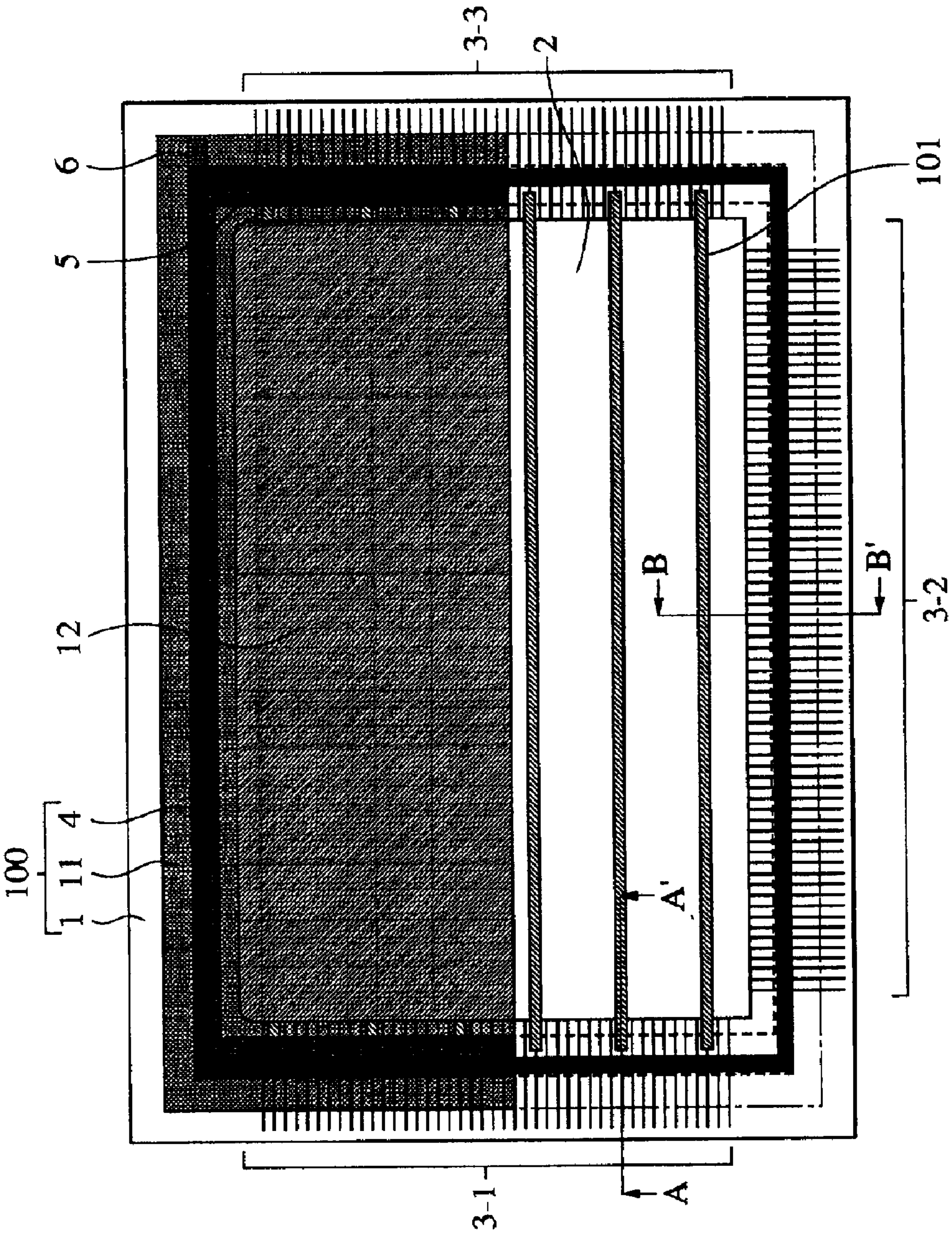
FIG. 30A is a schematic plan view of an image forming apparatus according to a tenth embodiment of the present invention.
Figure 30B:
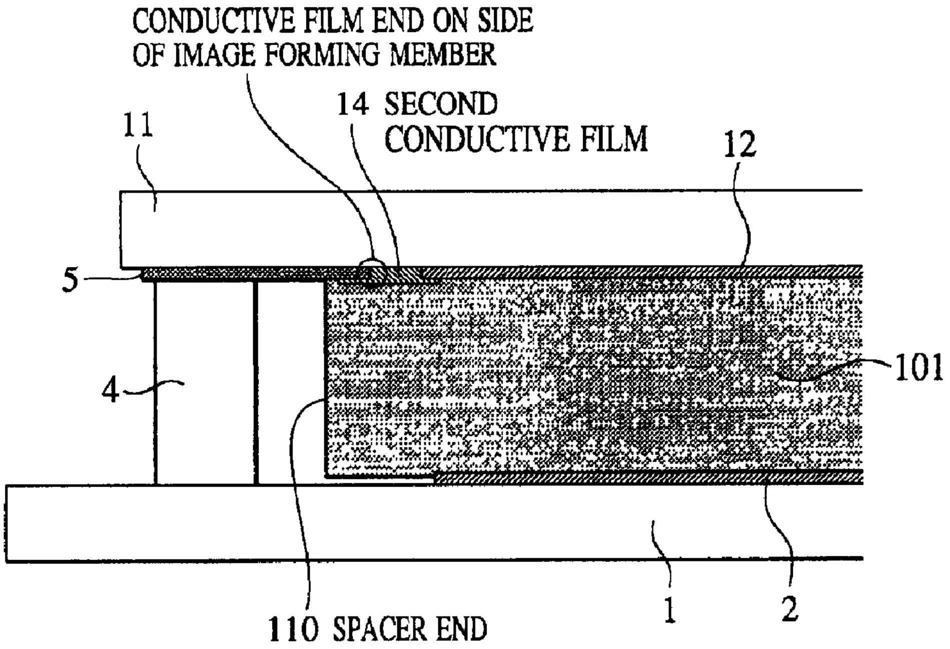
FIGS. 30B and 30C are schematic sectional views taken along lines A–A' and B–B' in FIG. 30A.
Figure 30C:
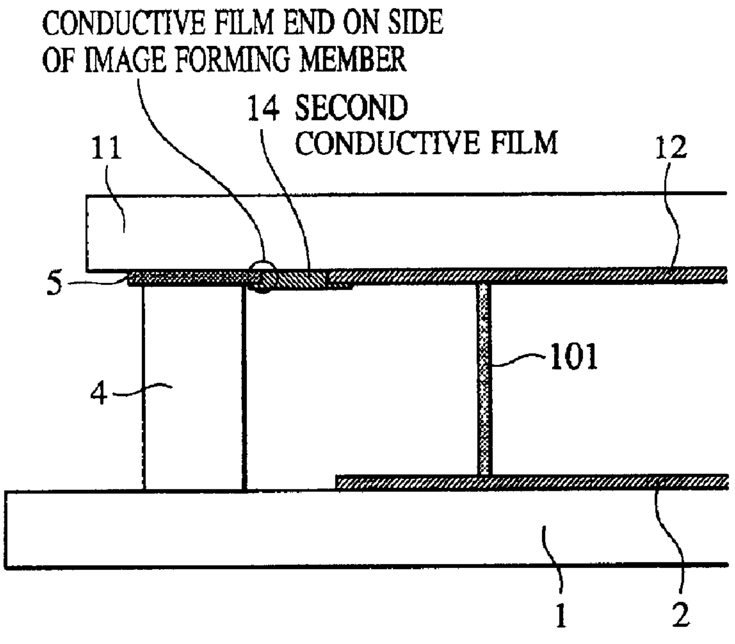
Figure 31:
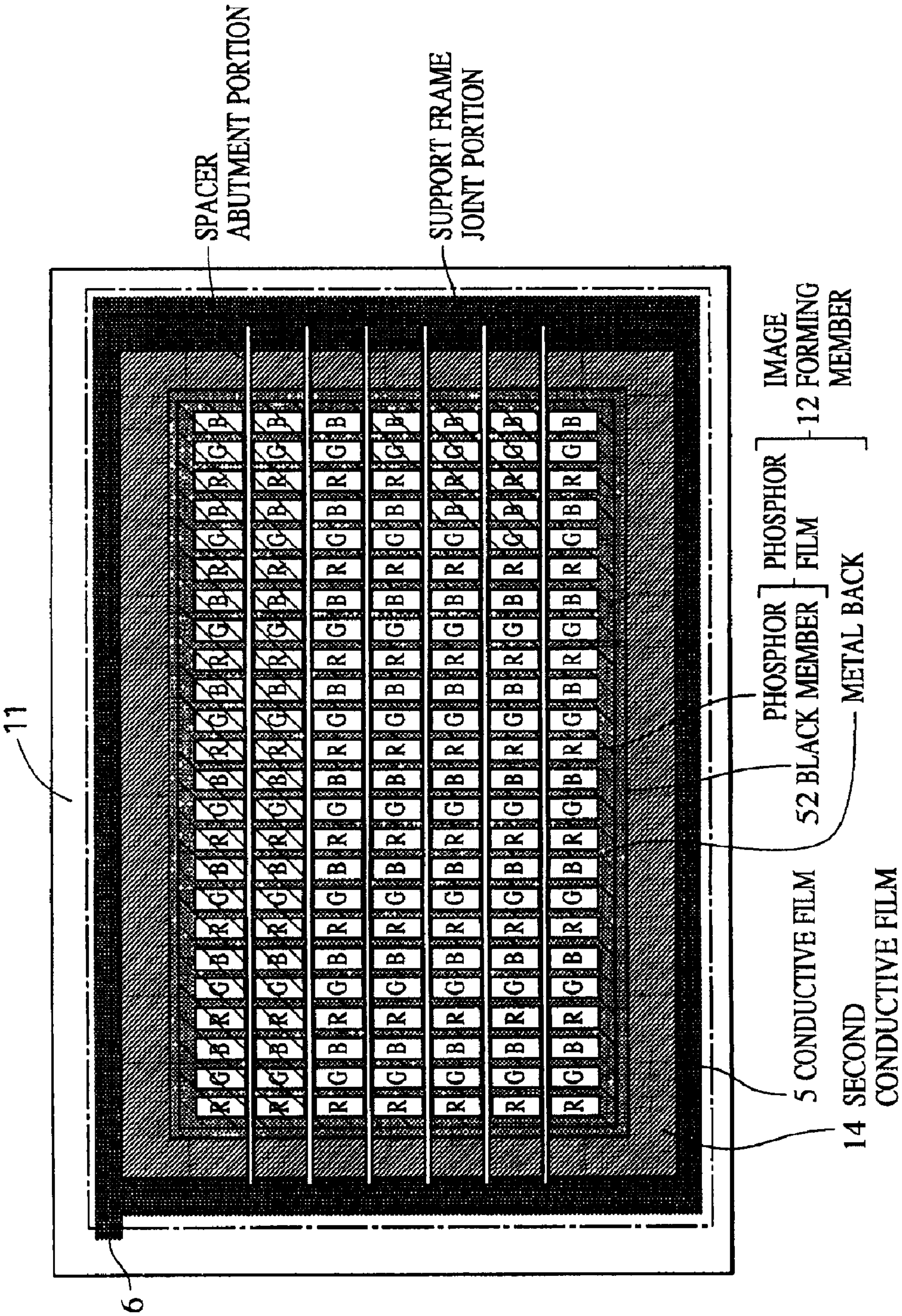
FIG. 31 is a schematic view showing one example of a face plate in the image forming apparatus according to the tenth embodiment of the present invention.

An image forming apparatus according to this tenth embodiment will be described in detail with reference to FIGS. 30A, 30B, 30C and 31. FIG. 30A is a plan view schematically showing the construction of an image forming apparatus (airtight container) 100 of this embodiment, as viewed from above a face plate 11, shown with a lower portion of the face plate 11 omitted for the sake of convenience. FIG. 30B is a schematic sectional view taken along line A–A' in FIG. 30A. FIG. 30C is a schematic sectional view taken along line B–B' in FIG. 30A. FIG. 31 is a schematic view of the face plate 11 in this embodiment as viewed from the side of an electron source area 2 (FIG. 30A).

In the image forming apparatus of this tenth embodiment, a second conductive film 14 having a high resistance is arranged, as shown in FIG. 31, between a conductive film (first conductive film) 5 and an image forming member 12 on the face plate 11 similarly fabricated as in the ninth embodiment (see FIG. 29B). The remaining components of the apparatus in the present embodiment are the same as those of the image forming apparatus according to the ninth embodiment, and thus will not be described in greater detail herein.

However, in this embodiment, a portion of the surface of the face plate 11, which was exposed in a spacing between a conductive black member 52 as one component of the image forming member 12 and the conductive film (first conductive film) 5, was filled with the second conductive film 14 having a high resistance. The second conductive film 14 was arranged to cover a part of the black member 52 and a part of the conductive film (first conductive film) 5 for electrical connection between the black member 52 and the conductive film 5 (FIGS. 30B, 30C and 31). Thus, in this embodiment, the surface of the face plate 11 positioned inside a region in which a support frame 4 was joined to the face plate 11, was covered by a plurality of conductive films having different resistance values, and insulating members were not exposed in that surface. In other words, a potential on the surface of the face plate 11 positioned inside the joining region to the support frame 4 was advantageously regulated. As a result, the potential on the surface of the face plate 11 was controlled as desired and a stable electric field was formed.

In this embodiment, the second conductive film 14 was formed by spray coating a carbon particle dispersed solution and drying the coated solution. The second conductive film 14 formed in this embodiment had a sheet resistance value of about $10^{11}$ Ω/□.

The image forming apparatus of this tenth embodiment was driven under the same conditions as in the seventh embodiment. As a result, a stable image having a high brightness level was obtained for a long time period. Also, discharge was not observed at a spacer end 110. Further, in the image forming apparatus of this tenth embodiment, the image display area had the same sized area as in the ninth embodiment, but the distance between the support frame 4 and the image forming member 12 was shortened as compared with that in the image forming apparatus of the ninth embodiment. Therefore, an image forming apparatus having an even more reduced weight and a more compact size could be achieved. Additionally, even when a higher potential than that used in the image forming apparatus of the ninth embodiment was applied to a metal back in the tenth embodiment, discharge was not observed at the spacer end 110.

As described above, the present invention can provide a lightweight, large-screen and inexpensive image forming apparatus that is able to suppress the occurrence of discharge outside of the image area, to form a high quality image with a high brightness level for a long time period in a stable manner, and to increase the amount of space occupied by the image area in the overall apparatus, relative to that occupied by image areas in conventional image forming apparatuses.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

(A) a first substrate;

(B) a second substrate arranged in an opposing and spaced apart relation to said first substrate;

(C) a support frame having an inner periphery forming a substantially rectangular shape, said support frame being arranged between said first and second substrates, and surrounding a space between a principal surface of said first substrate and a principal surface of said second substrate, for maintaining said space in a depressurized condition;

(D) a plurality of electron emitting devices arranged on the principal surface of said first substrate facing said space;

(E) an image forming member having an outer periphery forming a substantially rectangular shape, said image forming member being arranged on at least a portion of the principal surface of said second substrate facing said space in an opposing relation to said plurality of electron emitting devices;

(F) a first conductive film arranged on at least another portion of the principal surface of said second substrate facing said space, said first conductive film surrounding, and being spaced apart from, said image forming member, said conductive film being supplied with a potential lower than that applied to said image forming member; and (G) a second conductive film connecting said first conductive film to said image forming member.

2. An image forming apparatus according to claim 1, wherein said second conductive film has a higher resistance than said first conductive film.

3. An image forming apparatus according to claim 1, wherein said second conductive film has a sheet resistance of not less than $10^7$ Ω/□.

4. An image forming apparatus according to claim 3, wherein said second conductive film has a sheet resistance of not more than $10^{14}$ Ω/□.

5. An image forming apparatus according to any one of claims 1 to 4, wherein said first conductive film intersects a line between an arbitrary point on said image forming member and an arbitrary point on an outer periphery of the principal surface of said second substrate.

6. An image forming apparatus according to any one of claims 1 to 4, wherein said first conductive film intersects a line between an arbitrary point on said image forming member and an arbitrary point in a region of said apparatus where said support frame is in contact with said second substrate.

7. An image forming apparatus according to any one of claims 1 to 4, wherein said first conductive film is in the form of a closed loop.

8. An image forming apparatus according to claim 1, wherein said first conductive film surrounds said image forming member.

9. An image forming apparatus according to claim 1, wherein said image forming member includes a phosphor film.

10. An image forming apparatus according to claim 9, wherein said phosphor film includes phosphors which emanate light in three primary colors of red, blue and green.

11. An image forming apparatus according to claim 9 or 10, wherein said phosphor film includes phosphors and a black member surrounding said phosphors.

12. An image forming apparatus according to claim 11, wherein said image forming member further includes a conductive film covering said phosphor film.

13. An image forming apparatus according to claim 11, wherein an outer periphery of said image forming member is demarcated by said black member, and said black member has conductivity.

14. An image forming apparatus according to claim 12, wherein an outer periphery of said image forming member is demarcated by said conductive film covering said phosphor film.

15. An image forming apparatus according to any one of claims 1 to 4, wherein a potential applied to said first conductive film is substantially ground potential.

16. An image forming apparatus according to any one of claims 1 to 4, wherein a potential applied to said first conductive film is substantially the same as that applied to said electron emitting devices.

17. An image forming apparatus according to any one of claims 1 to 4, wherein said electron emitting devices are connected via leads to a driving circuit arranged outside of said space maintained in a pressurized condition, and a potential applied to said leads by said driving circuit is substantially the same as that applied to said first conductive film.

18. An image forming apparatus according to any one of claims 1 to 4, wherein the principal surface of said second substrate, which is positioned to face said space, is fully covered with a conductive member.

19. An image forming apparatus according to claim 18, wherein said conductive member comprises said image forming member and said first and second conductive films.

20. An image forming apparatus according to any one of claims 1 to 4, further comprising a spacer arranged in said space for maintaining a separation between said first and second substrates.

21. An image forming apparatus according to any one of claims 1 to 4, wherein said first conductive film is arranged in a portion of said apparatus where said support frame is in contact with said second substrate.

22. An image forming apparatus according to claim 21, wherein said first conductive film is a conductive bonding material.

23. An image forming apparatus comprising:

(A) a first substrate;

(B) a second substrate arranged in an opposing and spaced apart relation to said first substrate;

(C) a support frame having an inner periphery, said support frame being arranged between said first and second substrates, and surrounding a space between a principal surface of said first substrate and a principal surface of said second substrate, for maintaining said space in a depressurized condition;

(D) a plurality of electron emitting devices arranged on the principal surface of said first substrate facing said space;

(E) an image forming member having an outer periphery, said image forming member being arranged on at least a portion of the principal surface of said second substrate facing said space in an opposing relation to said plurality of electron emitting devices;

(F) a first conductive film arranged on at least another portion of the principal surface of said second substrate facing said space, said first conductive film surrounding, and being spaced apart from, said image forming member, said conductive film being supplied with a potential lower than that applied to said image forming member; and (G) a second conductive film connecting said first conductive film to said image forming member.

* * * * *

UNITED STATES PATENT AND TRADEMARK OFFICE

CERTIFICATE OF CORRECTION

PATENT NO. : 6,759,802 B2
DATED : July 6, 2004
INVENTOR(S) : Yoichi Ando

It is certified that error appears in the above-identified patent and that said Letters Patent is hereby corrected as shown below:

Column 3,
Line 67, "lest" should read -- least --.

Column 18,
Line 19, "current" should read -- current If. --.

Column 24,
Line 54, "mow" should read -- now --.

Column 28,
Line 50, "in arranged" should be deleted.

Signed and Sealed this

Fourteenth Day of December, 2004

JON W. DUDAS
*Director of the United States Patent and Trademark Office*